United States Patent [19]
Onoda et al.

[11] Patent Number: 6,088,177
[45] Date of Patent: Jul. 11, 2000

[54] FORMATTING APPARATUS AND A FLEXIBLE DISK

[75] Inventors: Atsuo Onoda; Shin Isozaki; Tadanobu Ohke, all of Tokyo, Japan

[73] Assignee: Mitsubishi Denki Kabushiki Kaisha, Tokyo, Japan

[21] Appl. No.: 08/886,029

[22] Filed: Jun. 30, 1997

[30] Foreign Application Priority Data

Oct. 29, 1996 [JP] Japan .................................... 8-286958

[51] Int. Cl.$^7$ ....................................................... G11B 5/09
[52] U.S. Cl. ............................................... 360/48; 360/50
[58] Field of Search ........................................ 360/48, 50

[56] References Cited

U.S. PATENT DOCUMENTS

| | | | |
|---|---|---|---|
| 4,270,172 | 5/1981 | Tidd et al. ................................. | 360/48 |
| 4,719,523 | 1/1988 | Kutaragi ..................................... | 360/51 |
| 4,819,095 | 4/1989 | Asano et al. .......................... | 360/77.04 |
| 4,833,663 | 5/1989 | Satoh et al. ................................ | 369/32 |
| 4,839,753 | 6/1989 | Ide et al. .................................... | 360/48 |
| 4,942,486 | 7/1990 | Kutaragi et al. ........................... | 360/48 |
| 5,388,085 | 2/1995 | Jaquette .................................... | 369/32 |
| 5,532,889 | 7/1996 | Stefansky et al. .................... | 360/97.01 |
| 5,745,313 | 4/1998 | Sliger ........................................ | 360/48 |

FOREIGN PATENT DOCUMENTS

| | | |
|---|---|---|
| 0210630 | 2/1987 | European Pat. Off. . |
| 0300264 | 1/1989 | European Pat. Off. . |
| 0310250 | 4/1989 | European Pat. Off. . |

OTHER PUBLICATIONS

"Signal Timing For A Floppy Disk Drive Controller", IBM Technical Disclosure Bulletin, vol. 37, No. 6B, Jun. 1, 1994, pp. 589–591.

Shoji Takahashi, "The Newest Floppy Disk Apparatus and its Application Method"; *Basics, Designs and Applications of a Standard/Mini/Micro FDD System*; Jun. 10, 1984; pp. 110–113.

*Primary Examiner*—Paul Loomis
*Assistant Examiner*—Regina Y. Neal

[57] ABSTRACT

An apparatus and formatting method formats a disk without using an index pulse generated by hardware for every disk rotation. A last data block gap and a track gap which are longer than a standard track gap length are first written. Even if there is a fluctuation in rotation cycle time during formatting, a last sector of each track is written over a beginning of the track gap. When writing to a last sector is complete, formatting of a track is complete. When a head is stably positioned at a track to be formatted, formatting of the track is started.

15 Claims, 48 Drawing Sheets

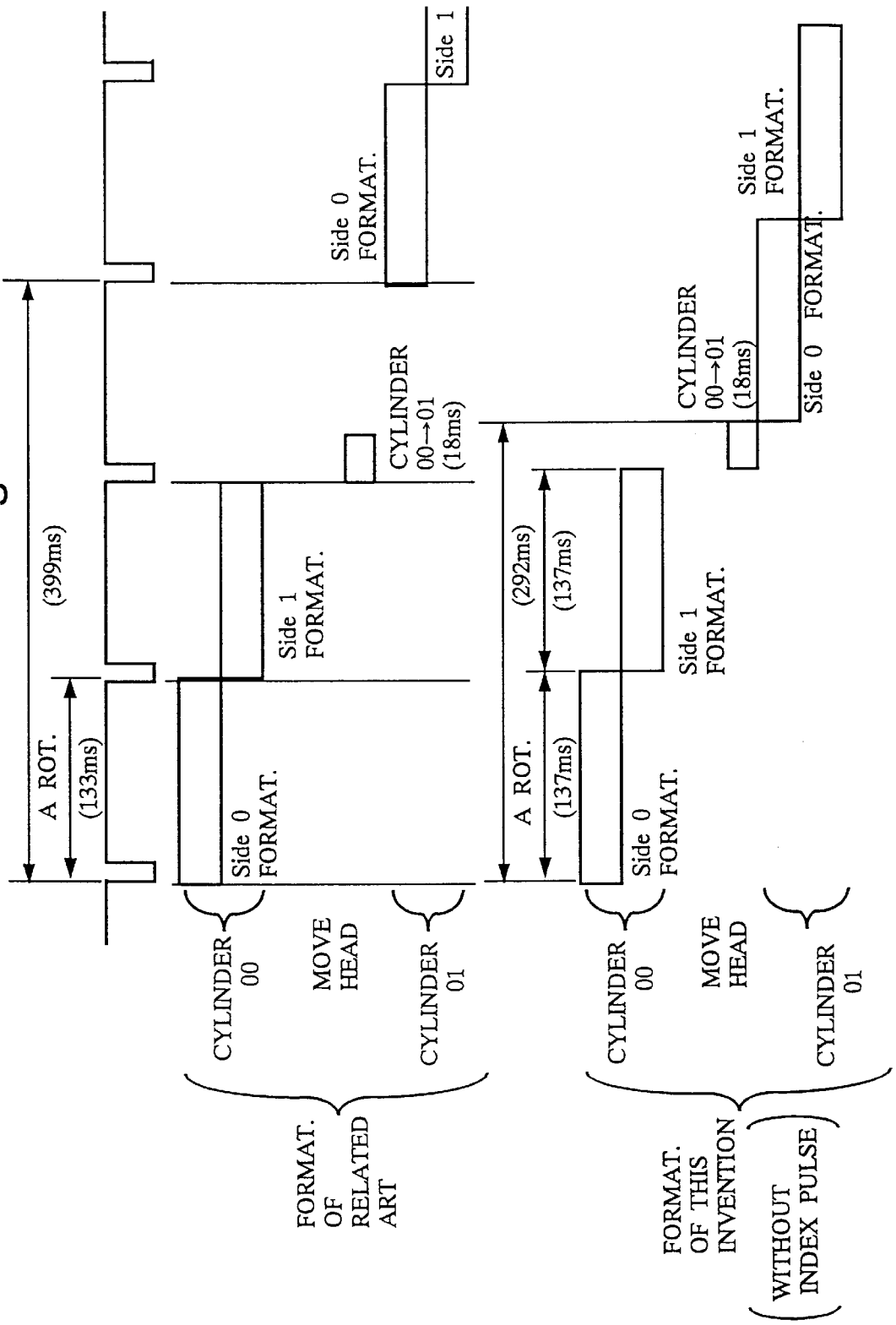

Fig. 10

EMBODIMENTS OF A TRACK FORMAT OF THIS INVENTION

| | SAMPLE 1(a) | SAMPLE 1(b) | SAMPLE 2 | SAMPLE 3 | SAMPLE 4 | |
|---|---|---|---|---|---|---|
| Disk Size | 44 | 44 | 44 | 44 | 44 | mm |
| UNFORMAT. CAP. | | | | | | |
| DISK U (BYTE) | 2,000,000 | 2,000,000 | 2,000,000 | 2,000,000 | 2,000,000 | Bytes |
| TRACK (TK.) U (BYTE) | 16,667 | 16,667 | 16,667 | 16,667 | 16,667 | Bytes |
| FREQ. | 1,000,000 | 1,000,000 | 1,000,000 | 1,000,000 | 1,000,000 | ftps |
| ROT. SPEED | 450 | 450 | 450 | 450 | 450 | RPM |
| *TK. CAP. (BYTE) = [FREQ. (bit/sec) × ROT. CYCLE TIME] ÷ 8 | | | | | | |
| TK./SIDE | 60 | 60 | 60 | 60 | 60 | TK. |
| No. OF SIDES | 2 | 2 | 2 | 2 | 2 | SIDES |
| REC. METHOD | MFM | MFM | MFM | MFM | MFM | |
| FORMAT CAP. | | | | | | |
| DISK F (BYTE) | 1,474,560 | 1,474,560 | 1,474,560 | 1,474,560 | 1,474,560 | Bytes |
| TK. F (BYTE) | 12,288 | 12,288 | 12,288 | 12,288 | 12,288 | Bytes |
| SECTOR. CAP. (BYTE) | 512 | 512 | 512 | 512 | 512 | Bytes |
| SEC./TK. | 24 | 24 | 24 | 24 | 24 | Sectors |
| FORMAT EFF. F/U (%) | 73.7 | 73.7 | 73.7 | 73.7 | 73.7 | % |

Fig. 11

EMBODIMENTS OF A TRACK FORMAT OF THIS INVENTION

| | SAMPLE 1(a) | SAMPLE 1(b) | SAMPLE 2 | SAMPLE 3 | SAMPLE 4 | |
|---|---|---|---|---|---|---|
| Disk Size | 44 | 44 | 44 | 44 | 44 | mm |
| Index Gap (Gap 1) | 0 | 0 | 0 | 0 | 0 | Bytes |
| Address ID | 22 | 22 | 22 | 22 | 22 | Bytes |
| ID Gap (Gap 2) | 34 | 34 | 38 | 42 | 45 | Bytes |
| Data Block | 530 | 530 | 530 | 530 | 530 | Bytes |
| DB Gap (Gap 3) | 96 | 101 | 94 | 92 | 89 | Bytes |
| TOTAL BYTE/TK. | 16368 | 16368 | 16416 | 16464 | 16464 | Bytes |
| REMAIN. : Track Gap (Gap 4) | 299 | 299 | 251 | 203 | 203 | Bytes |
| HEAD | | | | | | |
| DISTANCE d (TUNNEL ER.) | 0.16 | 0.16 | 0.18 | 0.2 | 0.22 | mm |
| DISTANCE d (LEAD. ER.) | | | | | | mm |
| ALLOW.AVE. SPEED FLUC. IN SEC. | | | | | | |
| CALC. | 5 | 5.35 | 4.65 | 4 | 3.4 | ± % |
| NOMINAL | | | | | | ± % |
| ALLOW. ROT. SPEED | | | | | | |
| β OF 1 ROT. SPEED 1 : (LAST G3=W. AFTER) | 1.64 | 0.9 | 1.02 | 1 | 0.98 | HIGH SPEED% |
| β OF 1 ROT. SPEED 2 : (LAST G3=1Byte) | 2.23 | 1.51 | 1.61 | 1.56 | 1.51 | HIGH SPEED% |
| REMAIN.RATIO 1:G3 IN LAST SEC. IS W. LATER | | | | | | |
| A=G4/(G0+G4) | 24.8 | 15.5 | 19.3 | 21.7 | 24.4 | % |
| B=G4/Btk | 1.8 | 1.1 | 1.2 | 1.2 | 1.2 | % |
| REMAIN.RATIO 2:G3 IN LAST SEC. IS W. AT FIRST W/TK. GAP G4 | | | | | | |
| A=(G4+G3)/(G0+G4+G3) | 30.3 | 22.4 | 26.1 | 28.7 | 31.7 | % |
| B=(G4+G3)/Btk | 2.4 | 1.7 | 1.8 | 1.8 | 1.7 | % |
| A : PRE-W.GAP RATIO, B : A TK. BYTE RATIO | | | | | | |

REF.   FIGs.12,13   FIGs.12,13   FIGs.14,15   FIGs.16,17   FIGs.18,19

Fig. 12

44mm FDC (NEW UNFORMAT. CAP. 2MB) CALC. SAMPLE 1 OF REC. FORMAT
(LEAD. ER. NO INDEX, PRE-W. TK. GAP G4)

| | | LEAD ER. | Head E-R/W DISTANCE d | 0.16 mm max. |
|---|---|---|---|---|
| FLUC. OF W. CLK  ±γ | 0.1 % | NOM. CLK CYCLE | | 1 μs |
| | | NORMAL ROT. NO. | | 450 rpm |
| Erase-on risetime Tr | 0.125 byte length | NOM. BIT No./TK. | 133333.3333 bits | |
| Erase-off falltime Tf | 0.125 byte length | NOM. BYTE No./TK. (Btk) | 16666.66667 bytes | |
| INN. TK. R.  r2= | 13.5 mm | NOM. BIT L. AT INN. TK. τ : | 0.000636173 mm | bpi= 39926.27708 |
| OUT. TK. R.  r1= | 20.4 mm | | | |
| ±α | 0 | | | 6 % |

(α:FLUC. OF AVE. SPEED IN A SEC. FM NOM. VAL. %)

| | | | | | | | |
|---|---|---|---|---|---|---|---|
| Gap 1 | 0 | 0 | 0 | 0 | 0 | 0 | 0 Bytes |
| ID | 22 | 22 | 22 | 22 | 22 | 22 | 22 Bytes |
| Gap 2 | 31.6 | 32.2 | 32.5 | 32.9 | 33.2 | 33.3 | 33.5 Bytes |
| G2 INTEGER | 32 | 33 | 33 | 33 | 34 | 34 | 34 Bytes |
| data block | 530 | 530 | 530 | 530 | 530 | 530 | 530 Bytes |
| Gap 3 | 32.9 | 57.2 | 69.7 | 82.5 | 95.7 | 100.3 | 109.1 Bytes |
| G3 INTEGER | 33 | 58 | 70 | 83 | 96 | 101 | 110 Bytes |
| No. of Sec. | 24 | 24 | 24 | 24 | 24 | 24 | 24 Sectors |
| Total bytes | 14808 | 15432 | 15720 | 16032 | 16368 | 16488 | 16704 Bytes |
| REMAIN. (Gap 4) | 1858.67 | 1234.67 | 946.67 | 634.67 | 298.67 | 178.67 | -37.33 Bytes |

Fig. 13

44mm FDC (NEW UNFORMAT. CAP. 2MB) CALC. SAMPLE 1 OF REC. FORMAT

| ±α | 0 | 2 | 3 | 4 | 5 | 5.35 | 6 % |
|---|---|---|---|---|---|---|---|
| 1:1 ROT. SPEED 1 (FORMAT GAP G3 IN LAST SEC.) | | | | | | | |
| ALLOW. HIGH ROT. TIME | | 92.78 | 94.5 | 96.37 | 98.39 | 99.11 | 100.4 % |
| ALLOW. HIGH ROT. No. (100+β)% | | 107.78 | 105.82 | 103.77 | 101.64 | 100.9 | 99.6 % |
| 2:1 ROT. SPEED 2 (FORMAT GAP G3 OF 1 BYTE IN LAST SEC.) | | | | | | | |
| ALLOW. HIGH ROT. TIME | | 92.43 | 94.09 | 95.88 | 97.82 | 98.51 | 99.75 % |
| ALLOW. HIGH ROT. No. (100+β)% | | 108.19 | 106.28 | 104.3 | 102.23 | 101.51 | 100.25 % |
| PRE-W. GAP FOR LOW SPEED FORMAT. | | | | | | | |
| (Gap 0) | 31.44 | 370.95 | 545.96 | 724.62 | 907.06 | 971.82 | 1093.38 Bytes |
| TOTAL PRE-W. GAP | | | | | | | |
| G0+G4 | 1890.11 | 1605.62 | 1492.63 | 1359.29 | 1205.73 | 1150.49 | 1056.05 Bytes |
| G0+G4 INTEGER | 1891 | 1606 | 1493 | 1360 | 1206 | 1151 | 1057 Bytes |
| G0+G4+G3 | 1924 | 1663 | 1563 | 1442 | 1302 | 1251 | 1166 Bytes |
| REMAIN. PRE-W. GAP AT NORMAL ROT.: | | | | | | | |
| REMAIN. RATIO 1:G3 IN LAST SEC. IS W. LATER: | | | | | | | |
| A=G4/(G0+G4) | | 76.9 | 63.4 | 46.7 | 24.8 | 15.5 | -3.5 % |
| B=G4/Btk | | 7.4 | 5.7 | 3.8 | 1.8 | 1.1 | -0.2 % |
| REMAIN. RATIO 2:G3 IN LAST SEC. IS W. AT FIRST W/G4: | | | | | | | |
| A=(G4+G3)/(G0+G4+G3) | | 77.7 | 65 | 49.8 | 30.3 | 22.4 | 6.2 % |
| B=(G4+G3)/Btk | | 7.8 | 6.1 | 4.3 | 2.4 | 1.7 | 0.4 % |
| A : PRE-W. GAP RATIO, B : A TK.BYTE RATIO | | | | | | | |

Fig. 14

44mm FDC (NEW UNFORMAT. CAP. 2MB) CALC. SAMPLE 2 OF REC. FORMAT
(LEAD. ER., No. INDEX, PRE-W. TK. GAP G4)

| | | LEAD. ER. | | | | | Head E-R/W DISTANCE d | 0.18 mm max. |
|---|---|---|---|---|---|---|---|---|
| FLUC. OF W. CLK ±γ | | 0.1 % | | NOM. CLK CYCLE | | | | 1 μs |
| | | | | NORMAL ROT. No. | | | | 450 rpm |
| Erase-on risetime Tr | | 0.125 byte length | | NOM. BIT No./TK. | | | 133333.3333 bits | |
| Erase-off falltime Tf | | 0.125 byte length | | NOM. BYTE No./TK. (Btk) | | | 16666.66667 bytes | |
| INN. TK. R. r2= | | 13.5 mm | | NOM. BIT L. AT INN. TK. τ : | | | 0.000636173 mm | bpi = 39926.27708 |
| OUT. TK. R. r1= | | 20.4 mm | | | | | | |
| ±α | 0 | 2 | 3 | 4 | 4.5 | 4.65 | 5 | |
| (α:FLUC. OF AVE. SPEED IN A SEC. FM NOM. VAL. %) | | | | | | | | |
| Gap 1 | 0 | 0 | 0 | 0 | 0 | 0 | 0 | 0 Bytes |
| ID | 22 | 22 | 22 | 22 | 22 | 22 | 22 | 22 Bytes |
| Gap 2 | 35.5 | 36.2 | 36.6 | 36.9 | 37.1 | 37.2 | | 37.3 Bytes |
| G2 INTEGER | 36 | 37 | 37 | 37 | 38 | 38 | | 38 Bytes |
| data block | 530 | 530 | 530 | 530 | 530 | 530 | | 530 Bytes |
| Gap 3 | 36.8 | 61.5 | 74.2 | 87.1 | 93.8 | 95.8 | | 100.5 Bytes |
| G3 INTEGER | 37 | 62 | 75 | 88 | 94 | 96 | | 101 Bytes |
| No. of Sec. | 24 | 24 | 24 | 24 | 24 | 24 | | 24 Sectors |
| Total bytes | 15000 | 15624 | 15936 | 16248 | 16416 | 16464 | | 16584 Bytes |
| REMAIN. (Gap 4) | 1666.67 | 1042.67 | 730.67 | 418.67 | 250.67 | 202.67 | | 82.67 Bytes |

Fig. 15

44mm FDC (NEW UNFORMAT. CAP. 2MB) CALC. SAMPLE 2 OF REC. FORMAT

| ±α | 0 | 2 | 3 | 4 | 4.5 | 4.65 | 5 % |
|---|---|---|---|---|---|---|---|
| 1:1 ROT. SPEED 1 (FORMAT GAP G3 IN LAST SEC.) | | | | | | | |
| ALLOW. HIGH ROT. TIME | 93.95 | 93.95 | 95.82 | 97.69 | 98.7 | 98.99 | 99.71 % |
| ALLOW. HIGH ROT. No. (100+β)% | 106.44 | 106.44 | 104.36 | 102.36 | 101.32 | 101.02 | 100.29 % |
| 2:1 ROT. SPEED 2 (FORMAT GAP G3 OF 1 BYTE IN LAST SEC.) | | | | | | | |
| ALLOW. HIGH ROT. TIME | 93.59 | 93.59 | 95.38 | 97.17 | 98.14 | 98.42 | 99.11 % |
| ALLOW. HIGH ROT. No. (100+β)% | 106.85 | 106.85 | 104.84 | 102.91 | 101.9 | 101.61 | 100.9 % |
| PRE-W. GAP FOR LOW SPEED FORMAT. | | | | | | | |
| (Gap 0) | 35.37 | 374.8 | 549.77 | 728.4 | 819.12 | 846.52 | 910.79 Bytes |
| TOTAL PRE-W. GAP | | | | | | | |
| G0+G4 | 1702.04 | 1417.47 | 1280.44 | 1147.07 | 1069.79 | 1049.19 | 993.46 Bytes |
| G0+G4 INTEGER | 1703 | 1418 | 1281 | 1148 | 1070 | 1050 | 994 Bytes |
| G0+G4+G3 | 1739 | 1479 | 1355 | 1235 | 1164 | 1145 | 1094 Bytes |

REMAIN. PRE-W. GAP AT NORMAL ROT.

| REMAIN. RATIO 1: G3 IN LAST SEC. IS W. LATER | | | | | | | |
|---|---|---|---|---|---|---|---|
| A=G4/(G0+G4) | | 73.5 | 57 | 36.5 | 23.4 | 19.3 | 8.3 % |
| B=G4/Btk | | 6.3 | 4.4 | 2.5 | 1.5 | 1.2 | 0.5 % |
| REMAIN. RATIO 2: G3 IN LAST SEC. IS W. AT FIRST W/G4 | | | | | | | |
| A=(G4+G3)/(G0+G4+G3) | | 74.7 | 59.5 | 41 | 29.6 | 26.1 | 16.8 % |
| B=(G4+G3)/Btk | | 6.6 | 4.8 | 3 | 2.1 | 1.8 | 1.1 % |

A : PRE-W. GAP RATIO, B : A TK. BYTE RATIO

Fig. 16

44mm FDC (NEW UNFORMAT. CAP. 2MB) CALC. SAMPLE 3 OF REC. FORMAT
(LEAD. ER., NO INDEX, PRE-W. TK. GAP G4)

| | | LEAD. ER. | | Head E-R/W DISTANCE d | | 0.2 mm max. |
|---|---|---|---|---|---|---|
| FLUC. OF W.CLK ±γ | | 0.1 % | NOM. CLK CYCLE | | 133333.3333 bits | 1 μs |
| | | | NORMAL ROT. No. | | 16666.66667 bytes | 450 rpm |
| Erase-on risetime Tr | | 0.125 byte length NOM. BIT No./TR. | | | | |
| Erase-off falltime Tf | | 0.125 byte length NOM. BYTE No./TK. (Btk) | | | | bpi = 39926.27708 |
| INN. TK. R.   r2= | | 13.5 mm | NOM. BIT L. AT INN. TK. τ : 0.000636173 mm | | | |
| OUT. TK. R.   r1= | | 20.4 mm | | | | |
| ±α | | 3 | 3.75 | 4 | 4.3 | 4.5 | 5 % |
| (α:FLUC. OF AVE. SPEED IN A SEC. FM NOM. VAL. %) | | | | | | | |
| Gap 1 | 0 | 0 | 0 | 0 | 0 | 0 | 0 Bytes |
| ID | 22 | 22 | 22 | 22 | 22 | 22 | 22 Bytes |
| Gap 2 | 39.5 | 40.6 | 40.9 | 41 | 41.2 | 41.2 | 41.4 Bytes |
| G2 INTEGER | 40 | 41 | 41 | 42 | 42 | 42 | 42 Bytes |
| data block | 530 | 530 | 530 | 530 | 530 | 530 | 530 Bytes |
| Gap 3 | 40.8 | 78.6 | 88.4 | 91.8 | 95.8 | 98.5 | 105.3 Bytes |
| G3 INTEGER | 41 | 79 | 89 | 92 | 96 | 99 | 106 Bytes |
| No of Sec. | 24 | 24 | 24 | 24 | 24 | 24 | 24 Sectors |
| Total bytes | 15192 | 16128 | 16368 | 16464 | 16560 | 16632 | 16800 Bytes |
| REMAIN. (Gap 4) | 1474.67 | 538.67 | 298.67 | 202.67 | 106.67 | 34.67 | -133.33 Bytes |

Fig. 17

44mm FDC (NEW UNFORMAT. CAP. 2MB) CALC. SAMPLE 3 OF REC. FORMAT

| ±α | 0 | 3 | 3.75 | 4 | 4.3 | 4.5 | 5 % |
|---|---|---|---|---|---|---|---|
| 1:1 ROT. SPEED 1 (FORMAT GAP G3 IN LAST SEC.) | | | | | | | |
| ALLOW. HIGH ROT. TIME | | 97 | 98.44 | 99.01 | 99.59 | 100.02 | 101.02 % |
| ALLOW. HIGH ROT. No. (100+β)% | | 103.09 | 101.58 | 101 | 100.41 | 99.98 | 98.99 % |
| 2:1 ROT. SPEED 2 (FORMAT GAP G3 OF 1 BYTE IN LAST SEC.) | | | | | | | |
| ALLOW. HIGH ROT. TIME | | 96.53 | 97.91 | 98.46 | 99.02 | 99.43 | 100.39 % |
| ALLOW. HIGH ROT. No. (100+β)% | | 103.59 | 102.13 | 101.56 | 100.99 | 100.57 | 99.61 % |
| PRE-W. GAP FOR LOW SPEED FORMAT. | | | | | | | |
| (Gap 0) | 39.3 | 553.58 | 687.17 | 732.17 | 786.48 | 822.87 | 914.53 Bytes |
| TOTAL PRE-W. GAP | | | | | | | |
| G0+G4 | 1513.97 | 1092.25 | 985.84 | 934.84 | 893.15 | 857.54 | 781.2 Bytes |
| G0+G4 INTEGER | 1514 | 1093 | 986 | 935 | 894 | 858 | 782 Bytes |
| G0+G4+G3 | 1555 | 1171 | 1075 | 1027 | 989 | 957 | 887 Bytes |
| | | | | | | | |
| REMAIN. PRE-W. GAP AT NORMAL ROT. | | | | | | | |
| | | | | | | | |
| REMAIN. RATIO 1:G3 IN LAST SEC. IS W. LATER | | | | | | | |
| A=G4/(G0+G4) | | 49.3 | 30.3 | 21.7 | 11.9 | 4 | -17 % |
| B=G4/Btk | | 3.2 | 1.8 | 1.2 | 0.6 | 0.2 | -0.8 % |
| REMAIN. RATIO 2:G3 IN LAST SEC. IS W. AT FIRST W/G4 | | | | | | | |
| A= (G4+G3) / (G0+G4+G3) | | 52.7 | 36.1 | 28.7 | 20.5 | 14 | -3.1 % |
| B= (G4+G3)/Btk | | 3.7 | 2.3 | 1.8 | 1.2 | 0.8 | -0.2 % |
| A : PRE-W. GAP RATIO, B A1: A TK.BYTE RATIO | | | | | | | |

Fig. 18

44mm FDC (NEW UNFORMAT. CAP. 2MB) CLAC. SAMPLE 4 OF REC. FORMAT
(LEAD. ER., NO INDEX, PRE-W. TK. GAP G4)

| | LEAD. ER. | | | | | | 0.22 mm max. |
|---|---|---|---|---|---|---|---|
| FLUC. OF W. CLK ±γ | 0.1 % | | | | | | 1 μs |
| | | NOM. CLK CYCLE | | | | 133333.3 bits | 450 rpm |
| | | NORMAL ROT. No. | | | | 16666.67 bytes | |
| Erase-on risetime Tr | 0.125 byte length NOM. BIT No./TK. | | | | | | |
| Erase-off falltime Tf | 0.125 byte length NOM. BYTE No./TK. (Btk) | | | | | 0.000636 mm | bpi= 39926.28 |
| INN. TK. R.  r2= | 13.5 mm | | | | | | |
| OUT. TK. R.  r1= | 20.4 mm | NOM. BIT L. AT INN. TK. τ : | | | | | |
| ±α | 0 | 2 | 3 | 3.1 | 3.4 | 3.5 | 4 % |
| (α:FLUC. OF AVE. SPEED IN A SEC. FM NOM. VAL. %) | | | | | | | |
| Gap 1 | 0 | 0 | 0 | 0 | 0 | 0 | 0 Bytes |
| ID | 22 | 22 | 22 | 22 | 22 | 22 | 22 Bytes |
| Gap 2 | 43.4 | 44.3 | 44.7 | 44.7 | 44.9 | 44.9 | 45.1 Bytes |
| G2 INTEGER | 44 | 45 | 45 | 45 | 45 | 45 | 46 Bytes |
| data block | 530 | 530 | 530 | 530 | 530 | 530 | 530 Bytes |
| Gap 3 | 44.7 | 70 | 83 | 84.4 | 88.3 | 89.7 | 96.4 Bytes |
| G3 INTEGER | 45 | 71 | 84 | 85 | 89 | 90 | 97 Bytes |
| No. of Sec. | 24 | 24 | 24 | 24 | 24 | 24 | 24 Sectors |
| Total bytes | 15384 | 16032 | 16344 | 16368 | 16464 | 16488 | 16680 Bytes |
| REMAIN (Gap 4) | 1282.67 | 634.67 | 322.67 | 298.67 | 202.67 | 178.67 | -13.33 Bytes |

Fig. 19

44mm FDC (NEW UNFORMAT. CAP. 2MB) CALC. SAMPLE 4 OF REC. FORMAT

| ±α | 0 | 2 | 3 | 3.1 | 3.4 | 3.5 | 4 % |
|---|---|---|---|---|---|---|---|
| 1:1 ROT. SPEED 1 (FORMAT GAP G3 IN LAST SEC.) | | | | | | | |
| ALLOW. HIGH ROT. TIME | | 96.45 | 98.32 | 98.46 | 99.03 | 99.18 | 100.33 % |
| ALLOW. HIGH ROT. No. (100+β) % | | 103.68 | 101.71 | 101.56 | 100.98 | 100.83 | 99.67 % |
| 2:1 ROT. SPEED 2 (FORMAT GAP G3 OF 1 BYTE IN LAST SEC.) | | | | | | | |
| ALLOW. HIGH ROT. TIME | | 96.03 | 97.82 | 97.96 | 98.51 | 98.64 | 99.75 % |
| ALLOW. HIGH ROT. No. (100+β) % | | 104.13 | 102.23 | 102.08 | 101.51 | 101.38 | 100.25 % |
| PRE-W. GAP FOR LOW SPEED FORMAT. | | | | | | | |
| (Gap 0) | 43.23 | 382.5 | 557.39 | 575.08 | 628.37 | 646.2 | 735.94 Bytes |
| TOTAL PRE-W. GAP | | | | | | | |
| G0+G4 | 1325.9 | 1017.17 | 880.06 | 873.75 | 831.04 | 824.87 | 722.61 Bytes |
| G0+G4 INTEGER | 1326 | 1018 | 881 | 874 | _832_ | 825 | 723 Bytes |
| G0+G4+G3 | 1371 | 1088 | 964 | 959 | _920_ | 915 | 820 Bytes |

REMAIN. PRE-W. GAP AT NORMAL ROT.

| | | | | | | | |
|---|---|---|---|---|---|---|---|
| REMAIN. RATIO 1: G3 IN LAST SEC. IS W. LATER | | | | | | | |
| A=G4/(G0+G4) | | 62.3 | 36.6 | 34.2 | _24.4_ | 21.7 | -1.8 % |
| B=G4/Btk | | 3.8 | 1.9 | 1.8 | _1.2_ | 1.1 | -0.1 % |
| REMAIN. RATIO 2: G3 IN LAST SEC. IS W. AT FIRST W/G4 | | | | | | | |
| A=(G4+G3)/(G0+G4+G3) | | 64.9 | 42.2 | 40 | _31.7_ | 29.4 | 10.2 % |
| B=(G4+G3)/Btk | | 4.2 | 2.4 | 2.3 | _1.7_ | 1.6 | 0.5 % |

A : PRE-W. GAP RATIO, B : A1A TK. BYTE RATIO

Fig. 20 RELATED ART

44mm FDC (NEW UNFORMAT. CAP. 2MB) CALC. SAMPLE OF REC. FORMAT
(HARD INDEX OF RELATED ART)

*LEAD ER.* Head E-R/W DISTANCE d    0.16 mm max.

| FLUC. OF W.CLK ±γ | 0.1 % | | NOM. CLK CYCLE | 133333.333 bits | | 1 μs |
|---|---|---|---|---|---|---|
| | | | NORMAL ROT. No. | | | 450 rpm |
| Erase-on risetime Tr | 0.125 byte length | | NOM. BIT No./TK. | 16666.6667 bytes | | |
| Erase-off falltime Tf | 0.125 byte length | | NOM. BYTE No./TK. (Btk) | | | bpi = 39926.2771 |
| INN. TK. R.  r 2= | 13.5 mm | | NOM. BIT L. AT INN. TK. τ: 0.00063617 mm | | | |
| OUT. TK. R.  r 1= | 20.4 mm | | | | | |

| ±α | 0 | 2 | 3 | 4 | 4.55 | 5 | 5.5 % |
|---|---|---|---|---|---|---|---|
| Gap 1 | 146 | 146 | 146 | 146 | 146 | 146 | 146 Bytes |
| ID | 22 | 22 | 22 | 22 | 22 | 22 | 22 Bytes |
| Gap 2 | 31.6 | 32.2 | 32.5 | 32.9 | 33 | 33.2 | 33.3 Bytes |
| G2 INTEGER | 32 | 33 | 33 | 33 | 34 | 34 | 34 Bytes |
| data block | 530 | 530 | 530 | 530 | 530 | 530 | 530 Bytes |
| Gap 3 | 32.9 | 57.2 | 69.7 | 82.5 | 89.8 | 95.7 | 102.3 Bytes |
| G3 INTEGER | 33 | 58 | 70 | 83 | 90 | 96 | 103 Bytes |
| Sector No. | 24 | 24 | 24 | 24 | 24 | 24 | 24 Sectors |
| Total bytes | 14954 | 15578 | 15866 | 16178 | 16370 | 16514 | 16682 Bytes |
| REMAIN. (Gap 4) | 1712.67 | 1088.67 | 800.67 | 488.67 | 296.67 | 152.67 | -15.33 Bytes |

1 ROT. TIME (ER. CURRENT IS STOPPED AT NEXT INDEX PULSE)
HIGH SPEED (-β)    10.09    6.35    4.62    2.75    1.6    0.74    -0.27 %

NO REST. IN FORMAT. AT LOW SPEED (REC. DENS. IS HIGHER)
*α = FLUC. OF AVE. SPEED IN A SEC. FM NOM. VAL. (%)

Fig. 41 RELATED ART

A COMPARISON OF TYPICAL TRACK FORMATS OF RELATED ART

| TYPE | (NAME)<br>Disk Size | (8in)<br>200mm 2D<br>200.2 | (5.25in)<br>130mm 2D<br>130.2 | (5.25in)<br>130mm 2HD<br>130.2 | (3.5in)<br>90mm 2DD<br>85.8 | (3.5in)<br>90mm 2HD<br>85.8 | (3.5in)<br>90mm 2ED<br>85.8 | (4in) inch<br>Fig. 39<br>mm |
|---|---|---|---|---|---|---|---|---|
| STANDARD | ISO(/IEC)<br>JIS | IS 7065-2<br>X 6202 | IS 7487-3<br>X 6212 | IS 8630-3<br>X 6213 | IS 8860-2<br>X 6222 | IS 9529-2<br>X 6225 | IS 10994<br>X 6226 | NONE<br>NONE |
| UNFORMAT. CAP. | DISK U (BYTE) | 1,604,167 | 500,000 | 1,666,667 | 1,000,000 | 2,000,000 | 4,000,000 | 358,000 Bytes |
|  | TK. (BYTE) | 10,417 | 6,250 | 10,417 | 6,250 | 12,500 | 25,000 | 9579~6024 Bytes |
|  | FREQ. | 500,000 | 250,000 | 500,000 | 250,000 | 500,000 | 1,000,000 | 666,666 ftps |
|  | ROT. SPEED | 360 | 300 | 360 | 300 | 300 | 300 | 261~415 RPM |
|  | *TK. CAP. (BYTE) = [FREQ. (bit/sec) × ROT. CYCLE TIME] ÷ 8 |  |  |  |  |  |  | (CONSTANT DENS.) |
|  | TK./SIDE | 77 | 40 | 80 | 80 | 80 | 80 | 46 TK. |
|  | No. OF SIDES | 2 | 2 | 2 | 2 | 2 | 2 | 1 SIDES |
|  | REC. METHOD | MFM<br>Tk00s0 IS FM | MFM | MFM | MFM | MFM | MFM | FM |
| FORMAT CAP. | DISK F (BYTE) | 1,178,368 | 368,640 | 1,228,800 | 737,280 | 1,474,560 | 2,949,120 | 263,680 Bytes |
|  | TK. (BYTE) | 7,680 | 4,608 | 7,680 | 4,608 | 9,216 | 18,432 | 4608~7168 Bytes |
|  | SEC. CAP. (BYTE) | 512 | 512 | 512 | 512 | 512 | 512 | 512 Bytes |
|  | SEC./TK. | 15 | 9 | 15 | 9 | 18 | 36 | 9~14 Sectors |
| FORMAT EFF. F/U (%) |  | 73.5 | 73.7 | 73.7 | 73.7 | 73.7 | 73.7 | 73.7 % |

Fig. 42 RELATED ART

A COMPARISON OF TYPICAL TRACK FORMATS OF RELATED ART

| TYPE (NAME) Disk Size | (8in) 200mm 2D 200.2 | (5.25in) 130mm 2D 130.2 | (5.25in) 130mm 2HD 130.2 | (3.5in) 90mm 2DD 85.8 | (3.5in) 90mm 2HD 85.8 | (3.5in) 90mm 2ED 85.8 | (4in) inch Fig. 39 mm |
|---|---|---|---|---|---|---|---|
| Index Gap (Gap 1) | 146 | 146 | 146 | 146 | 146 | 146 | Bytes |
| Address ID | 22 | 22 | 22 | 22 | 22 | 22 | Bytes |
| ID Gap (Gap 2) | 22 | 22 | 22 | 22 | 22 | 41 | Bytes |
| Data Block | 530 | 530 | 530 | 530 | 530 | 530 | Bytes |
| DB Gap (Gap 3) | 84 | 80 | 84 | 78~84 | 101 | 83 | Bytes |
| TOTAL BYTE/TK. | 10016 | 6032 | 10016 | 6014~6068 | 12296 | 24482 | Bytes |
| REMAIN.:Track Gap (Gap 4) | 401 | 218 | 401 | 236~182 | 204 | 518 | Bytes |
| HEAD DISTANCE d(TUNNEL ER.) | 0.9 | 0.9 | 0.8 | 0.7 | 0.7 | | mm |
| DISTANCE d(LEADING ER.) | | | | | | 0.23 | mm |
| ALLOW. AVE. SPEED IN SEC. | | | | | | | |
| CALC. ±α | 3.87 | 3.98 | 2.56 3.38~3.84 | | 2.6 | 3.32 | ± % |
| NOMINAL ±α | 3 | 3.5 | 3 | 2 | 2.5 | 3 | ± % |
| ALLOW. FLUC. IN 1 ROT. | | | | | | | |
| CALC. (HIGH SPEED) −β | 4 | 3.6 | 4 | 3.9~3.0 | 1.7 | 1.92 | HIGH SPEED% |
| NOMINAL (index − index) ±β | | | | | 2 | 1.5 | ± % |
| NOMINAL ISO(/IEC) REF. | IS 7065-2 Fig. 43 | IS 7487-3 Fig. 44 | IS 8630-3 Fig. 45 | IS 8860-2 Fig. 46 | IS 9529-2 Fig. 47 | IS 10994 Fig. 48 | NONE Fig. 39 |

Fig. 43 RELATED ART

200mm FDC (2D:ISO 7065) CALC. OF REC. FORMAT
(TUNNEL ER.HEAD, HARD INDEX, EXCEPT Tk00side0)

| | | | Head E-R/W d | | 0.85 mm min. | | 0.95 mm max. | |
|---|---|---|---|---|---|---|---|---|
| FLUC. OF W.CLK ±γ | | 0.1 % | NOM. CLK CYCLE | | | | 2 μs | |
| | | | NOMINAL ROT.No. | | | | 360 rpm | |
| ROT.ANGLE SPEED | ω | 37.6991118 rad/sec | NOM. BIT No./TK. | | 83333.3333 BIT | | | |
| ANGLE REC. DENS. | b | 13262.9119 bit/rad | NOM BYTE No./TK. (Btk) | | 10416.7 BYTE | | | |
| INN. TK. R. r2= | | 49.421 mm | NOM.BIT L. AT INN.TK. τ2 | | 0.00372626 mm | bpi | 6816.5 | |
| OUT. TK. R. r1= | | 91.753 mm | NOM.BIT L. AT OUT.TK. τ1 | | 0.00691801 mm | bpi | 3671.6 | |
| ±α | | 0 | 1 | 2 | 3 | 3.87 | 4 | 5 | |
| Gap 1 | | 146 | 146 | 146 | 146 | 146 | 146 | 146 | Bytes |
| ID | | 22 | 22 | 22 | 22 | 22 | 22 | 22 | Bytes |
| Gap 2 | | 22 | 22 | 22 | 22 | 22 | 22 | 22 | Bytes |
| Erase-on Delay | | | | | | | | | |
| De1min. | | 510.4 | 515.5 | 520.6 | 525.7 | 530.2 | 530.8 | 535.9 | μs |
| De1max. | | 597.4 | 593.9 | 590.4 | 586.8 | 583.8 | 583.3 | 579.8 | μs |
| Erase-off Delay | | | | | | | | | |
| De2min. | | 510.4 | 515.6 | 520.8 | 526.2 | 531 | 531.7 | 537.3 | μs |
| De2max. | | 561.4 | 567.2 | 572.9 | 578.8 | 584.1 | 584.9 | 591 | (De2×1.1) |
| Data Block | | 530 | 530 | 530 | 530 | 530 | 530 | 530 | Bytes |
| Gap 3 | | 35.1 | 47.3 | 59.8 | 72.6 | 83.9 | 85.6 | 98.9 | Bytes |
| Gap 3 INTEGER | | 36 | 48 | 60 | 73 | 84 | 86 | 99 | Bytes |
| BYTE/SEC. | | 610 | 622 | 634 | 647 | 658 | 660 | 673 | Bytes |
| SEC./TK. | | 15 | 15 | 15 | 15 | 15 | 15 | 15 | Sectors |
| BYTE/TK. | | 9296 | 9476 | 9656 | 9851 | 10016 | 10046 | 10241 | Bytes |
| REMAIN.Gap 4 | | 1120 | 940 | 760 | 565 | 400 | 370 | 175 | Bytes |
| ROT.ACCURACY | | | | | | | | | |
| HIGH SPEED−β | | 12 | 9.9 | 7.9 | 5.7 | 4 | 3.7 | 1.7 | % |
| LOW SPEED+β | | − | − | − | − | − | − | − | % |

Fig. 44 RELATED ART

130mm FDC(2D:ISO 7487-3) CALC. OF REC. FORMAT
(TUNNEL ER. HEAD, HARD INDEX)

| | | | | | | | | |
|---|---|---|---|---|---|---|---|---|
| FLUC. OF W.CLK ±γ | | 0.1 % | | | | 0.85 mm min. | 0.95 mm max. | |
| | | | | | | Head E-R/W d | | |
| | | | | | | NOM. CLK CYCLE | | 4 μs |
| ROT. ANGLE SPEED | ω | 31.4159265 rad/sec | | | | NOM. ROT. No. | | 300 rpm |
| ANGLE REC. DENS. | b | 7957.74715 bit/rad | | | | NOM. BIT No./TK. | | 50000 BIT |
| INN. TK. R. r2= | | 34.396 mm | | | | NOM. BYTE No./TK. (Btk) | | 6250 BYTE |
| OUT. TK. R. r1= | | 57.15 mm | | | | NOM. BIT L. AT INN. TK. τ2 | 0.00432233 mm | bpi |
| | | | | | | NOM. BIT L. AT OUT. TK. τ1 | 0.00718168 mm | bpi |
| ±α | 0 | 1 | 2 | 3 | 3.98 | 4 | 5 % | |
| Gap 1 | 146 | 146 | 146 | 146 | 146 | 146 | 146 Bytes | |
| ID | 22 | 22 | 22 | 22 | 22 | 22 | 22 Bytes | |
| Gap 2 | 22 | 22 | 22 | 22 | 22 | 22 | 22 Bytes | |
| Erase-on Delay | | | | | | | | |
| De1min. | 880 | 888.8 | 897.6 | 906.4 | 915.1 | 915.2 | 924 μs | |
| De1max. | 1176.7 | 1169.7 | 1162.7 | 1155.6 | 1148.7 | 1148.6 | 1141.6 μs | |
| Erase-off Delay | | | | | | | | |
| De2min. | 880 | 888.9 | 898 | 907.3 | 916.5 | 916.7 | 926.4 μs | |
| De2max. | 968 | 977.8 | 987.8 | 998 | 1008.2 | 1008.4 | 1019 (De2×1.1) | |
| Data Block | 530 | 530 | 530 | 530 | 530 | 530 | 530 Bytes | |
| Gap 3 | 30.3 | 42.3 | 54.7 | 67.3 | 79.9 | 80.1 | 93.3 Bytes | |
| Gap 3 INTEGER | 31 | 43 | 55 | 68 | 80 | 81 | 94 Bytes | |
| BYTE/SEC. | 605 | 617 | 629 | 642 | 654 | 655 | 668 Bytes | |
| SEC./TK. | 9 | 9 | 9 | 9 | 9 | 9 | 9 Sectors | |
| BYTE/TK. | 5591 | 5699 | 5807 | 5924 | 6032 | 6041 | 6158 Bytes | |
| REMAIN. Gap 4 | 659 | 551 | 443 | 326 | 218 | 209 | 92 Bytes | |
| 1 ROT. ACCURACY | | | | | | | | |
| HIGH SPEED-β | 11.8 | 9.7 | 7.6 | 5.5 | 3.6 | 3.5 | 1.5 % | |
| LOW SPEED+β | — | — | — | — | — | — | — % | |

Fig. 45 RELATED ART

130mm FDC (2HD:ISO 8630-3) CALC. OF REC. FORMAT
(TUNNEL ER. HEAD, HARD INDEX)

| | | | 0 | 1 | 2 | 2.56 | 3 | 4 | |
|---|---|---|---|---|---|---|---|---|---|
| FLUC. OF W.CLK ±γ | | | 0.1 % | | | | | 0.85 mm min. | 0.95 mm max. |
| ROT. ANGLE SPEED | ω | | 37.6991118 rad/sec | | | | | | 2 μs |
| ANGLE REC. DENS. | b | | 13262.9119 bit/rad | | | | | | 360 rpm |
| INN. TK. R.   r2= | | | 34.131 mm | | | | 83333.3333 BIT | | 9870.1 |
| OUT. TK. R.   r1= | | | 57.15 mm | | | | 10416.7 BYTE | | 5894.6 |
| ±α | | | | | | | | | |
| | | | | | | | | | |
| | | | | | | | | | |
| | | | | | | | | | |
| Head E-R/W d | | | | | | | | | |
| NOM. CLK CYCLE | | | | | | | | | |
| NOM. ROT. No. | | | | | | | | | |
| NOM. BIT No./TK. | | | | | | | | | |
| NOM. BYTE No./TK. (Btk) | | | | | | | | | |
| NOM. BIT L. AT INN. TK. τ2 | | | | | | 0.00257342 mm bpi | | | |
| NOM. BIT L. AT OUT. TK. τ1 | | | | | | 0.00430901 mm bpi | | | 5 % |
| Gap 1 | | | 146 | 146 | 146 | | 146 | 146 | 146 Bytes |
| ID | | | 22 | 22 | 22 | | 22 | 22 | 22 Bytes |
| Gap 2 | | | 22 | 22 | 22 | | 22 | 22 | 22 Bytes |
| Erase-on Delay | | | | | | | | | |
| De1min. | | | 739.1 | 746.4 | 753.8 | | 761.2 | 768.6 | 776 μs |
| De1max. | | | 746.2 | 742.7 | 739.1 | | 735.6 | 732.1 | 728.6 μs |
| Erase-off Delay | | | | | | | | | |
| De2min. | | | 739.1 | 746.5 | 754.1 | | 761.9 | 769.9 | 778 μs |
| De2max. | | | 813 | 821.2 | 829.5 | | 838.1 | 846.9 | 855.8 (De2×1.1) |
| Data Block | | | 530 | 530 | 530 | | 530 | 530 | 530 Bytes |
| Gap 3 | | | 50.8 | 63.5 | 76.5 | | 89.8 | 103.3 | 117.2 Bytes |
| Gap 3 INTEGER | | | 51 | 64 | 77 | | 90 | 104 | 118 Bytes |
| BYTE/SEC. | | | 625 | 638 | 651 | | 664 | 678 | 692 Bytes |
| SEC./TK. | | | 15 | 15 | 15 | | 15 | 15 | 15 Sectors |
| BYTE/TK. | | | 9521 | 9716 | 9911 | | 10106 | 10316 | 10526 Bytes |
| REMAIN. Gap 4 | | | 895 | 700 | 505 | | 310 | 100 | −110 Bytes |
| 1 ROT. ACCURACY | | | | | | | | | |
| HIGH SPEED−β | | | 9.4 | 7.2 | 5.1 | | 3.1 | 1 | −1 % |
| LOW SPEED+β | | | — | — | — | | — | — | — % |

Fig. 46 RELATED ART

90mm FDC (2DD: ISO 8860-2) CALC. OF REC. FORMAT
(TUNNEL ER. HEAD, HARD INDEX)

| | | | | | | | | |
|---|---|---|---|---|---|---|---|---|
| FLUC. OF W. CLK ±γ | | 0.1 % | | | | 0.65 mm min. | | 0.75 mm max. |
| | | | | | Head E-R/W d | | | 4 μs |
| ROT. ANGLE SPEED | ω | 31.4159265 rad/sec | | | NOM. CLK CYCLE | | | 300 rpm |
| ANGLE REC. DENS. | b | 7957.74715 bit/rad | | | NOM. ROT. No. | | | |
| INN. TK. R. r2= | | 23.188 mm | | | NOM. BIT No./TK. | | 50000 BIT | 8716.9 |
| OUT. TK. R. r1= | | 39.5 mm | | | NOM. BYTE No./TK. (Btk) | | 6250 BYTE | 5117.1 |
| | | | | | NOM. BIT L. AT INN. TK. τ2 | 0.00291389 mm | bpi | |
| ±α | | | | | NOM. BIT L. AT OUT. TK. τ1 | 0.00496372 mm | bpi | |
| | | 0 | 1 | 2 | 3.38 | 3.84 | 4 | 5 % |
| Gap 1 | | 146 | 146 | 146 | 146 | 146 | 146 | 146 Bytes |
| ID | | 22 | 22 | 22 | 22 | 22 | 22 | 22 Bytes |
| Gap 2 | | 22 | 22 | 22 | 22 | 22 | 22 | 22 Bytes |
| Erase-on Delay | | | | | | | | |
| De1min. | | 1030.6 | 1040.9 | 1051.2 | 1065.4 | 1070.2 | 1071.8 | 1082.1 μs |
| De1max. | | 1227.1 | 1220.1 | 1213 | 1203.3 | 1200.1 | 1199 | 1191.9 μs |
| Erase-off Delay | | | | | | | | |
| De2min. | | 1030.6 | 1041 | 1051.6 | 1066.6 | 1071.7 | 1073.5 | 1084.8 μs |
| De2max. | | 1133.7 | 1145.1 | 1156.8 | 1173.3 | 1178.9 | 1180.9 | 1193.3 (De2×1.1) |
| Data Block | | 530 | 530 | 530 | 530 | 530 | 530 | 530 Bytes |
| Gap 3 | | 35.4 | 47.7 | 60.2 | 77.9 | 83.9 | 86 | 99.3 Bytes |
| Gap 3 INTEGER | | 36 | 48 | 61 | 78 | 84 | 86 | 100 Bytes |
| BYTE/SEC. | | 610 | 622 | 635 | 652 | 658 | 660 | 674 Bytes |
| SEC./TK. | | 9 | 9 | 9 | 9 | 9 | 9 | 9 Sectors |
| BYTE/TK. | | 5636 | 5744 | 5861 | 6014 | 6068 | 6086 | 6212 Bytes |
| REMAIN. Gap 4 | | 614 | 506 | 389 | 236 | 182 | 164 | 38 Bytes |
| 1 ROT. ACCURACY | | | | | | | | |
| HIGH SPEED−β | | 10.9 | 8.8 | 6.6 | 3.9 | 3 | 2.7 | 0.6 % |
| LOW SPEED+β | | — | — | — | — | — | — | — % |

Fig. 47 RELATED ART

90mm FDC (2HD:ISO/IEC 9529-2) CALC. OF REC. FORMAT
(TUNNEL ER.HEAD, HARD INDEX)

| | | Head E-R/W d | 0.3 mm min. | | 0.7 mm max. * |
|---|---|---|---|---|---|
| FLUC. OF W.CLK ±γ | 0.1 % | NOM. CLK CYCLE | | | 2 μs |
| | | NOM. ROT. No. | | | 300 rpm |
| ROT. ANGLE SPEED ω | 31.4159265 rad/sec | NOM. BIT No./TK. | 100000 BIT | | |
| ANGLE REC. DENS. b | 15915.4943 bit/rad | NOM. BYTE No./TK. (Btk) | 12500 BYTE | | |
| INN. TK. R.  r2= | 23.188 mm | NOM. BIT L.AT INN.TK. τ2 0.00145695 mm bpi | | | 17433.7 |
| OUT. TK. R.  r1= | 39.5 mm | NOM. BIT L.AT OUT.TK. τ1 0.00248186 mm bpi | | | 10234.3 |

| ±α | 0 | 1 | 2 | <u>2.6</u> | 3 | 4 | 5 % |
|---|---|---|---|---|---|---|---|
| Gap 1 | 146 | 146 | 146 | 146 | 146 | 146 | 146 Bytes |
| ID | 22 | 22 | 22 | 22 | 22 | 22 | 22 Bytes |
| Gap 2 | 22 | 22 | 22 | 22 | 22 | 22 | 22 Bytes |
| Erase-on Delay | | | | | | | |
| De1min. | 961.9 | 971.5 | 981.1 | 986.9 | 990.7 | 1000.4 | 1010 μs |
| De1max. | 593.4 | 589.9 | 586.4 | 584.3 | 582.9 | 579.3 | 575.8 μs |
| Erase-off Delay | | | | | | | |
| De2min. | 961.9 | 971.6 | 981.5 | 987.6 | 991.6 | 1002 | 1012.5 μs |
| De2max. | 1058.1 | 1068.8 | 1079.7 | 1086.4 | 1090.8 | 1102.2 | 1113.8 (De2×1.1) |
| Data Block | 530 | 530 | 530 | 530 | 530 | 530 | 530 Bytes |
| Gap 3 | 66.1 | 79.3 | 92.8 | 101 | 106.5 | 120.6 | 135 Bytes |
| Gap 3 INTEGER | 67 | 80 | 93 | 101 | 107 | 121 | 136 Bytes |
| BYTE/SEC. | 641 | 654 | 667 | 675 | 681 | 695 | 710 Bytes |
| SEC./TK. | 18 | 18 | 18 | 18 | 18 | 18 | 18 Sectors |
| BYTE/TK. | 11684 | 11918 | 12152 | 12296 | 12404 | 12656 | 12926 Bytes |
| REMAIN. Gap 4 | 816 | 582 | 348 | 204 | 96 | -156 | -426 Bytes |
| 1 ROT. ACCURACY | — | — | — | — | — | — | — |
| HIGH SPEED-β | 7 | 4.9 | 2.9 | <u>1.7</u> | 0.8 | -1.2 | -3.3 % |
| LOW SPEED+β | — | — | — | — | — | — | — % |

Fig. 48 RELATED ART

90mm FDC (2ED:ISO/IEC 10994, 4MB) CALC. OF REC. FORMAT
(LEAD ER. HEAD, HARD INDEX)

| | | | LEAD ER. | | | | | |
|---|---|---|---|---|---|---|---|---|
| FLUC. OF W. CLK ±γ | | 0.1 % | NOM. CLK CYCLE | | | | | 0.23 mm max. |
| | | | NOM. ROT. No. | | | | | 1 μs |
| | | | NOM. BIT No./TK. | | | 200000 bits | | 300 rpm |
| Erase-on risetime Tr | | 0.125 byte length | NOM. BYTE No./TK. (Btk) | | | 25000 bytes | | |
| Erase-off falltime Tf | | 0.125 byte length | NOM. BIT L. AT INN. TK. τ : 0.000728457 mm bpi= | | | | | 34868.2 |
| INN. TK. R. r2= | | 23.1875 mm | | | | | | |
| OUT. TK. R. r1= | | 39.5 mm | | | | | | |
| ±α | 0 | 1 | 2 | 3 | 3.32 | 4 | | 5 % |
| Gap 1 | 146 | 146 | 146 | 146 | 146 | 146 | | 146 Bytes |
| ID | 22 | 22 | 22 | 22 | 22 | 22 | | 22 Bytes |
| Gap 2 | 39.6 | 40 | 40.4 | 40.8 | 40.9 | 41.2 | | 41.6 Bytes |
| G2 INTEGER | 40 | 41 | 41 | 41 | 41 | 42 | | 42 Bytes |
| data block | 530 | 530 | 530 | 530 | 530 | 530 | | 530 Bytes |
| Gap 3 | 40.9 | 53.3 | 65.9 | 78.8 | 83 | 92 | | 105.4 Bytes |
| G3 INTEGER | 41 | 54 | 66 | 79 | 83 | 93 | | 106 Bytes |
| No. of Sec. | 36 | 36 | 36 | 36 | 36 | 36 | | 36 Sectors |
| Total bytes | 22934 | 23438 | 23870 | 24338 | 24482 | 24878 | | 25346 Bytes |
| REMAIN. (Gap 4) | 2066 | 1562 | 1130 | 662 | 518 | 122 | | -346 Bytes |

1 ROT. TIME (ER. CURRENT IS STOPPED AT NEXT INDEX PULSE)
HIGH SPEED (-β)   8.11   6.09   4.37   2.49   1.92   0.34   -1.53 %

1 ROT. TIME
NO REST. IN FORMAT. AT LOW SPEED (REC. DENS. IS HIGHER)

*α=FLUC. OF AVE. SPEED IN A SEC. FM NOM. VAL. (%)

FORMATTING APPARATUS AND A FLEXIBLE DISK

BACKGROUND OF THE INVENTION

1. Field of the Invention

This invention relates to a formatting apparatus which formats a recording medium such as a disk. Primarily, this invention relates to a flexible disk apparatus and a flexible disk format used for the flexible disk apparatus. Particularly, this invention relates to a formatting (initialization) method for the flexible disk apparatus.

Although a flexible disk is generally called a floppy disk or a diskette, this specification, uses the terms "flexible disk", "Flexible Disk Cartridge (FDC)", which is an official term standardized by JIS (Japanese Industrial Standard) and ISO (International Organization for Standardization)/IEC (International Electrotechnical Commission), or simply "disk".

2. Description of the Related Art

A flexible disk apparatus according to the related art is illustrated in FIG. 33.

In FIG. 33, a flexible disk 34 and a disk cartridge 35 are set in a flexible disk drive (FDD) 91. The flexible disk 34 is rotated by a spindle motor 33. A head 36 formats the flexible disk 34 and accesses data from the flexible disk 34. The head 36 is positioned by a positioning step motor 32. The head 36 writes data on the flexible disk 34 in accordance with a write command from a write amplifier 30 and reads data from the flexible disk 34 in accordance with a read command from a read amplifier 31.

In FIG. 33, a controlling circuit 90 controls the FDD 91. The controlling circuit 90 includes a controller 80a which controls an operation of each unit in the FDD 91. The controller 80a formats the flexible disk 34 based on format information received from a computer 21. The controller 80a receives a track position and data from the computer 21 and controls the FDD 91 to write the data on the flexible disk 34. The controller 80a also receives the track position from the computer 21, reads data at the track position, and sends the data to the computer. The controller 80a performs write signal modulation, read signal modulation, switching of the head for read/write, transmitting a positioning pulse to the positioning step motor 32, and generating an ON/OFF signal to the spindle motor to format the flexible disk and read/write the data.

An index pulse is outputted from the spindle motor 33 to the controller 80a. The controller 80a receives the index pulse and formats the flexible disk 34.

In a flexible disk apparatus according to the related art, a formatting (initialization) operation, which provides a constant number of recording sectors in one disk rotation, is performed for each track. Normally, a sensor which generates a pulse at a specific angle position of the disk is provided. An index pulse generated by the sensor triggers formatting of each track. After a necessary number of sectors are provided by formatting, a gap code (track gap G4) is written until an index pulse after one disk rotation is detected. Due to this gap code, even if the disk rotates slower or faster than an allowable rotation speed range, a space is not generated in the one disk rotation and a first sector format is not damaged by being written over when a last sector is formatted.

A track position signal is often written magnetically on a large capacity flexible disk or a hard disk as a servo track during production in order to ensure track position accuracy for high density reading/writing. The servo signal is sometimes recorded in a space between sectors on a data recording surface. In that case, the sectors are also formatted based on the servo signal, i.e., a sector servo signal.

However, servo information used to position a track and a sector is not used to position a head for some recording mediums such as a normal capacity flexible disk. Reading from or writing to a recording medium such as a normal capacity flexible disk can be performed by predetermining the size and positions of recording sectors by formatting (initialization). The disk is formatted by a flexible disk apparatus for read/write before the disk is used. Alternatively, the disk is formatted during production and is sold in formatted form.

A flexible disk format used commonly is standardized by JIS, ISO, etc., for example, as follows:

a format of a double-sided, double density flexible disk with a diameter of 200 mm (8 inch) (1.6 MB):JIS X 6202, ISO7065-2, a format B of a double-sided, high density flexible disk with a diameter of 130 mm (5.25 inch) (1.6 MB):JIS X 6213, ISO8630-3, a format B of a flexible, high density disk with a diameter of 90 mm (3.5 inch) (2 MB):JIS X 6225, ISO/IEC9529-2, and a format of a high density medium with a diameter of 90 mm (3.5 inch) (4 MB):JIS X 6226, ISO/IEC10994.

With reference to FIG. 34, the format B of the high density flexible disk with a diameter of 90 mm (90 mm FDC) with a pre-formatting nominal capacity of 2.0 MB is discussed as an example.

The high density flexible disk with a diameter of 90 mm for 2 MB (90 mm 2 MB FDC) has 80 tracks respectively on each of two surfaces. Each track has 18 sectors, each having a data recording capacity of 512 bytes. Formats for the double-sided, double density flexible disk with a diameter of 200 mm (200 mm FDC) and the double-sided, double density flexible disk with a diameter of 130 mm (130 mm FDC) are the same as the format of the 90 mm 2 MB FDC except for a number of sectors in a track, which is 16 for the 200 mm FDC and the 130 mm FDC. A format for the high density flexible disk with a diameter of 90 mm for 4 MB (90 mm 4 MB FDC) is almost the same as the format for the 90 mm 2 MB FDC except for the number of sectors in a track, which is 32 for the 90 mm 4 MB FDC, and the length of a sector identifier gap (41 bytes), which is longer than that needed for the 90 mm 2 MB FDC.

As shown in FIG. 34, formatting of each track is triggered by an index pulse. After formatting is triggered, an index gap G1, a sector identifier (ID), an ID gap G2, a data block and a data block gap G3 in a first sector, a sector identifier (ID), an ID gap G2, a data block and a data block gap G3 in a second sector, . . . , a sector identifier (ID), an ID gap G2, a data block, and a data block gap G3 in a last sector are written on the disk. Then, the track gap G4 is written until an index pulse after one disk rotation is detected.

When a track formatting is completed, formatting of a track with a same track number on another recording surface or a track in a next cylinder begins. When all tracks (all cylinders) on the disk are formatted, formatting is complete.

When data is written on the formatted disk, or the data stored on the disk is updated, a sector identifier (ID) indicating an address is read, and only a data block in an addressed sector is updated.

Each of the gaps functions as follows;

the index gap G1: a constant angle position on a disk or a spindle motor is detected by a sensor and an index pulse is generated for every disk rotation. In order to absorb instability of the angle position due to jitter (instability of a time position) of the index pulse, a gap signal of 146 bytes according to a standard, a code "4E" in this example, is written continuously as the index gap G1 just after formatting of a track is started in response to the index pulse. When the track formatting is completed by detecting a next index pulse after one disk rotation, even if the next index pulse is delayed, only part of the index gap G1 is deleted. Hence, an ID field of the sector identifier (ID) in the first sector is not damaged.

Some kind of a controller LSI (Large-Scaled Integrated Circuit) skips to read recorded content for a constant time after an index pulse of the apparatus is generated. Therefore, the index gap G1 of this length is also necessary to absorb errors (in a position at which the index pulse is generated) caused by a difference in apparatuses.

The ID gap G2 and the data block gap G3: when data is written or updated on a formatted disk, a sector identifier (ID) of a sector is read. When the sector having an address to which the data should be written is detected based on the sector identifier (ID), the magnetic head is switched to a write mode in a period between the sector identifier (ID) and the data block, and the data is written only in a field of the data block. The ID gap G2 is provided for the switching period between the sector identifier (ID) and the data block.

Additionally, erasing bands are provided on both sides of the data field of the data block so that old data is removed.

A magnetic head according to a tunnel erasing method is illustrated in FIG. 37.

In FIG. 37, a rotation line speed v of a track, a minimum line speed $v_{min}$ and a maximum line speed $v_{max}$ are shown.

In the magnetic head according to the tunnel erasing method, an erasing (E) gap is behind a read/write (R/W) gap by a constant distance d. Therefore, when data is written, an erasing current which is transmitted to the E gap is raised after a constant time after a write current transmitted to the R/W gap is raised so that sufficient erasing bands are provided on both sides of the data field from starting and the ID field of the sector is not damaged. If the erasing current is transmitted to the E gap at the same time data update begins, the E gap might be in the ID field and contents of the ID field might be damaged. Therefore, as shown in FIG. 37, a delay time (Erase-on delay, De1) for raising the erasing current is provided and the erasing current is raised in a period of the ID gap G2, which is after the E gap passes the ID field and before the E gap reaches a data block start point. A sufficient ID gap G2 length is necessary to absorb a difference in rotation line speeds at an inner track and an outer track on the disk and an error in a leading edge. In this example, the ID gap G2 is determined to have 22 bytes.

When the data block data has been updated, the E gap remains in the data block. Therefore, a delay time to complete erasing is provided and sufficient erasing bands are provided on both sides of the data field. As shown in FIG. 37, the E gap legs behind by the distance d when the update of the R/W gap has been completed. Hence, a delay time (Erase-off delay, De2) for lowering the erasing current is provided to complete erasing on both sides of the data field. The difference in the rotation line speeds at the inner track and the outer track and the difference in the delay time are absorbed in the ID gap G2 and the data block gap G3.

When a data block which is formatted by a FDD with a lower rotation speed is updated by a FDD with a higher rotation speed, data block length (distance in a track) becomes longer and an ID field of a next sector might be damaged. However, when data block gap G3 length is long, a difference in rotation speeds between formatting and writing data in the data block can be absorbed. In a standardized data block gap G3 with a length of 84 bytes for 512 bytes/sector with a length of 84 bytes, an average speed fluctuation (difference) in a sector of ±3% can be absorbed. However, the allowable range depends on the distance d which is a function of the structure size of the head. Hence, when the disk becomes smaller, the allowable fluctuation range becomes smaller (refer to FIG. 41 which will be discussed later).

The track gap G4: after the index gap G1 and a nominal number of sectors (each including the sector identifier (ID), the ID gap G2, the data block and the data block gap G3) are written in accordance with an index pulse, the track gap G4 is written until an index pulse after one disk rotation is detected. The gap code "4E" is written in the track gap G4. When the index pulse after one disk rotation is detected, track gap G4 writing is complete and track formatting is complete.

As shown in FIGS. 35 and 36, the number of bytes in the track gap G4 differs according to the disk rotation speed during formatting. Even if the disk rotation speed increases, the last sector is not damaged during formatting as long as the track gap G4 is provided.

For 90 mm 2 HD 2 MB FDC, i.e. high density FDC with a diameter of 90 mm for 2 MB, A Number of Bytes in a Track excluding a Number of Bytes of the Track Gap G4
=Index gap G1+(Sector Identifier (ID)+ID Gap G2+Data Block+Data Block Gap G3)×a number of sectors
=146+(22+22+530+101)×18
=12296 bytes.

The number of bytes in the track excluding the number of bytes of the track gap G4 is 204 bytes more than a nominal number of bytes, 12500, a nominal rotation number and a nominal bit speed. Hence, 204 bytes is track gap G4 length. As illustrated in FIG. 35, for high speed rotation with approximately 1.6% less cycle time per rotation, the track gap is reduced by approximately 200 bytes (12500 bytes× 1.6%). However, the track gap G4 of approximately 4 bytes (204 bytes–200 bytes) can still be provided. Consequently, a high speed rotation of approximately 1.6% less rotation cycle can occur during formatting.

As illustrated in FIG. 36, when formatting is performed during a low speed rotation with a low rotation cycle, i.e., a longer cycle time per rotation, recording density becomes higher and the power output during reading decreases. However, a format is not damaged during formatting or during writing and updating.

The index pulse: as stated above, for the flexible disk according to the related art, the index pulse is generated by the sensor provided in the FDD. The index pulse triggers formatting for each track. Formatting of each track is completed by detecting the index pulse after one disk rotation.

Therefore, even if one rotation cycle time of the disk or a write signal frequency fluctuates, the formatting starting and ending positions for one disk rotation do not overlap, thereby ensures that the track is not written over. Further, a space is not generated between the formatting starting and ending positions in one disk rotation. Hence, old data which may cause a malfunction is removed.

The index pulse is detected by the FDD and transmitted to the controlling circuit of the FDD as illustrated in FIG. 33. When the controlling circuit of the FDD is instructed to format by the computer, track formatting is started with the index pulse. When an index pulse after one disk rotation is detected, formatting is stopped and tracks are switched.

For example, for the 90 mm FDC, a highly permeable material is set on a side of the spindle motor at a position in a constant angle with the disk. The index pulse is detected as an electric pulse by a magnetic sensor which does not touch the highly permeable material.

For the 200 mm FDC and 130 mm FDC, a hole on the disk is detected by an optical sensor in the FDD.

Data is read from/written to a formatted disk based on a sector identifier (ID). Therefore, normally, the index pulse is only used for formatting.

The formatting for the 90 mm 4 MB FDC is same as the format of the 90 mm 2 MB FDC except that the 90 mm 4 MB FDC has tracks which each includes 36 sectors, each sector having a recording capacity of 512 bytes. Since the 90 mm 4 MB FDC is a flexible disk covered with a barium ferrite high density magnetic material, a read/write head using a leading erasing method as shown in FIG. 38 is used. Therefore, the length of the ID gap G2 and data block gap G3 and a timing to transmit an erasing current during writing are different from the case shown in FIG. 37. However, in both FDCs, each gap is provided to maintain a connection space during writing or updating.

For a large capacity flexible disk or a hard disk, a track position signal is magnetically written as a servo track during production to ensure high density track position accuracy. In some cases, the servo signal is recorded in a space between sectors on a data recording surface. Generally, when the servo signal is recorded between the sectors on the data recording surface, sectors are formatted based on the servo signal, i.e., the sector servo signal.

However, when the servo signal is recorded on only a surface of a plurality of disks or the servo signal is not recorded magnetically, e.g., optically, the servo signal does not relate to a magnetic data record. In that case, sectors for recording the data are formatted based on the index pulse which is generated according to a mechanical position in a disk rotation. Then, tracks are formatted in a constant pattern using a similar method as that described for the flexible disk.

A sample of a track format for a disk which is illustrated in "The Newest Floppy disk apparatus and its application method" (Shoji Takahashi, 1st edition published on Jun. 10, 1984, pp. 112, 113) is illustrated in FIG. 39. The track format illustrated in FIG. 39 is explained as follows.

Each sector of the track format includes a DID (diskette ID), a LID (Logical ID), data, and gaps (G1–G3) between each two sectors.

The gap G1 corresponds to a preamble and a post-amble in a format according to a related art. The gap G1 is a buffer for a rotation fluctuation during initialization. Since an index signal is not used, the gap G3 in a last sector is written over the gap G1 which is first written. The number of bytes in gap G1 is different for each track. In the DID, a sync. (synchronous signal), an address mark, a diskette ID number, a track number, a block (sector) number, a RL (Record Length) which shows a data length of a data field, and a checking CRC (Cyclic Redundancy Check) are recorded.

In the LID, the same information as for the DID, except a diskette ID number is recorded.

In FIG. 39, the disk does not have an index hole. Therefore, a timing to start track formatting is not controlled.

A procedure for achieving the track format illustrated in FIG. 39 is discussed.

In a first disk rotation, the DID is written in a track. In a second disk rotation, the LID is written in the track. When the LID is written, the DID is referred to. In a third disk rotation, the data is written in the track. When the data is written, the LID is referred to.

Accordingly, the formatting illustrated in FIG. 39 is performed in three disk rotations including writing the data. Formatting without writing data requires at least two disk rotations. Therefore, two or more connections of recording signals exist in a track.

Another track format example is illustrated in FIG. 40.

In FIG. 40, 1st to 16th sectors are formatted in a non-sequential order. The consecutively numbering sectors are separated to provide a waiting time, for example, between the first and second sectors when the first and second sectors are accessed consecutively. If the first and second sectors are placed next to each other, after the first sector is accessed, the second sector must be accessed after one disk rotation. However, due to the skewed layout illustrated in FIG. 40, the second sector can be accessed immediately after the first sector is accessed without waiting for one disk rotation. Hence, data can be accessed from the disk at high speed.

In FIGS. 41 and 42, track formats according to the related art are compared. In FIGS. 43–48, examples of format calculations in the formatting method according to the related art are shown.

In FIG. 41, an unformatted capacity U, a formatted capacity F, etc. of a standardized disk according to the related art are shown. The ratio of formatted capacity F to unformatted capacity U is the format efficiency rate F/U. The format efficiency rate, i.e., a usage efficiency rate, of the track formats according to the related art is 73.5%–73.7%.

The number of bytes in each element on the standardized disk according to the related art is shown in FIG. 42. In FIG. 42, a fluctuation ($\alpha\%$) of an average speed in a sector from a nominal value and a fluctuation ($\beta\%$) of one rotation speed are also shown.

A nominal allowable fluctuation value of the average speed in the sector is 2%–3.5%. However, a range of 2.56%–3.98% is allowable. An allowable range of fluctuation in one rotation speed is 1.7%–4% on the high speed side.

Specifically, the number of bytes and allowable fluctuation values differ according to a distance between an erase gap and a R/W gap of the head, an accuracy of a write clock frequency, a leading edge of a write current, a trailing edge of a write current, a leading edge of an erasing current, and a trailing edge of an erasing current. Therefore, examples are shown in FIGS. 41 and 42 and FIGS. 43–48 which are discussed below.

In FIGS. 43–48, formats for standardized disks according to the related art as shown in FIGS. 41 and 42 are calculated as follows. Since calculation methods in FIGS. 43–48 are the same, the calculation method discussed below with reference to FIG. 43 applies also to FIGS. 44–48.

In FIG. 43, a so-called hard index method in which a magnetic head of a tunnel erasing method and an index pulse of an index sensor are used. Values of the distance d between the E gap and the R/W gap, the frequency of the write clock, the nominal clock frequency, a nominal rotation number, a rotation angle speed, an angle recording density, a nominal unformatted bit number in a track (nominal number of bits in a track), a nominal unformatted byte number in a track (nominal number of bytes in a track), an inner track radius, an outer track radius, a nominal bit length at the most inner track, a nominal bit length at the outer track, a bit recording density at the inner track, and a bit recording density at the outer track are shown in FIG. 43. In FIG. 43, a calculation of a number of bytes in each element is shown for each case with an average speed fluctuation (α) of ±0%, ±1%, ±2%, ±3.87%, ±4% and ±5% in a sector from a nominal value.

Nominal values and calculated values for α=±3% are discussed as follows.

The index gap G1 has 146 bytes and the sector identifier (ID) has 22 bytes. The ID gap G2 has 22 bytes. The data block has 512 bytes for recording a data and 530 bytes for writing a synchronous code and an error check code. When α=±3%, the data block gap G3 needs at least 73 bytes.

When the number of bytes of the sector identifier (ID), the ID gap G2, the data block, and the data block gap G3 are accumulated, a number of bytes for a sector is 647 bytes.

According to this standard, there are 15 sectors in a track. Therefore, a track needs a capacity of 647×15+146=9851 bytes. Since the nominal number of bytes in a track is 10416 bytes, a difference of 565 bytes from the necessary number of bytes remains as the track gap G4. A value obtained by dividing the track gap G4 length of 565 bytes with the number of bytes in a track of 10416 bytes is an allowable value one rotation speed fluctuation. In this example, a value which is 565 bytes/10416 bytes×100=5.4% less is allowable. It is 100/(100−5.4)=+5.7% in a rotation number.

In FIG. 43, values for α=±3.87% correspond to a format standardized by JIS and ISO. These values are shown in FIG. 42. In FIGS. 43–48, underlined values are maximum values which are applicable for a disk format standardized by JIS and ISO. These values are also shown in FIG. 42. Values of Erase-on Delay De1 and Erase-off Delay are necessary erasing delay time to enter the ID gap G2 (22 bytes).

Recently, a micro-FDD which can be set in a type 2 slot with a thickness of 5 mm of a PC card interface, such as a JEIDA/PCMCIA (Japan Electronic Industry Development Association/Personal Computer Memory Card International Association) card has been developed. A micro-FDC with a disk diameter of approximately 44 mm which can be set in the micro-FDD has been also developed. Both the micro-FDD and the micro-FDC have limited space. Therefore, it is difficult to set a sensor for generating an index pulse as in the FDD and FDC according to the related art.

When it is difficult to set an index sensor in a reduced-sized flexible disk apparatus, formatting may be performed from an arbitrary position in a constant number of bytes without an index pulse as shown in FIG. 39.

When disk rotation speed decreases or write signal frequency increases, formatting is completed before one disk rotation. Even so, a space is not generated and an old sector identifier (ID) is removed according to the case shown in FIG. 39.

However, when disk rotation speed becomes higher, a first sector might be damaged by being written over before a data block gap G3 in a last sector is written. When longer lengths of the ID gap G2 and the data block gap G3 are provided to absorb speed fluctuation caused by a short cycle of a spindle motor, the possibility of damaging a first sector when writing of a last sector increases, which may cause a malfunction.

As stated above, the formatting method shown in FIG. 39 requires at least two disk rotations. Therefore, formatting takes a long time.

Data accessing can be performed at high speed using the format as illustrated in FIG. 40. A skewed sector layout in FIG. 40 improves the efficiency for accessing consecutive track sectors. It is also necessary to improve data accessing speed in different tracks. The format illustrated in FIG. 37, however, cannot improve the data accessing speed in the different tracks.

SUMMARY OF THE INVENTION

This invention provides a formatting apparatus which does not rely on an index pulse which is generated by a hardware sensor. This invention further intends to provide a formatting apparatus with fewer malfunctions and an efficient total formatting time.

When the size of a flexible disk apparatus is reduced, the size of a spindle motor must also be reduced. When the spindle motor becomes smaller, an inertial mass of a rotation system becomes smaller. A configuration of a magnetic pole of the motor becomes simpler, and motor rotation fluctuation increases due to fluctuations in a spindle motor rotation. In order to solve the problem of increased rotation fluctuation due to a smaller spindle motor, this invention functions to absorb the motor rotation fluctuation, i.e., disk rotation fluctuation, using an appropriate disk formatting method.

According to the related art, each gap is provided to absorb fluctuation of 2.5% per disk rotation. However, this invention provides a formatting method which is able to absorb a disk rotation fluctuation of more than 2.5% e.g., 4% and 5%.

As stated above, when data block gap G3 length becomes longer in a track format, a larger rotation fluctuation (fluctuation in an average speed in a sector) can be absorbed.

When the data block gap G3 becomes longer, the usage efficiency rate F/U drops, and it becomes impossible to maintain a nominal data recording capacity.

Recently, a FDD which can be set in a type 2 slot of a JEIDA/PCMCIA device of a personal computer and a FDC or a recording medium for the FDD have been developed. A removable FDC which can be inserted in the flexible disk drive which fits in a PCMCIA slot with a width of 54 mm must have a width of 50 mm or less. A magnetic disk which rotates in the FDC has been developed with a diameter of approximately 44 mm. Since the magnetic disk is fixed in the flexible disk apparatus, a disk with a maximum diameter of approximately 48 mm can be used.

This invention intends to provide a format which absorbs large disk rotation fluctuations (fluctuation of an average speed in a sector) without lowering the usage efficiency rate F/U.

The method proposed by this invention is appropriate for formatting the 90 mm FDC, etc. by a new flexible disk apparatus with a large capacity besides a method of formatting based on a sector servo signal.

According to one aspect of this invention, an apparatus writes a track format on a recording medium. The track format has a data recording section made up of a plurality of sectors, each having a sector data block gap at the end thereof. The track format further has a track gap between a last sector and a first sector of the data recording section. The formatting apparatus includes a gap write unit for writing a sector data block gap in the last sector of the data recording section and for writing the track gap next to the sector data block gap of the last sector. The sector data block gap in the last sector and the track gap together form a pre-writing gap (pre-written gap). The formatting apparatus further includes a data writing unit for writing the data recording section starting at the end of the pre-writing gap after the gap write unit writes the pre-writing gap.

According to another aspect of this invention, an apparatus for writing a track format on a recording medium includes a head for writing a track format on the recording medium, a head moving unit for moving the head, a head positioning detecting unit for detecting a completion of movement of the head by the head moving unit to the track to be formatted, and a format starting unit for initiating writing of the track format when the head positioning detecting unit detects that the movement of the head is complete.

According to another aspect of this invention, a flexible disk includes a recording surface, and a plurality of formatted tracks written on the recording surface, each formatted track having a connection position at the end point of formatting. Among the plurality of formatted tracks, a connection position exists for almost every flexible disk rotation angle.

According to another aspect of this invention, an apparatus for formatting a recording medium based on a pulse in a disk rotation includes a spindle motor for rotating the recording medium and generating a pulse corresponding to a rotation angle position, a pulse counter for counting a number of pulses corresponding to the rotation angle position, a pseudo-index pulse generating unit for generating a pseudo-index pulse based on the counting result of the pulse counter, and a format unit for writing a track format on the recording medium in accordance with the pseudo-index pulse generated by the pseudo-index pulse generating unit.

According to another aspect of this invention, a track format is written on a recording medium. The written track format has a data recording section made up of a plurality of sectors each having a sector data block gap at the end thereof. The written track format further has a track gap between a last and a first sector of the data recording section. The method includes the steps of writing a sector data block gap for the last sector of the data recording section, writing the track gap adjacent to the sector data block gap of the last sector, the sector data block gap for the last sector and the track gap together forming a pre-writing gap, and writing the data recording section following the pre-writing gap.

According to another aspect of this invention, a track format is written on a recording medium using a head. The method includes the steps of sending a signal to the head to move to a specified track to be formatted, moving the head to the specified track, detecting the completion of head movement to the specified track, and initiating a former writing operation for the track when the detecting step determines that head movement is complete.

According to another aspect of this invention, a track format is written on a recording medium rotated by a spindle motor. The method includes the steps of rotating the recording medium with the spindle motor, generating pulses corresponding to rotation angle positions of the spindle motor, counting a number of pulses generated by the pulse generating step, generating a pseudo-index pulse based on the result of the counting step, and writing a track format on the recording medium in accordance with the pseudo-index pulse generated by the pseudo-index generating step.

Further scope of applicability of the present invention will become apparent from the detailed description give hereinafter. However, it should be understood that the detailed description and specific examples, while indicating preferred embodiments of the invention, are give by way of illustration only, since various changes and modifications within the spirit and scope of the invention will become apparent to those skilled in the art from this detailed description.

Other objects features, and advantages of the invention will be apparent from the following description when taken in conjunction with the accompany drawings.

BRIEF EXPLANATION OF THE DRAWINGS

The present invention will become more fully understood from the detailed description give hereinbelow and the accompanying drawings which are give by way of illustration only, and thus are not limitative of the present invention, and wherein:

FIG. 9 shows a comparison chart of formatting time according to this invention;

FIG. 10 shows samples 1–4 of format calculations according to this invention;

FIG. 11 shows samples 1–4 of format calculations according to this invention;

FIG. 12 shows actual format calculations in sample 1 according to this invention;

FIG. 13 shows actual format calculations in sample 1 according to this invention;

FIG. 14 shows actual format calculations in sample 2 according to this invention;

FIG. 15 shows actual format calculations in sample 2 according to this invention;

FIG. 16 shows actual format calculations in sample 3 according to this invention;

FIG. 17 shows actual format calculations in sample 3 according to this invention;

FIG. 18 shows actual format calculations in sample 4 according to this invention;

FIG. 19 shows actual format calculations in sample 4 according to this invention;

FIG. 20 shows examples of format ratios according to a hard index method;

FIG. 41 shows a comparison diagram of a track format according to the related art;

FIG. 42 shows a comparison diagram of a track format according to the related art;

FIG. 43 shows sample calculations of a track format according to the related art;

FIG. 44 shows sample calculations of a track format according to the related art;

FIG. 45 shows sample calculations of a track format according to the related art;

FIG. 46 shows sample calculations of a track format according to the related art;

FIG. 47 shows sample calculations of a track format according to the related art; and FIG. 48 shows sample calculations of a track format according to the related art.

DESCRIPTION OF THE PREFERRED EMBODIMENTS

Embodiment 1.

Figure 1:
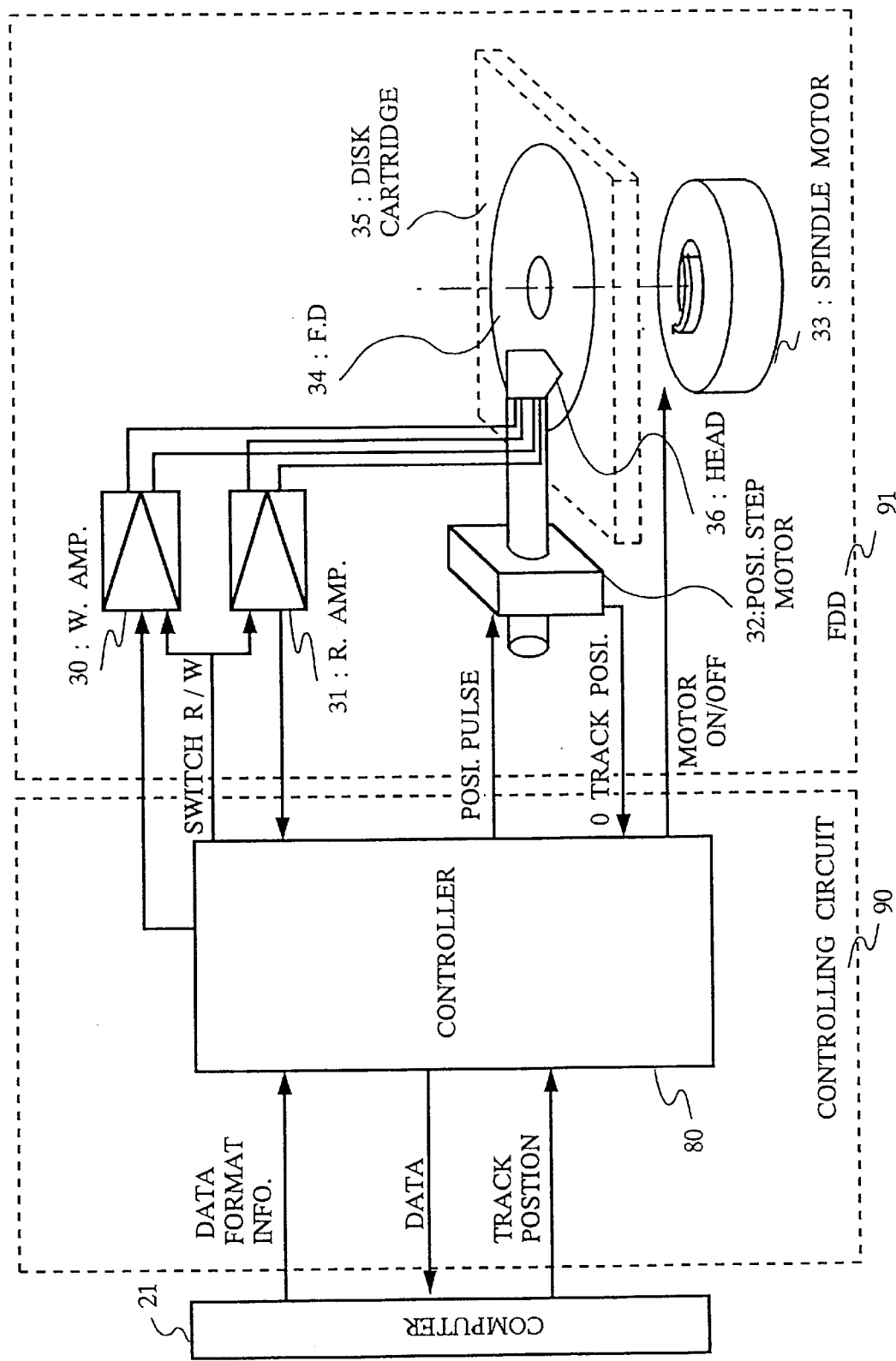
FIG. 1 illustrates a FDD and a controlling circuit according to this invention in which each track formatting is started and ended without using an index pulse.

A configuration of a formatting apparatus according to this invention is illustrated in FIG. 1.

In FIG. 1, the FDD 91 is illustrated. The flexible disk 34 and the disk cartridge 35 are set in the FDD 91. The flexible disk 34 is rotated by the spindle motor 33. Flexible disk formatting and data accessing are performed via the head 36. The head 36 is positioned by the positioning step motor 32. The head 36 writes data on the flexible disk 34 in accordance with write command from the write amplifier 30 and reads data from flexible disk 34 in accordance with a read command from the read amplifier 31.

In FIG. 1, the controlling circuit 90 controls the FDD 91. The controlling circuit 90 includes a controller 80 which controls an operation of each unit in the FDD 91. The controller 80 formats the flexible disk 34 based on format information received from the computer 21. The controller 80 receives a track position and data from the computer 21 and controls the FDD 91 to write the data on the flexible disk 34. The controller 80 reads data at a track position received from the computer 21 and sends the data to the computer. In the controller 80, write signal modulation, read signal demodulation, switching of the head for read/write, generating a positioning pulse for the positioning step motor 32, generating a signal for turning the spindle motor ON/OFF, etc. are performed and flexible disk formatting as well as data read/write are performed.

Significantly, in FIG. 1, an index pulse is not outputted from the spindle motor 33 to the controller 80 and thus controller 80 formats the flexible disk 34 without receiving an index pulse.

The apparatus illustrated in FIG. 1 is a flexible disk apparatus. However, an apparatus specialized for disk initialization may be used in this embodiment.

Figure 2:
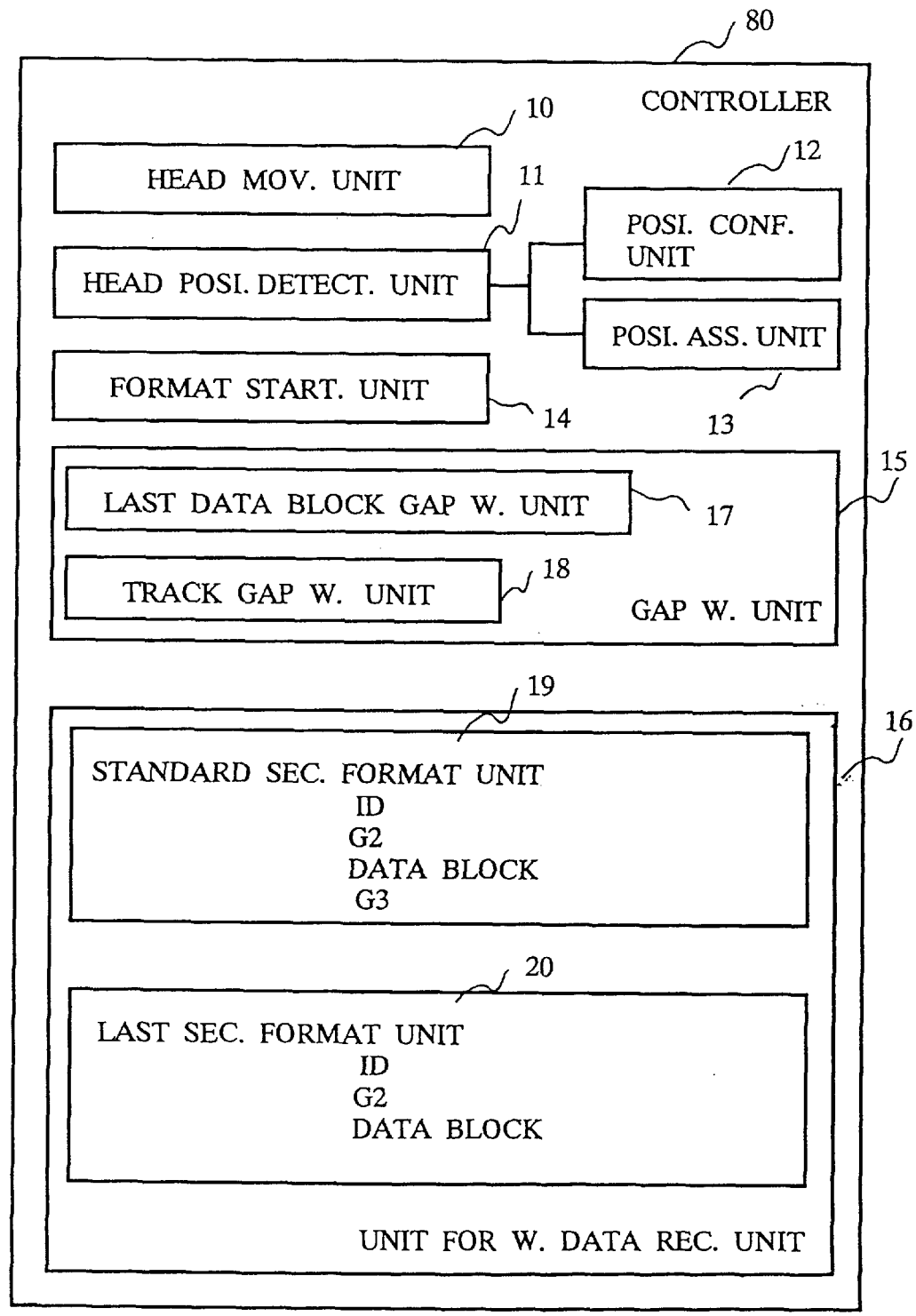
FIG. 2 shows an internal block chart of a controller according to this invention.

An internal block chart of the controller 80 is shown in FIG. 2.

A format according to this embodiment is discussed in detail later. It is assumed that a plurality of sectors exist in a track, each including a data block gap at the end. A data recording section includes the plurality of sectors. A track gap exists between a beginning and an end of the data recording section and a track format in a closed loop is configured.

In FIG. 2, a head moving unit 10 moves the head and a head positioning detecting unit 11 detects when head movement is complete. A positioning confirming unit 12 includes a sensor which confirms that the head is positioned at a track in which the track format should be written. A positioning assuming unit 13 assumes that the head is positioned at a track in which the track format should be written after a constant time has passed after the head starts moving. After the head positioning detecting unit 11 detects that head positioning is completed, a format starting unit 14 signals gap write unit 15 to write the track format. Gap write unit 15 writes a data block gap in a last sector of the data recording section and a track gap consecutively. A unit 16 for writing the data recording section writes the data recording section beside the data block gap in the last sector after the gap write unit 15 writes the data block gap in the last sector of the data recording section and the track gap. A last data block gap write unit 17 writes a data block gap in the last sector of the data recording section before the track gap. A track gap write unit 18 writes a track gap which is longer than a track gap with a nominal length which should exist between the beginning and the end of the data recording section. A standard sector formatting unit 19 writes a data block gap at the end of each sector. A last sector formatting unit 20 does not write a data block gap at the end of the last sector of the data recording section. Each unit may be configured by an LSI (Large Scaled Integrated circuit). Alternatively, an operation of each unit may be performed by a processor and a software routine stored in memory.

Formatting at a standard rotation speed is discussed with reference to FIG. 3.

A plurality of tracks written on a disk form a plurality of concentric circles with different radii. For the purpose of explanation, a track is illustrated as a spiral to distinguish a writing starting point and a writing ending point. However, each track is actually a circle.

Figure 4:
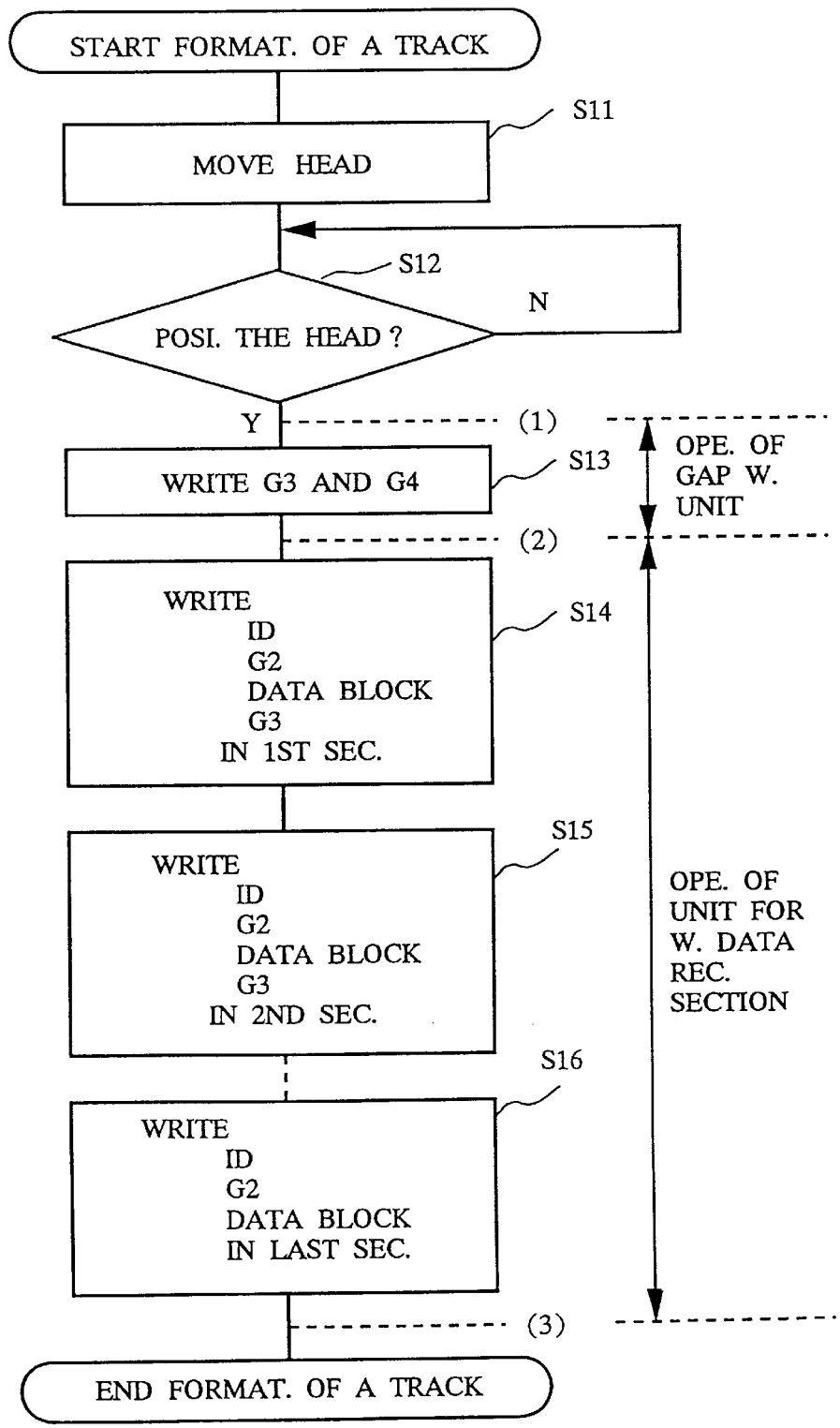
FIG. 4 shows a flow chart for formatting without using the index pulse according to this invention.

A flow chart for formatting is shown in FIG. 4.

The head moving unit 10 moves a magnetic head to a track which is to be formatted (step S11). The head positioning detecting unit 11 checks if the head is positioned correctly and stably at the track (step S12). When the head positioning detecting unit 11 confirms that head movement is completed, the format starting unit 14 puts the gap write unit 15 into operation and starts formatting. Formatting of each track is performed without relying on an index pulse. When the magnetic head is positioned correctly at an addressed track, track formatting can be performed from any angle position, e.g., start point (1). The last data block gap write unit 17 and the track gap write unit 18 in the gap write unit 15 write a gap code, e.g., "4E", for a total number of bytes of the data block gap G3 in the last sector and the track gap G4 first (step S13). Then, the standard sector formatting unit 19 writes a sector identifier (ID) of a first sector, an ID gap G2, a first data block, and a data block gap G3 in the first sector, an ID of a second sector, ... sequentially from point (2) (steps S14, S15). Finally, the last sector formatting unit 20 writes a sector identifier (ID) of the last sector, an ID gap G2, and a last data block in the last sector sequentially (step S16). Since the data block gap G3 in the last sector is written first, the last sector formatting unit 20 does not write the data block gap G3 in the last sector. Hence, formatting is completed at end point (3) of the last data block.

The track gap G4 with a sufficient length for absorbing a fluctuation in one rotation cycle is written first. Therefore, a number of bytes written from the start point (1) to end point (3) exceeds a standard unformatted track capacity. When the last data block is written at the end of formatting, a beginning part of the track gap G4 is written over and thus erased. Since the data block gap G3 in the last sector and the track gap G4 are written consecutively by the gap write unit 15, the data block gap G3 in the last sector is erased first. However, since the data block gap G3 and the track gap G4 have the same gap code, e.g., "4E", the data block gap G3 and the track gap G4 are indistinguishable. Therefore, it is possible to interpret that a gap code for a gap length (number of bytes) of the data block gap G3 is always maintained as the data block gap G3 in a gap code which remains between end point (3) of the last data block and point (2) at which the sector identifier (ID) in the first sector is written. Accordingly, the remaining gap code is interpreted as the track gap G4. Hence, it is interpreted that a part of the track gap G4 is written over. Excluding the part of the track gap G4 which is written over, a number of bytes which is equal to the standard unformatted track capacity in a track is written at a standard rotation speed.

Figure 5:
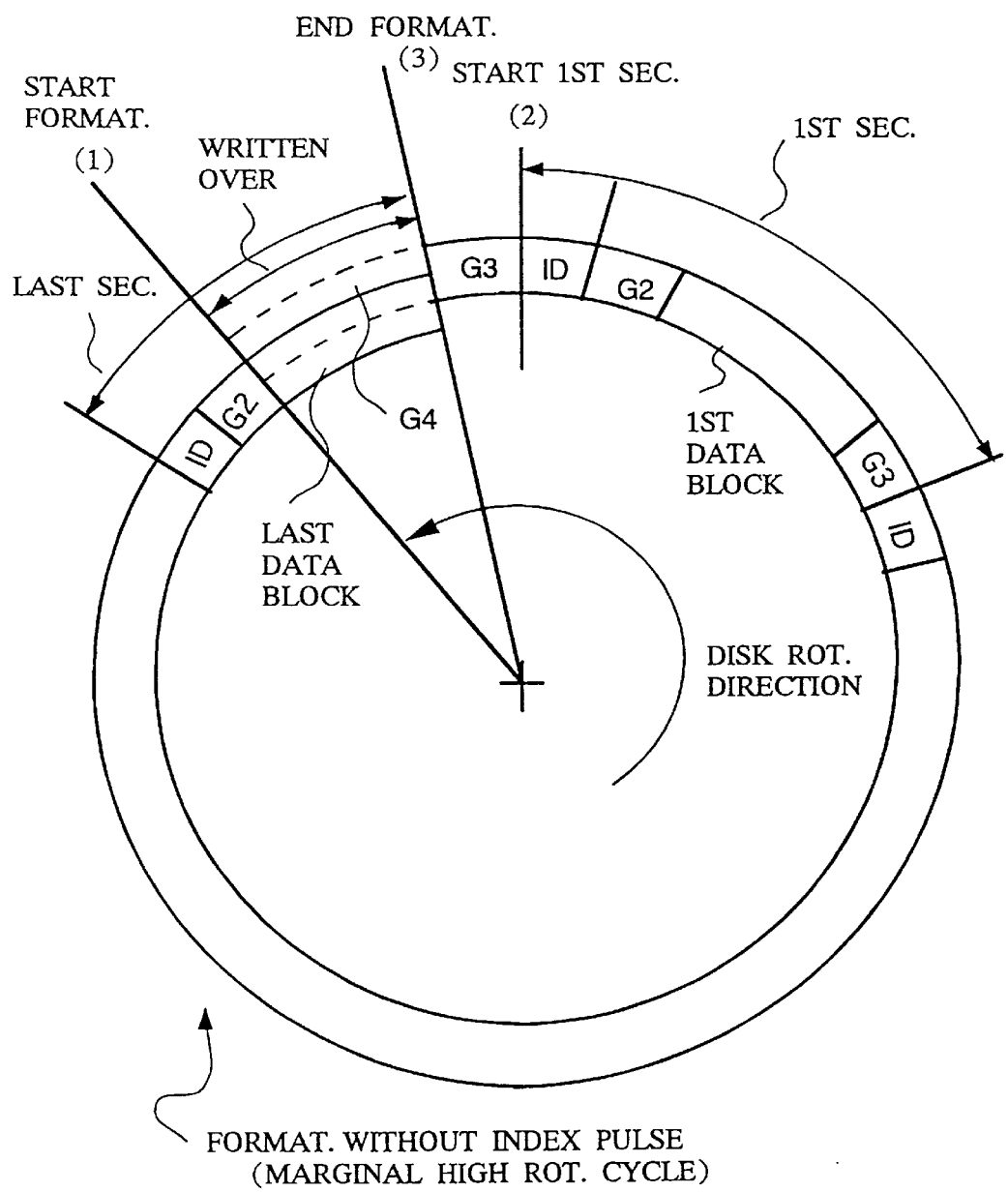
FIG. 5 shows formatting (with a marginal high rotation cycle) without using the index pulse according to this invention.

When a disk rotation cycle at a time of formatting is shorter, i.e., a higher than standard rotation speed, a larger part of a track is written over by the last data block in a marginal high rotation cycle as illustrated in FIG. 5. As illustrated in FIG. 5, when the rotation speed is higher, at least a number of bytes for the data block gap G3 must remain between end point (3) of the last data block and point (2) which is a starting point of the sector identifier (ID) of the first sector which is written first to update data smoothly. When the disk rotation cycle is shorter, a marginal high rotation speed is a speed at which all of track gap G4 which has been written is erased by being written over. Accordingly, formatting at the marginal high rotation speed can occur.

Figure 6:
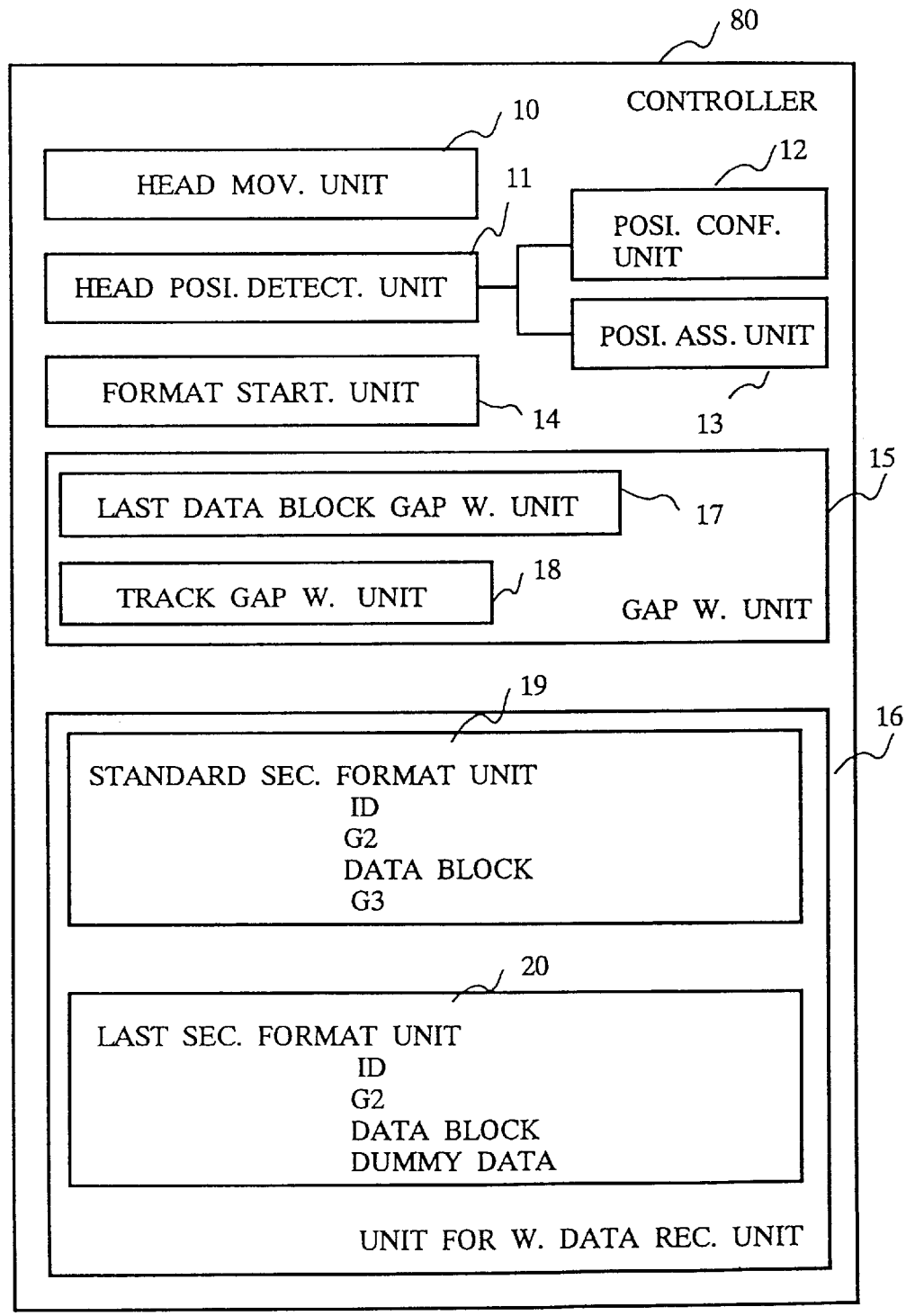
FIG. 6 shows an internal block chart of the controller according to this invention.

A block chart of another configuration of the controller 80 is shown in FIG. 6.

In FIG. 6, the last sector formatting unit 20 writes dummy data, discussed later after the data block. In FIG. 6, the last sector formatting unit 20 writes the dummy data, however, one of the other units of the controller 80 may write the dummy data.

Formatting at a standard rotation speed by the controller 80 in a configuration of FIG. 6 is discussed with reference to FIG. 7.

Figure 3:
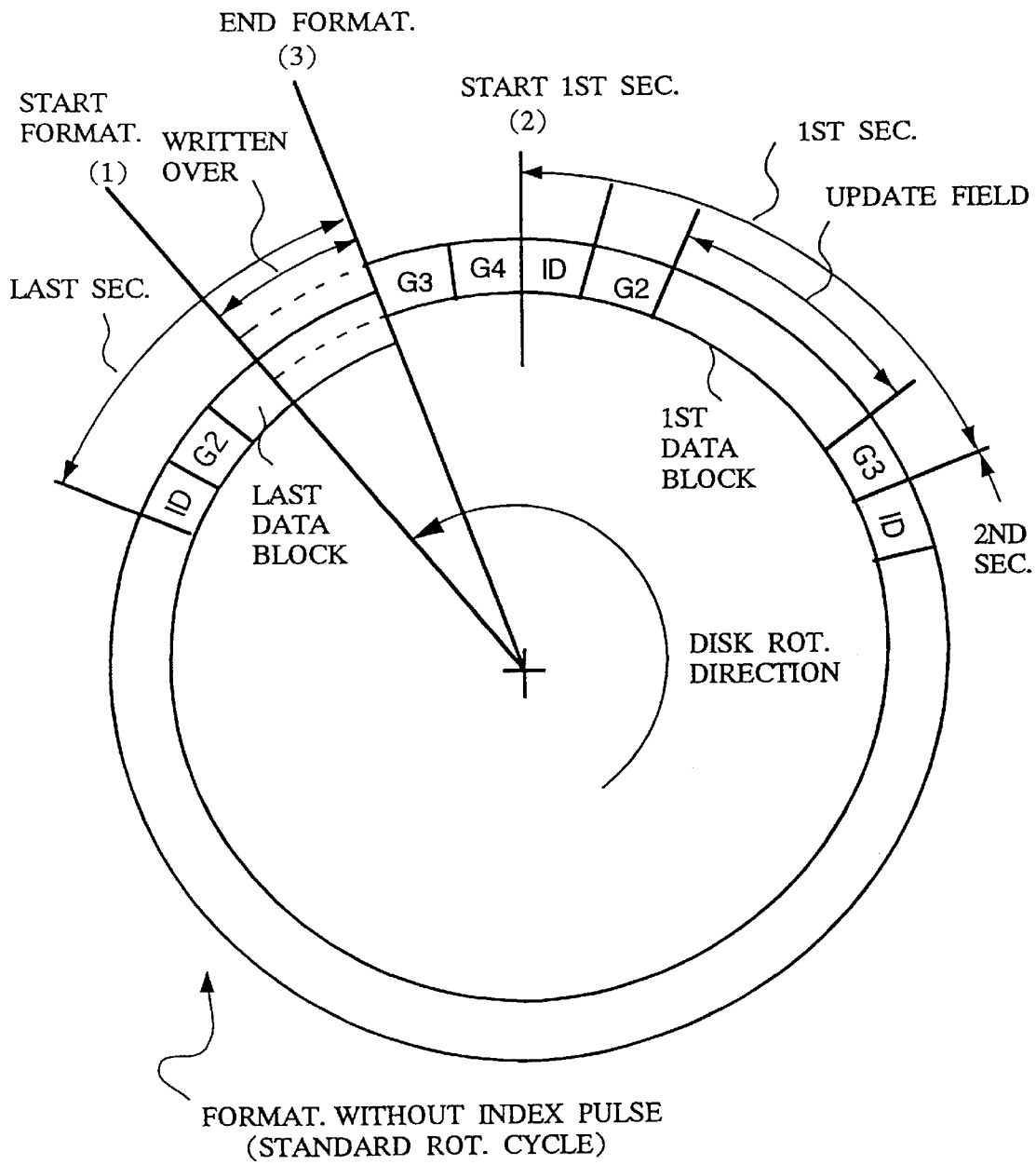
FIG. 3 shows formatting (with a standard rotation cycle) without using the index pulse according to this invention.
Figure 7:
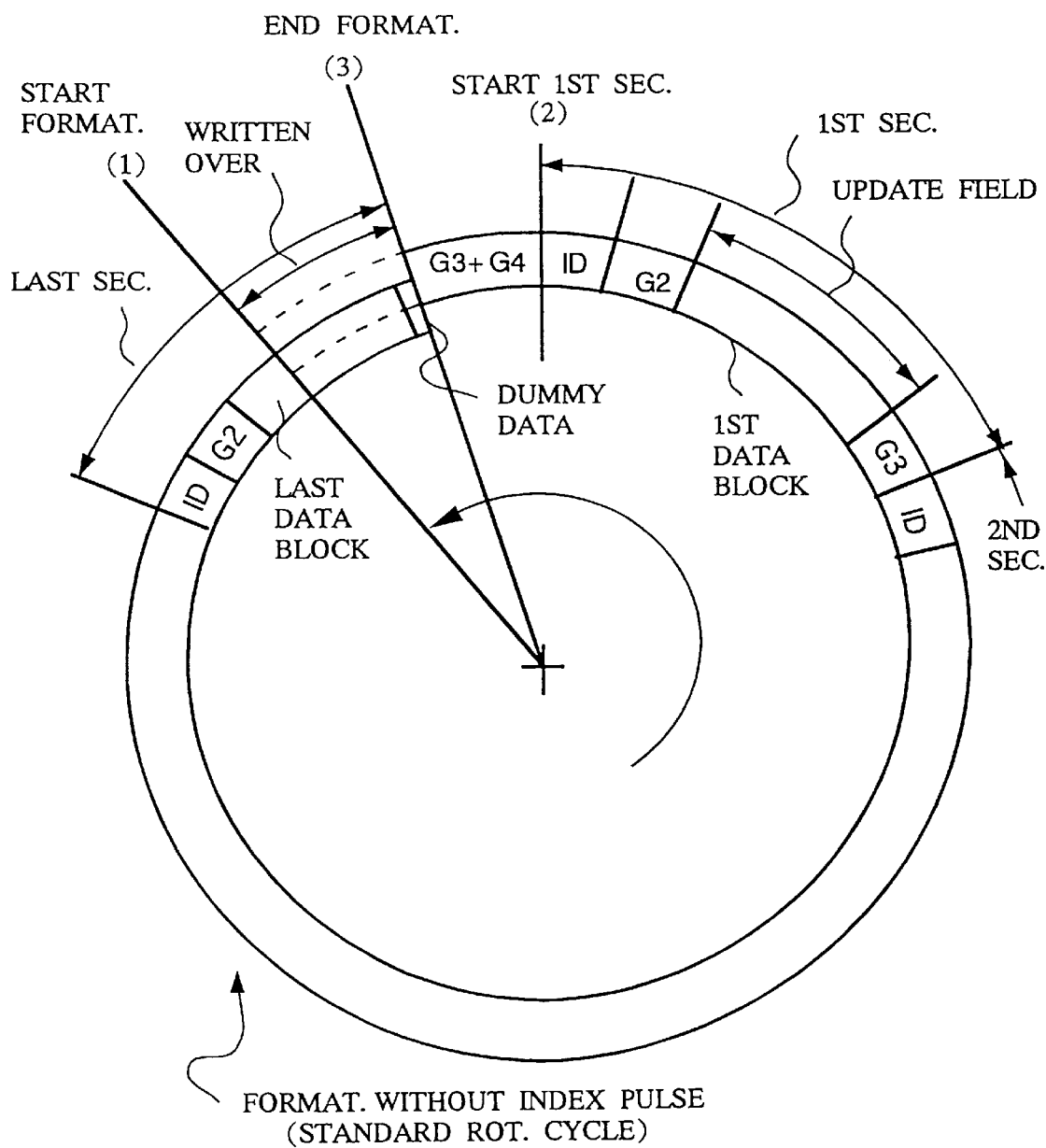
FIG. 7 shows formatting (with a standard rotation cycle) without using the index pulse according to this invention.

In FIG. 7, the dummy data, not shown in FIG. 3, is written after the last data block.

When the data block gap G3 in the last sector is written first and a write current is turned off (dropped), just after the last data block is written, a recording signal at a last bit is influenced by turning off the write current. This might cause a reading error. Therefore, dummy data of at least one bit or approximately one byte is written to prevent this error. In this example, a gap code, e.g., "4E", is written as the dummy data after the last data block. Hence, when written data is checked in the last data block during formatting, a reading error is prevented. Dummy data is also written after a data block in each sector during updating to prevent a reading error.

Figure 8:
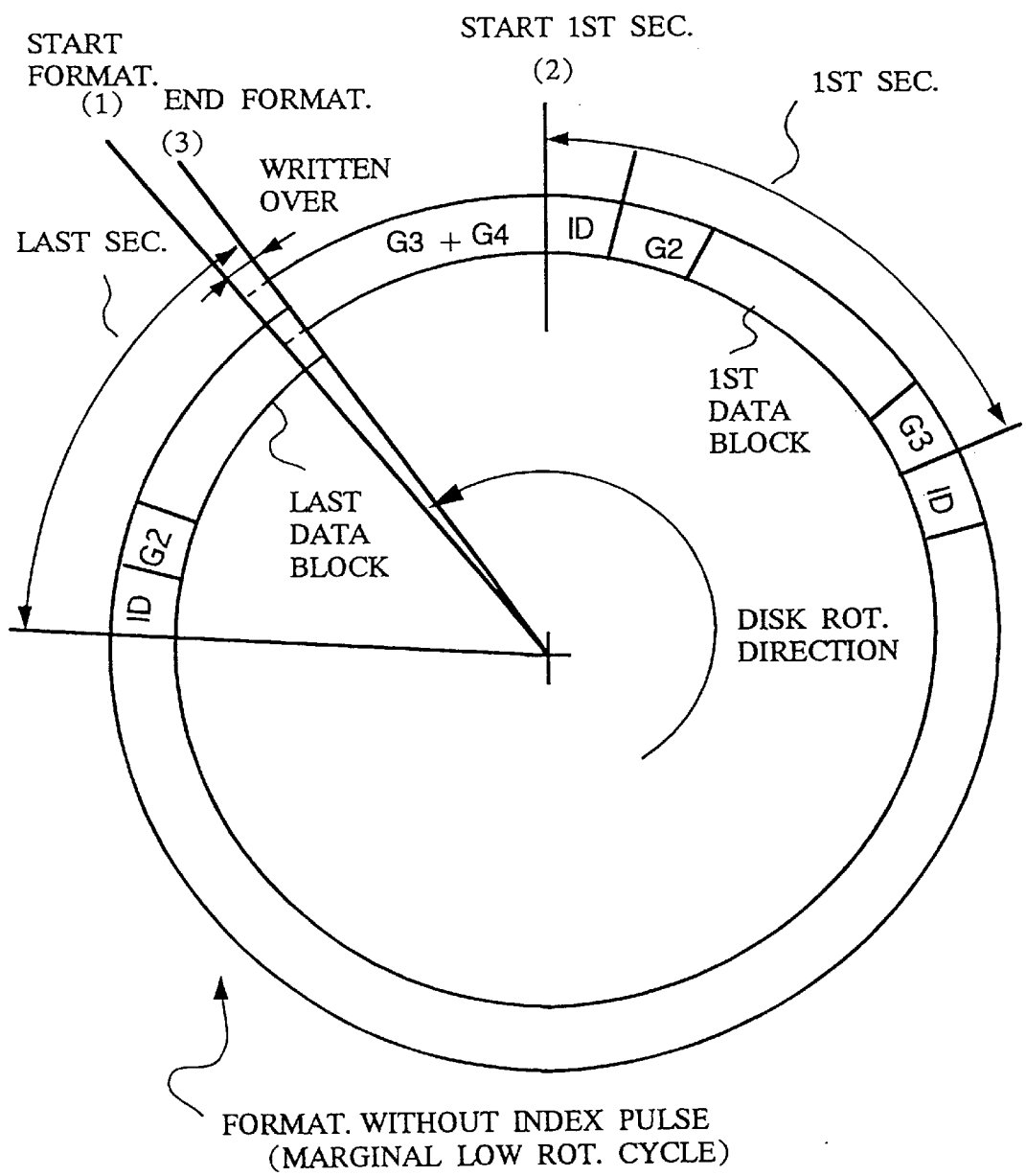
FIG. 8 shows formatting (with a marginal low rotation cycle) without using the index pulse according to this invention.

When a disk rotation cycle during formatting is longer, i.e., a lower than standard rotation speed, a smaller part of the track gap is written over by the last data block in a marginal low speed rotation, as illustrated in FIG. 8. When the rotation speed is lower, start point (1) and end point (3) become closer. However, as longer as a field to be written over exists, an unerased part is not generated. Therefore, formatting can be performed at the low rotation speed.

Accordingly, if a longer track gap G4 is provided, any marginal low rotation speed is allowable during formatting. However, when the marginal low rotation speed becomes lower, recording density becomes higher and a read signal voltage from the head becomes smaller. Hence, a magnetic read/write operation becomes difficult. Therefore, an appropriate accuracy of a rotation cycle, e.g., ±2% normally, is provided by taking a spindle motor condition into consideration. A recording format is determined based on spindle motor accuracy. In this example, it is judged that a rotation cycle fluctuation is not large in a high speed rotation due to an electronic control of the spindle motor rotation speed. Therefore, +1.5% or at most +2% is enough in the high speed rotation and a longer data block gap can be provided in a sector. However, in a low speed rotation, a rotation speed might become lower by a temporary increase in load torque due to disk friction for example. Therefore, approximately −3% is provided in the low speed rotation.

In the above configurations, a distance between an erasing (E) gap provides erasing bands on both sides of a recording track and the read/write (R/W) gap at a first part and at a last part in a write field. Therefore, attention must be paid to the ON/OFF timing of an erasing current and a number of bytes to be provided for each gap during formatting. The tunnel erasing method and the leading erasing method are possible erasing methods used by the magnetic head. A number of bytes to be provided for each gap during formatting differs in each method. For example, even if a new micro-FDC employs the leading erasing method, which is employed by the 90 mm 4 MB FDC, or the tunnel erasing method, which is employed by FDCs with other standards stated earlier, functions of the ID gap G2 and the data block gap G3 are the same and only a method which assigns a number of bytes in each format gap is different.

As stated previously, since an index pulse is not used to format each track, formatting can be started from any rotation angle position on the track. However, when a head is moved to a next track, a constant time, e.g. approximately 18 ms, is necessary to move the head to the next track and stabilize the head after switching a phase current of a positioning step motor. When the head moves across a plurality of tracks, a positioning pulse is transmitted every 3 ms per track. Then, approximately 15 ms is necessary to stabilize a head position after a phase current is switched. Therefore, formatting of a next track is started when 18 ms, for example, passes after a pulse for a last track is transmitted.

When formatting is switched to a track on an opposite side of the same cylinder, it is unnecessary to move the head. Therefore, the waiting time discussed above is unnecessary.

A timing to start track formatting according to this invention and a timing to start track formatting according to the related art are compared in FIG. 9.

As stated earlier, when a track is formatted according to this invention, a field which is slightly longer than one rotation cycle, e.g., 3% is formatted. For example, when one rotation is 133 ms (450 RPM: Relative Per Minute), approximately 4 ms (133 ms×3%=3.99 ms) are realized to format a field exceeding one disk rotation cycle. Hence, 137 ms are necessary to format a track. When track formatting on side 0 of a cylinder and a track on side 1 of a same cylinder is performed before moving to a next cylinder, a time of 137 ms+137 ms+18 ms=292 ms is necessary before starting track formatting in the next cylinder. This means that each cylinder can be formatted in approximately 292 ms.

According to the formatting method based on the related art, cylinder formatting is completed in approximately 133 ms×2=266 ms. Even if head movement to a next cylinder is completed in 18 ms, formatting of the next cylinder cannot be started until a next index pulse is detected. Therefore, a waiting time of approximately one disk rotation (133 ms–18 ms=115 ms) is always generated. Cylinder formatting needs 133 ms×3=399 ms according to the related art. Formatting of all cylinders according to this invention can be completed 27% faster. When a format written in each cylinder is checked after formatting, a time calculation method is slightly different than the above calculation. In any case, the method according to this invention can reduce formatting time.

The controlling circuit 90 controls the FDD to format. According to the related art, formatting of each track is started and ended by detecting an index pulse. However, according to this invention, formatting is started after the head moving unit 10 transmits a positioning pulse to the positioning step motor 32 and the positioning confirming unit 12 detects that the head is stably positioned by a sensor (not illustrated) in the controller 80 illustrated in FIG. 1. Alternatively, formatting is started when the positioning assuming unit 13 counts a constant time, e.g., 18 ms, from a last head positioning pulse in a delay circuit (not illustrated) or a software routine (not illustrated). Formatting of each track is completed when the last sector of the track is formatted. For example, a dummy byte "4E" of one byte is written after the data block in the last sector additionally and a command to end formatting is transmitted to the FDD 91 at the same time. Then, the controller 80 switches the FDD from write to read and moves the head to the next track. The gap write unit 15 generates or stores a gap signal pattern and transmits the pattern to the FDD 91 so that the data block gap G3 in the last sector is written first with the track gap G4 as stated above.

When data is written in a formatted sector or data in the sector is read or updated, a sector identifier (ID) address which is written during formatting is read and a data block of the addressed sector is written, read, or updated. Therefore, an index pulse is unnecessary even if formatting is performed in a method according to the related art. These read, write and update operations are performed almost in the same way for a disk which is formatted by the method according to this invention. A purpose, function, and operation of the ID gap G2 and the data block gap G3 are also the same for the method according to the related art and the method according to this invention.

Figure 40:
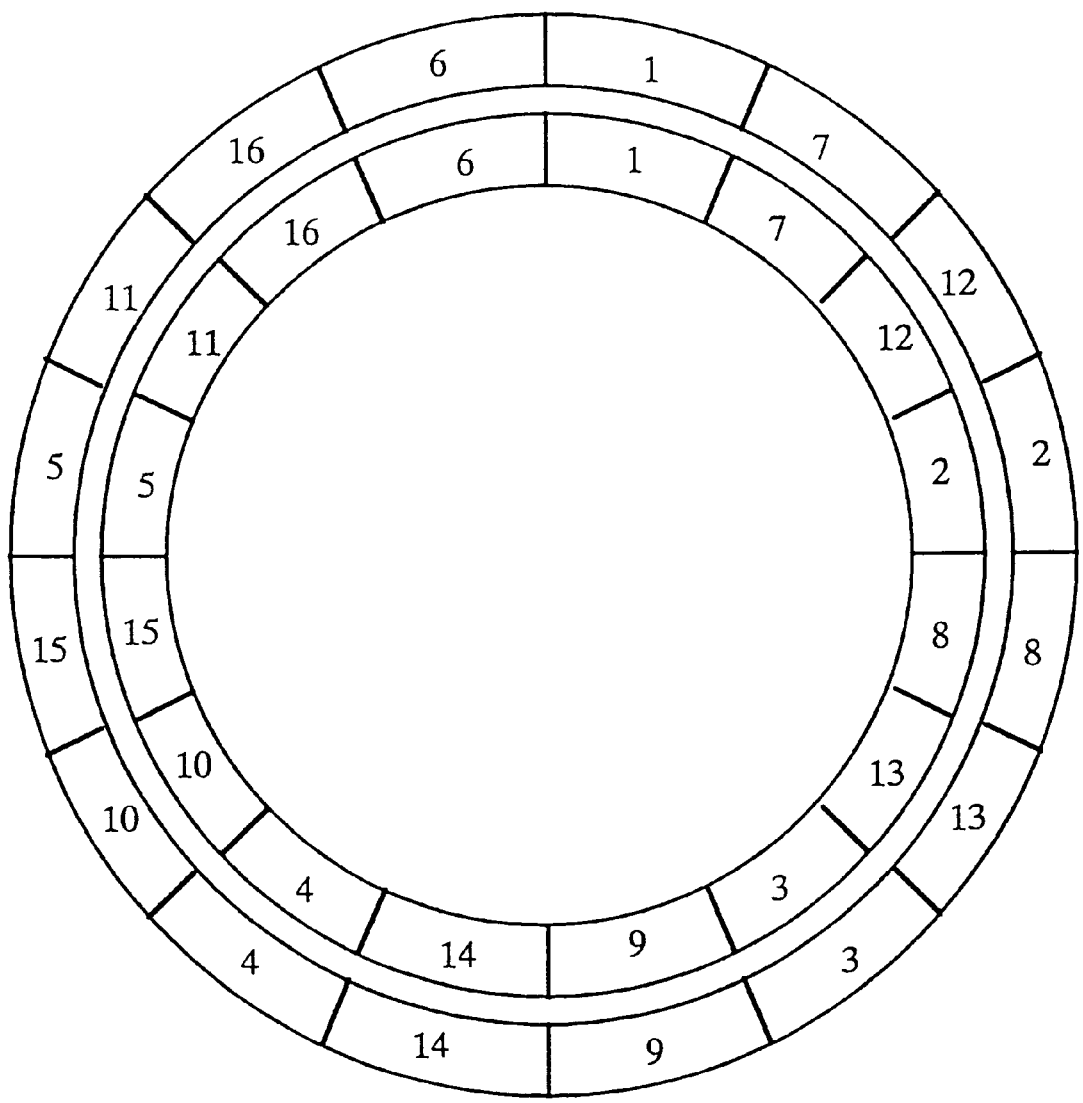
FIG. 40 shows a track format according to the related art.

When data is written in a formatted sector or data in the sector is read or updated in a formatted sector, each operation is started after the positioning confirming unit 12 detects that the head is stably positioned. Alternatively, an operation of accessing in the sector is started after the positioning assuming unit 13 counts a constant time. The head positioning detecting unit 11 increases data accessing speed as well as formatting speed. For formatting according to the related art shown in FIG. 40, data in a track is accessed at high speed. According to formatting in this embodiment, when data is recorded in a plurality of neighboring tracks, accessing in a next track can be performed at high speed.

The method according to this invention can be applied without modification to a disk apparatus with a large capacity in a track servo method according to the related art which performs formatting based on an index pulse instead of a sector servo track signal.

The method according to this invention is different from the method according to the related art illustrated in FIG. 39 as follows.

Figure 39:
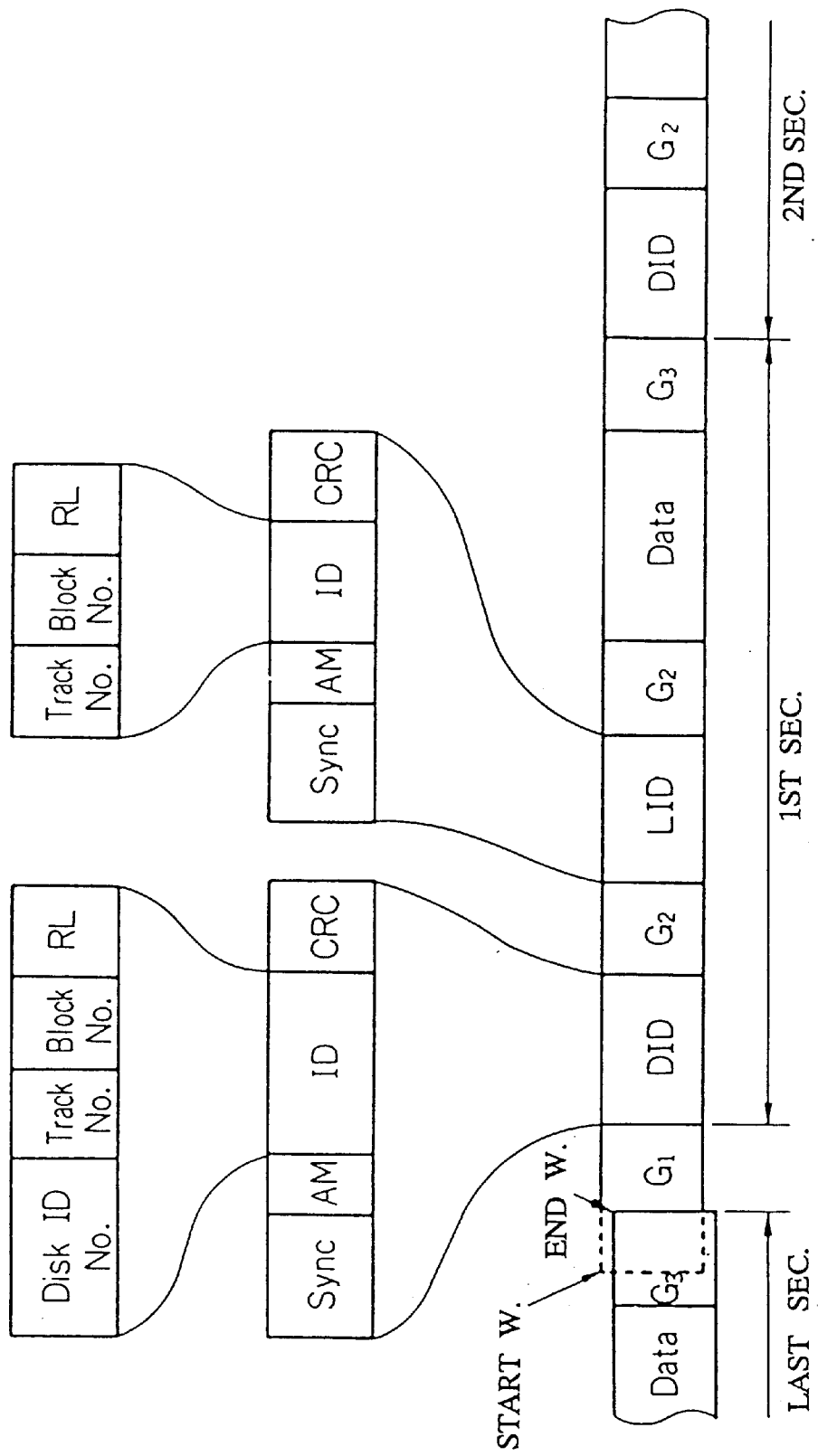
FIG. 39 shows a track format according to the related art.

In the track format in FIG. 39, the data block G3 in the last sector is written just after the last data block. Even if only the track gap G4 is written first and the data block gap G3 in the last sector is written after the last data block is written, a formatting speed is the same as the case shown in FIGS. 2 and 3. However, for the format of FIG. 39, when a rotation speed is even slightly higher than a marginal high rotation cycle, shown in FIG. 5, the sector identifier (ID) header in the first sector might be written over by the data block gap G3 in the last sector. However, according to this invention, since the data block gap G3 in the last sector is written with the track gap G4 first, even if the rotation cycle exceeds the marginal high rotation cycle, only the data block gap G3 is shortened. Hence, the sector identifier (ID) in the first sector is not damaged during formatting. The length of data block gap G3 is provided for the worst condition that data in a sector formatted at a minimum speed is updated at a maximum speed. Since the maximum and minimum speeds in the sector normally exceed an allowable one rotation cycle fluctuation, even if the data block gap G3 is shorter than a nominal length, an error does not necessarily occur.

As stated, since the data block gap G3 in the last sector is not written with the track gap G4 in the method according to the related art, when the disk rotates faster than the marginal high rotation cycle, the sector identifier (ID) in the first sector might be damaged. Hence, the method according to this invention has a distinct advantage over that of the related art.

In the method according to the related art illustrated in FIG. 39, the DID is written in a first disk rotation and the LID is written in a second disk rotation with reference to the DID. The DID is used in place of an index hole in each sector on a hard sector disk according to the related art. The DID configures a soft sector disk. The LID is written when the DID is detected.

According to this invention, an index pulse to indicate one disk rotation unnecessary. Further, neither an index hole to show each sector nor a reference signal, e.g., DID, is necessary. According to this invention, track formatting can be completed in one disk rotation. Therefore, this invention also has an advantage in terms of formatting speed.

Since track formatting can be completed in one disk rotation according to this invention, a connection position of recording signals just after completing formatting exists within some bytes just after the data block gap in the last sector. This is also different from the method according to the related art.

Sample track formats 1–4 according to this invention are shown in FIGS. 10 and 11. Calculations of sample formats 1–4 are shown in FIGS. 12–19. Sample 1 includes sample 1(a) and sample 1(b).

FIG. 10 corresponds to FIG. 41 which shows a track format of a standardized disk according to the related art. In FIG. 10, a format efficiency rate F/U is 73.7%, which is same as a value for a standardized disk according to the related art.

FIG. 11 corresponds to FIG. 42 which shows a number of bytes in each element of a standardized disk according to the related art.

In samples 1–4 in FIG. 11, an average speed fluctuation α in a sector from a nominal value is ±3.9%–±5.35%. A value which is shown as each α is a predefined or calculated value. A calculation formula is not shown, but the value is calculated from values in FIG. 10, e.g., the distance d between the E gap and the R/W gap and the recording density at the inner track.

FIG. 11 shows that, when a disk rotation speed becomes higher and the data block gap G3 in the last sector is written with other elements in the last sector, an allowable fluctuation value for one disk rotation cycle time is 1.1%–1.8%. When the data block gap G3 in the last sector of only one byte is written, an allowable fluctuation value of one disk rotation speed is 1.7%–2.4% for a high speed rotation.

In FIG. 11, a ratio of a pre-written gap (pre-writing gap) which is not written over and the pre-written gap which is written first, i.e., (G4/(G0+G4) and (G4+G3)/(G0+G4+G3)) are shown. The ratio is 40% or less in each case shown in FIG. 11.

With reference to FIGS. 12 and 13, the calculation for sample 1 in this invention is discussed in more detail.

Equations which are used in FIGS. 12–20 to calculate a number of bytes in each gap for a disk apparatus which uses a magnetic head of the leading erasing method are as follows;

(1) ID gap G2

$$G2 = \frac{dx(1-\gamma)}{8\tau(1/(1+\alpha))} + \text{Eon(Bytes)}$$

d: a distance between an Erase gap and a R/W gap (mm)
γ: an accuracy of a frequency of a write clk (%)
8τ: 1 byte length (a nominal bit length at inner track×8 bit, mm)
α: a fluctuation of an average speed in a sector from a nominal value
Eon: a rising time of an erasing current (converted from a byte length time)

(2) Data block gap G3

$$G3 = \left(G2 + DB + \frac{d}{8\tau}\right) \times \frac{1+\alpha}{1-\alpha} \times \frac{1+\gamma}{1-\gamma}$$

DB: data block (530 bytes)
(3) Total Bytes=G1+(ID+G2+DB+G3)×Number of Sectors
(4) Remaining Gap 4=Btk−Total Bytes Btk: a nominal unformatted byte number in a track (5) Allowable High Rotation Time (%) =

$$\frac{\text{Total Bytes} + d\frac{d(1+\alpha)/(8\tau)}{Btk}} \times 100\%$$

(G3 in last sector is written with last sector.)

(6) Allowable High Rotation Time (%) =

$$\frac{(\text{Total Bytes} - G3 + 1) + d(1+\alpha)/(8\tau)}{Btk} \times 100\%$$

(G3 in last sector is written with gap 4 at first.)

(7) Allowable High Rotation Number (%) =

$$\frac{\text{Nominal Rotation Time}(100\%)}{\text{Allowable High Rotation Time}(\%)} \times 100\%$$

A nominal rotation time is counted as 100% for a calculation purpose.
Equation (7) is applied for (5) and (6).
(8) Remaining Ratio 1 of A=G4/(G0+G4)
Remaining Ratio 1 of B=G4/Btk
(9) Remaining Ratio 2 of A=(G4+G3)/(G0+G4+G3)
Remaining Ratio 2 of B=(G4+G3)/Btk The magnetic disk has a diameter of 44 mm. The magnetic disk formatting is performed using a magnetic head of the leading erasing method which does not need an index pulse. The track gap G4 is written first. In the embodiment shown in FIGS. 12–20, the maximum distance d between the E gap and the R/W gap is 0.16 mm and a write clock (clk) is supposed to fluctuate in ±0.1%. A nominal clk cycle is 1 μs and a normal (nominal) rotation speed is 450 rpm. Erase-on rise time Tr is assumed to be one bit time, i.e., 0.125 byte length. Erase-off fall time Tf is also assumed be 0.125 byte length. A radius r2 at the inner track of the magnetic disk is 13.5 mm and a radius r1 at the outer track is 20.4 mm. A nominal unformatted bit number in a track is approximately 133333 bits (approximately 16666 bytes). A nominal bit length τ at the most inner track is shown in FIG. 12. A nominal bit recording density at the most inner track is 39926 bpi (bits per inch, 1572 bits/mm) as shown in FIG. 12. These values are used for calculating values which are explained as follows.

In FIG. 12, a number of bytes in each element of a format is shown for an allowable average speed fluctuation α in a sector from a nominal value.

In FIG. 12, a nominal length of the sector identifier (ID) is 22 bytes, a nominal length of the data block is 530 bytes, and a nominal number of sectors in a track is 24 sectors. In one data block with a length of 530 bytes, a synchronous signal code of 16 bytes, data of 512 bytes, and an error detecting code (EDC) of 2 bytes are included. For the formatting method according to this invention, the index gap G1 has 0 bytes. When the allowable average speed fluctuation α in a sector is ±5%, the ID gap G2 of 34 bytes and the data block gap G3 of 96 bytes are necessary. Therefore, when α=±5%, 16368 bytes are necessary for a track. Since a nominal unformatted byte number in a track is approximately 16666 bytes, approximately 298 bytes remain for the track gap G4.

In this explanation, the allowable average speed fluctuation value α in the sector is ±5%. When another value of allowable fluctuation is used, the length of the track gap G4 can be calculated with the same calculation method.

In FIGS. 10 and 11, $\alpha=\pm5\%$ for sample 1(a) and $\alpha=\pm5.35\%$ for sample 1(b). When $\alpha=\pm5\%$, there is enough room for an allowable range. When $\alpha=\pm5.35\%$, it is close to a limit to maintain 24 sectors in a track. When $\alpha=\pm6\%$, the data block gap G3 of 110 bytes becomes necessary. In calculation, −37 bytes remain for the track gap G4 and therefore 24 sectors cannot be maintained in a track.

Each value in FIG. 13 is obtained based on the track gap G4 length calculated in FIG. 12. Each value in FIG. 13 is calculated on the condition that format writing is stopped a distance d between the E gap and the R/W gap before the sector identifier (ID) in the first sector.

In FIG. 13, a pre-written gap ratio A and one track byte ratio B are shown as a remaining rate 1 for a case in which the track gap G4 for absorbing one disk rotation cycle time fluctuation is written first as the pre-written gap and the disk rotates at a nominal rotation cycle. The pre-written gap ratio A is the ratio of a number of bytes in a pre-written gap which are not written over by formatting and the pre-written gap. The one track byte ratio B is the ratio of a number of bytes in the pre-written gap which are not written over by formatting and the nominal unformatted byte number in a track.

In FIG. 13, a pre-written gap ratio A and one track byte ratio B are shown as a remaining rate 2 for a case in which the track gap G4 for absorbing one disk rotation cycle time fluctuation and the data block gap in the last sector are written first as the pre-written gap and the disk rotates at the nominal rotation cycle. The pre-written gap ratio A is a ratio of a number of bytes in a pre-written gap which remain without being written over by formatting and the pre-written gap. The one track byte ratio B is a ratio of a number of bytes in the pre-written gap which remain without being written over by formatting and the nominal unformatted byte number in a track.

The remaining rate 1 shows a ratio of the track gap G4 and the pre-written gap and the ratio of the track gap G4 and the nominal unformatted byte number when the data block gap G3 in the last sector is written during formatting. The remaining rate 2 shows the ratio of the track gap G4 and the pre-written gap and a ratio of the track gap G4 and the nominal unformatted byte number when only one byte of the data block gap G3 in the last sector is formatted.

When $\alpha=\pm5\%$, the one track byte ratio of the remaining rate 1 is B=1.8% and the one track byte ratio of the remaining rate 2 is B=2.4%. Since motor rotation speed overshoot is limited, it is assumed to be adequate if a high speed rotation of approximately 1.5% is allowable. The remaining rates 1 and 2 are allowable rates when the disk rotates faster than the nominal rotation cycle. When the one track byte ratio is B=1.8%, even if the disk rotation speed becomes 1.8% faster, formatting can be performed without any problem. When the disk rotation speed becomes 1.8% faster, all of track gap G4 is written over.

As stated above, it should be adequate if a high speed disk rotation of approximately 1.5% is allowed. However, for safety reasons, a high speed disk rotation of approximately 2.0% is desirable. In that case, when the data block gap G3 in the last sector is written during formatting, a remaining rate (a number of remaining bytes in the pre-written gap/the nominal unformatted byte number in a track) is set at 2.0% (one track byte ratio B of the remaining rate 1 is 2.0%) or less. Therefore, a longer data block gap length in a sector can be provided. When only one byte of the data block gap G3 in the last sector is formatted, since the one byte is already written, the remaining rate of 2.5% (one track byte ratio B in the remaining rate 2 is 2.5%) or less is enough.

As stated above, for an allowable high speed rotation, a longer data block gap length in a sector can be provided while maintaining a remaining rate of 2.0% or 2.5%. For a low speed rotation, it is unnecessary to be concerned with the remaining rate during formatting.

When formatting is performed during low speed rotation, a recording density becomes high and the possibility of read/write errors increases. However, formatting can be performed without any problem. When formatting is performed during low speed rotation, a pre-written gap for low speed formatting (hereinafter, pre-written gap G0 for low speed formatting) is provided according to an allowable range. The pre-written gap G0 for low speed formatting is written over when the disk rotates with a nominal rotation cycle. For example, when $\alpha=\pm5\%$, the pre-written gap G0 for low speed formatting of approximately 907 bytes is necessary. The number of bytes for the gap G0 is calculated so that a larger fluctuation value is allowable during low speed rotation with a longer one rotation cycle than during high speed rotation with a shorter one rotation cycle. In this example, the fluctuation value of 1.5% is allowable for a high speed rotation and the fluctuation value of 3% is allowable for a low speed rotation. A pre-written gap G0 length for low speed formatting and a track gap G4 length which is calculated in FIG. 12 are accumulated and a pre-written gap length is obtained. When $\alpha=\pm5\%$ and the allowable fluctuation value for low speed rotation is 3.0%, the length of the pre-written gap of 1206 bytes (298.67+907.06=1205.73) is calculated. When the data block gap G3 is written at the same time, a total pre-written gap of 1302 bytes (1206+95.7=1301.7) is calculated. A ratio of a pre-written gap which is not written over and a pre-written gap which is written first during normal rotation is discussed with reference to figures in FIG. 13 as follows:

(1) When the data block gap G3 in the last sector is written with other elements in the last sector, i.e., the gap G0 and the track gap G4 are written as the pre-written gap and the data block gap G3 is not written as the pre-written gap, when $\alpha=\pm5\%$, a ratio of the pre-written gap which remains without being written over and the pre-written gap which is written first (the pre-written gap ratio A of the remaining rate 1) is 24.8% (less than 40%, or approximately ⅓ or less).

(2) When the data block gap G3 in the last sector is written first with the gap G0 and the track gap G4, a ratio of the pre-written gap which is not written over and the pre-written gap which is written first (the pre-written gap ratio A of the remaining rate 1) is 30.3% (less than 40%, or approximately ⅓ or less).

A pre-written gap length which is written over at a normal (nominal) rotation is obtained by deducting the above-calculated values from 100%. For example, when $\alpha=\pm5\%$, in case of (1), the pre-written gap length which is written over is 100%−24.8%=75.2% (60% or more, or ⅔ or less). In case (2), the pre-written gap length which is written over is 100%−30.3%=69.7% (60% or more, or ⅔ or less).

Since larger fluctuation is allowable during low speed rotation than during high speed rotation, approximately 60% or more of the pre-written gap is written over and approximately 40% or less of the pre-written gap remains in both (1) and (2).

In FIGS. 12 and 13, when an average speed fluctuation $\alpha$ in a sector from a nominal value is ±5% ($\alpha=\pm5\%$), approximately 60% or more of the pre-written gap is written over and approximately 40% or less of the pre-written gap remains. A remaining rate of a number of the remaining bytes of the pre-written gap is 1.8% (2% or less) or 2.4% (2.5% or less).

In samples 2–4 shown in FIGS. 14–19, each value is calculated for different values of a distance d between an E gap and a R/W gap for the leading erasing method of a magnetic head by a same calculation method in sample 1. The different values are 0.18, 0.20 and 0.22. In FIGS. 14 and 15, d=0.18 mm. In FIGS. 16 and 17, d=0.20 mm. In FIGS. 18 and 19, d=0.22 mm. Calculation results are summarized in FIG. 11.

Since there is enough room for an allowable range in sample 1(a), sample 1(a) is excluded for this explanation.

As shown in samples 1(b)–4 in FIG. 11, when the distance between the gaps is increased from 0.16 mm to 0.22 mm, a necessary number of bytes for the sector identifier gap G2 is increased from 34 bytes to 45 bytes. At the same time, the data block gap G3 must be reduced from 101 bytes to 94, 92, and 89 bytes. Otherwise, 24 sectors cannot be provided in a track. Accordingly, an allowable average speed fluctuation α in a sector becomes smaller. When disk diameter is 48 mm or less instead of 44 mm, or other values in FIG. 12, e.g., a write clock accuracy γ, a leading or trailing edge of an erasing current, etc., are different values, a necessary length of a gap changes. When almost the same format efficiency rate is maintained and each sector has a data length of 512 bytes, almost the same gap length is allocated in a sector. A distance d between the E gap and the R/W gap is also within the range discussed in this embodiment. Therefore, the sector identifier gap G2 with a length of some value from 33 (34−1) to 46 (45+1) bytes is provided. The data block gap G3 with a length of 88 (89−1) to 102 (101+1) bytes is provided.

As shown in the one track byte ratio B of the remaining rate 1 in samples 1(b)–4 in FIG. 11, when the pre-written gap G0 for low speed formatting is written with the track gap G4 in advance and each length of gaps G2–G4 is optimized with a distance d between the E gap and the R/W gap, the remaining rate is 1.1%–1.2%. As stated above, since an allowable high speed value of one rotation motor speed should be slightly more than 1.5%, a remaining rate of approximately 2% is necessary. When the data block gap G3 in the last sector of one byte is written after the data block in the last sector, each length of gaps G2–G4 is optimized with the distance d between the E gap and the R/W gap to realize the remaining rate of 1.7%–1.8%. When an allowable high speed value of one rotation motor speed motor should be slightly more than 1.5%, the remaining rate of approximately 2.5% is necessary.

The ratio of the pre-written gap which is not written over and the pre-written gap which is written first is less than 40% (less than ⅓) in all samples 1–4 in both cases of writing the data block gap in the last sector first (A of the remaining rate 1) and writing the data block gap in the last sector last (A of the remaining rate 2). A pre-written gap which is written over is 60% or more (⅔ or more).

This invention absorbs a disk rotation fluctuation by the stated formatting method. Particularly, when formatting according to this invention is performed for a magnetic disk with a diameter of approximately 44 mm, a rotation fluctuation caused by a small motor can be absorbed.

In FIG. 20, format calculations of a FDC with a magnetic disk with a diameter of 44 mm formatted by a method according to the related art which uses a hard index are shown in FIGS. 12–19. In FIG. 20, since an index pulse is used, the index gap G1 exists. When the distance d=0.16 mm max., a maximum allowable fluctuation α is ±4.55%. The allowable fluctuation α is smaller in comparison with this invention.

Characteristics of samples 1–4 are as follows;

(1) Since a longer gap is written in advance, a part of the gap is written over after one disk rotation. Therefore, a troublesome signal generated due to rotation speed fluctuation does not remain in a connection space between tracks. Further, a first sector is not written over after one disk rotation.

(2) Since an index signal (an index pulse or a soft index signal shown in FIG. 25) is not used, an index gap G1 which is written according to the related art is unnecessary to prevent a sector identifier (ID) in the first sector from being damaged by a position jitter of the index pulse.

(3) Since one rotation cycle time fluctuation is reduced during high speed rotation with a shorter one rotation cycle, a track gap G4 length is shortened. At the same time, a larger one rotation cycle time fluctuation is allowable for a low speed rotation with a longer one rotation cycle than for the high speed rotation. This is because a motor rotation speed overshoot is limited. For example, the fluctuation should be less than 1.5% normally. However, a larger fluctuation, e.g., 3%, should be considered for low speed rotation. The larger fluctuation is caused by a fluctuation of a load torque caused by disk friction, for example.

(4) When a disk size is reduced, recording density becomes higher. Therefore, a high density recording medium covered with a magnetic material, e.g., metal or barium ferrite, is appropriate for a small disk. In that case, a magnetic head of the leading erasing method which provides an erasing (E) gap for a full track width before a R/W gap should be used to prevent old data from remaining. However, according to the magnetic head of the leading erasing method, a distance d between the E gap and the R/W gap (E–R/W) is an invalid field in which data cannot be written. Therefore, the distance d between the E gap and the R/W gap should be as short as possible. However, it is difficult to produce a head with a short distance d. Therefore, while a desired format capacity is maintained, a format which absorbs a speed fluctuation which tends to occur must be chosen, and an appropriate distance d between the E gap and the R/W gap.

(5) If it is unnecessary to write a data block gap G3 in a last sector and the data block gap G3 is not written, an invalid field for a number of bytes of the distance d between the E gap and the R/W gap of the head is not generated. When a track gap G4 cannot be provided and a data block gap G3 length between the data block in the last sector and the sector identifier (ID) in the first sector becomes shorter than a nominal length during high speed rotation, the sector identifier (ID) is not immediately damaged. Unless a disk which is formatted at a maximum rotation speed is updated at a minimum rotation speed, the possibility that an error does occur is low.

As stated above, this invention proposes a format which absorbs a larger average speed fluctuation in a sector than a standardized format according to the related art, while maintaining the same format efficiency for a smaller disk as a larger disk according to the related art. When a flexible disk apparatus becomes smaller, a rotation inertia gravity of a motor and a disk becomes smaller. Further, it becomes difficult to provide a complicated magnetic pole configuration of the motor. Hence, the format according to this invention is intended to absorb a larger ripple-shaped speed fluctuation (cogging) due to the motor configuration.

According to the formatting method of this invention, an index pulse generated in every disk rotation is not used to format each track on a disk. A track gap which absorbs one rotation cycle time fluctuation and a write signal frequency fluctuation is written in each track first. Hence, the track gap is not written after a last sector is written.

According to the formatting method of this invention, one track is formatted for a disk rotation angle of 360 degree or more.

According to the formatting method of this invention, a part or all of a track gap which is written first in each track before writing each sector is written over before formatting is completed by writing a last sector.

According to the formatting method of this invention, more than a standard number of bytes in a track at a standard rotation speed with a standard write signal frequency is written on a track continuously.

According to the formatting method of this invention, when a disk rotation speed is at the lowest level in an allowable range, a part of a track gap which is written first in each track is written over by a last sector. When a disk rotation speed is at the highest level in the allowable range, most of the track gap is written over by the last sector. In either case, any part of an address ID of a sector which is written first is not erased.

According to the formatting method of this invention, a formatting start or end point is not determined by either a physical angle position of a disk or a spindle motor rotation angle position.

According to the method of this invention, formatting of each track is started when a head is moved to the track and it is detected that the head is stably positioned at the track, or it is assumed that the head is stably positioned at the track.

According to the method of this invention, formatting of each track is started when a constant time has passed after a last drive pulse for moving a head to the track is transmitted to a positioning step motor.

According to the formatting method of this invention, formatting of each track is completed when all necessary information is written in a last sector or when one bit or a few bytes are written after the last sector.

According to the formatting method of this invention, formatting of each track is completed when a data block in a last sector is written or when one bit or a few bytes are written after the data block.

A flexible disk apparatus according to this invention does not include a mechanism to generate an index pulse for every rotation of a disk or a spindle motor.

When a disk is formatted according to the method of this invention, an integer number of recording sectors are provided in a constant order in each track. However, a magnetic connection position of a formatting record in each track and a recording position of a first sector in each track are not constant with a physical disk angle position in each track.

When a disk is formatted according to the method of this invention, an integer number of recording sectors are provided in a constant order in each track. Further, a magnetic connection position at a formatting end point in each track is just after a data block in the last sector is written or after one bit or a few bytes are written after the data block.

The formatting method discussed above has the following effects:

(1) Since a hardware sensor for detecting one disk rotation cycle is unnecessary, a space to set a sensor is unnecessary. Hence, a micro-drive is easily realized.

(2) When formatting of neighboring tracks or neighboring cylinders is performed, approximately 18 ms are needed to move a head to a next track or next cylinder and stabilize positioning for a normal FDD. Since one disk rotation time is 100–200 ms normally, even if a longer track gap G4 is written, only a few % of the one disk rotation time is necessary. Hence, according to this invention, formatting of the next track can be started at an early time during next disk rotation after a track formatting is completed.

According to the formatting method of the related art which uses an index pulse, even if a head is stabilized early, formatting of a next track or next cylinder cannot be started until a next index pulse is generated. However, according to the formatting method of this invention, formatting of all the tracks or cylinders can be completed at a high speed.

(3) When data which is longer than a track or cylinder is written/read/updated in a plurality of tracks on a disk formatted according to a method of this invention, write/read/update by a head in a next track may be started earlier. Hence, operations are performed at a higher speed than the related art.

(4) When nominal 130 mm FDC, 90 mm FDC, etc. are formatted according the method of this invention, relation of an angle position to generate an index pulse and an angle position of a sector are different and a nominal format according to the related art is not strictly satisfied. However, if a proper type of LSI is used as a controller, compatibility with a normal FDD can be achieved while effecting the high speed operations which are discussed in (2) and (3) above.

The formatting method according to this invention is most properly applied to a flexible disk having a new method which is standardized in the future.

(5) When the formatting method of this invention is applied to a large capacity disk apparatus according to a track servo method in the related art, which uses an index pulse instead of a sector servo signal, the same effect with this invention is realized. Since a track gap for absorbing a rotation time fluctuation is written first according to the formatting method of this invention, an index gap to absorb a position fluctuation to generate the index pulse is unnecessary. Hence, allocation of bytes to each gap can be made with less restrictions and the rotation time fluctuation is treated easily from a design stand point. Further, formatting can be started immediately after a head is positioned at a next track. Hence, total formatting time can be reduced. When data with a long data length is stored in a plurality of neighboring tracks or the data stored in the neighboring tracks is read, a next index pulse is awaited. Therefore, it is unnecessary to skip reading a sector number. Accordingly, the head can be moved between the neighboring tracks immediately and system efficiency can be improved.

Embodiment 2.

Figure 21:
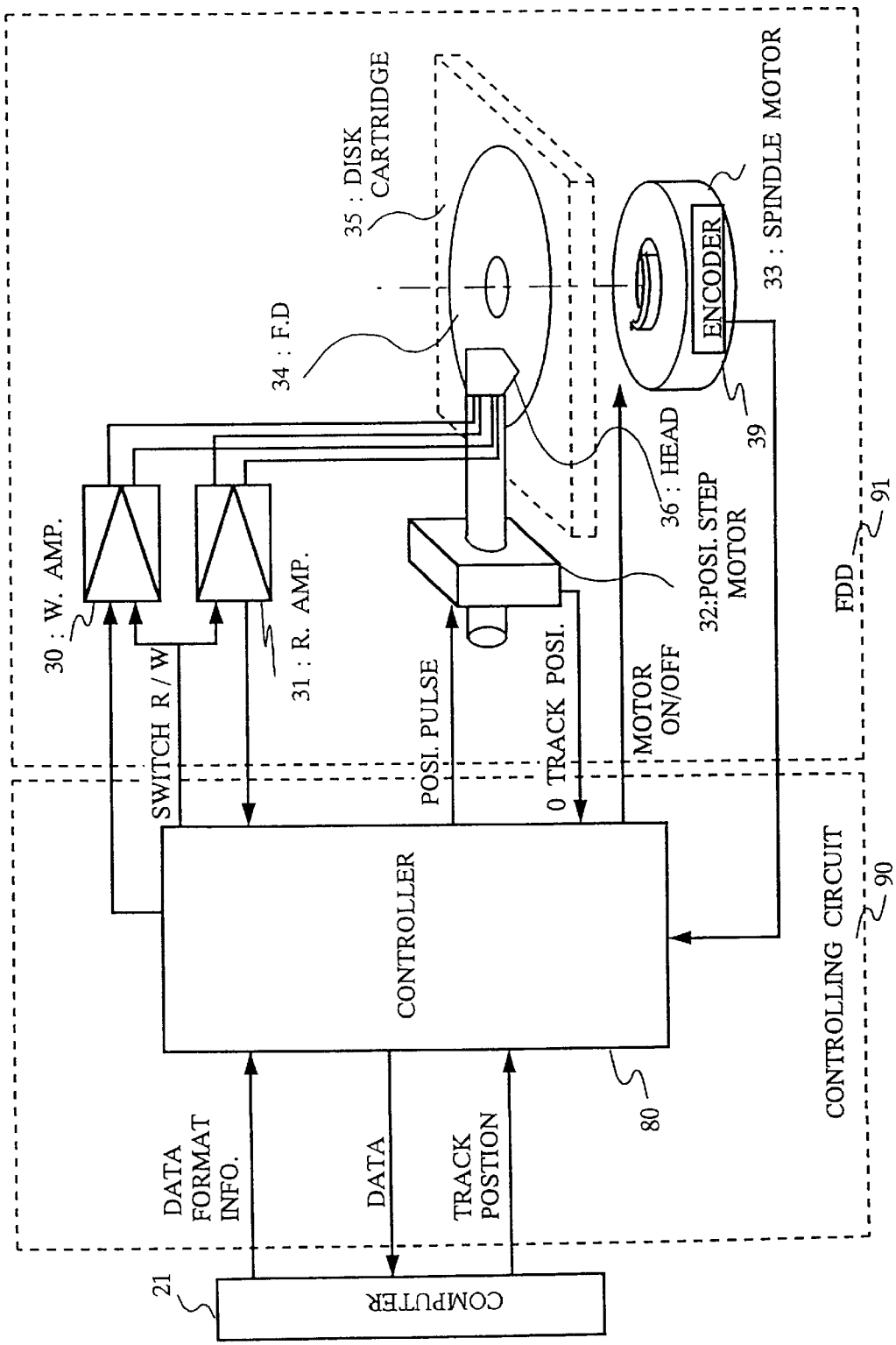
FIG. 21 illustrates a FDD and a controlling circuit in which a pseudo-index pulse Is used according to this invention.

A configuration of a formatting apparatus according to embodiment 2 is illustrated in FIG. 21.

An encoder 39 is provided in the spindle motor 33 in FIG. 21. The encoder 39 outputs a pulse corresponding to a rotation angle position of the spindle motor to the controller 80. The encoder 39 generates the pulse corresponding to the rotation angle position by a magnetic sensor such as a hall device or MR (Magnetro-Registive) device or an optical sensor. Other aspects are the same as in FIG. 1.

Figure 22:
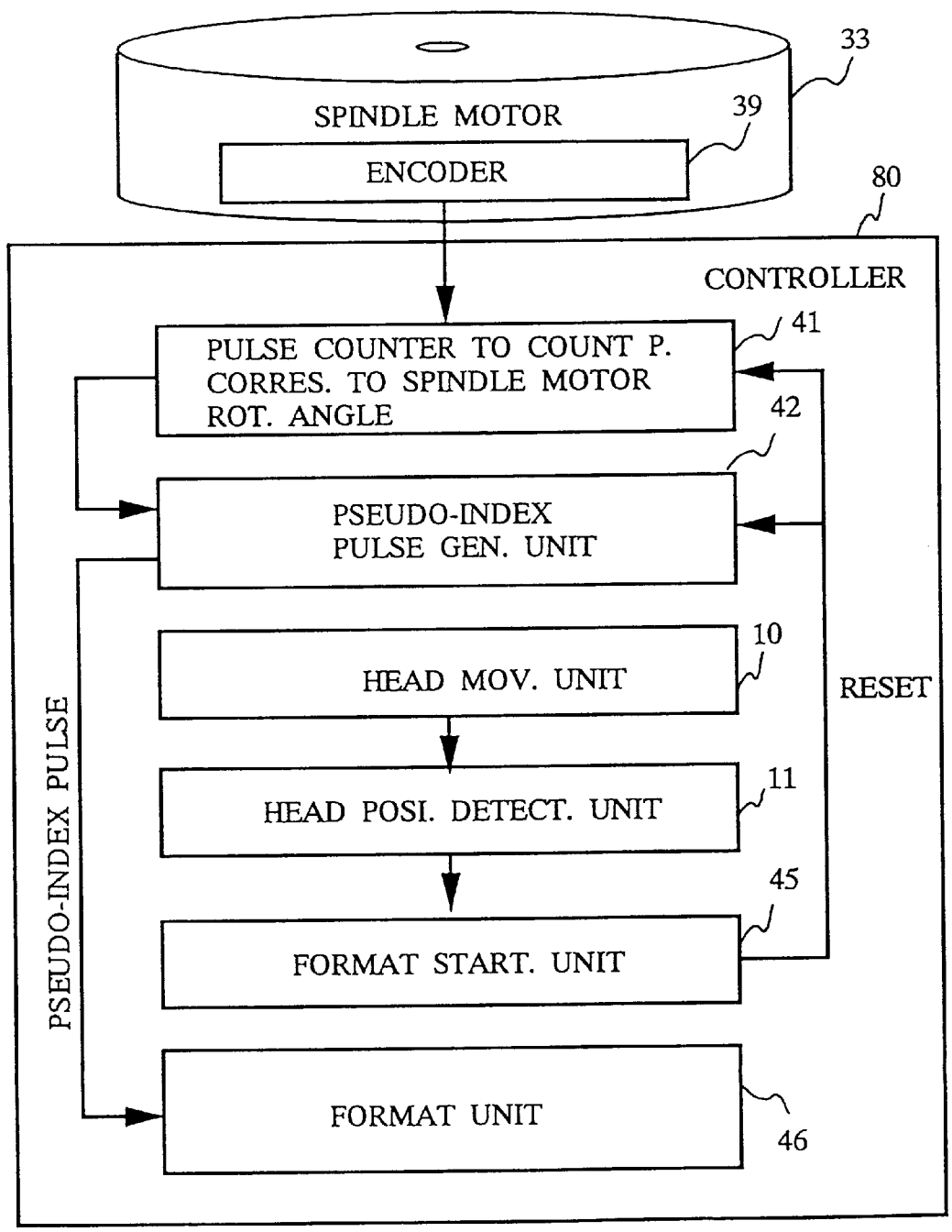
FIG. 22 shows an internal block chart of the controller in which the pseudo-index pulse is used according to this invention.

An internal block chart of the controller 80 according to embodiment 2 is shown in FIG. 22.

In FIG. 22, the spindle motor 33 rotates a recording medium and generates a pulse corresponding to a rotation angle position. The encoder 39 generates a pulse corresponding to a rotation angle position, i.e., a rotation speed detecting pulse, to control spindle motor rotation speed. A pulse counter 41 counts a number of pulses corresponding to the rotation angle position. A pseudo-index pulse generating unit 42 generates a pseudo-index pulse in every disk rotation based on a counting result by the pulse counter. A format starting unit 45 resets the pseudo-index pulse generating unit 42 and generates the pseudo-index pulse when the head positioning detecting unit detects that the head movement is completed. Then, the format starting unit 45 starts a format unit 46. The format unit 46 writes a track format based on the pseudo-index pulse which is generated by the pseudo-index pulse generating unit 42. Other elements in FIG. 21 are the same as in FIG. 2.

An index pulse is not generated at a specific disk angle position for every disk rotation by a hardware sensor. Instead, as illustrated in FIGS. 21 and 22, a pulse corresponding to a spindle motor rotation angle position is transmitted from the encoder which detects a spindle motor rotation speed to the pulse counter 41 and the number of pulses is counted (or the pulse frequency is divided) by the pulse counter 41. Then, the pseudo-index pulse generating unit 42 generates a pulse for every spindle motor rotation and outputs the pulse as the pseudo-index pulse to the format unit 46. The format unit 46 performs formatting using the method according to the related art. Accordingly, a drive which does not need a sensor for detecting an index pulse is realized.

Figure 23:
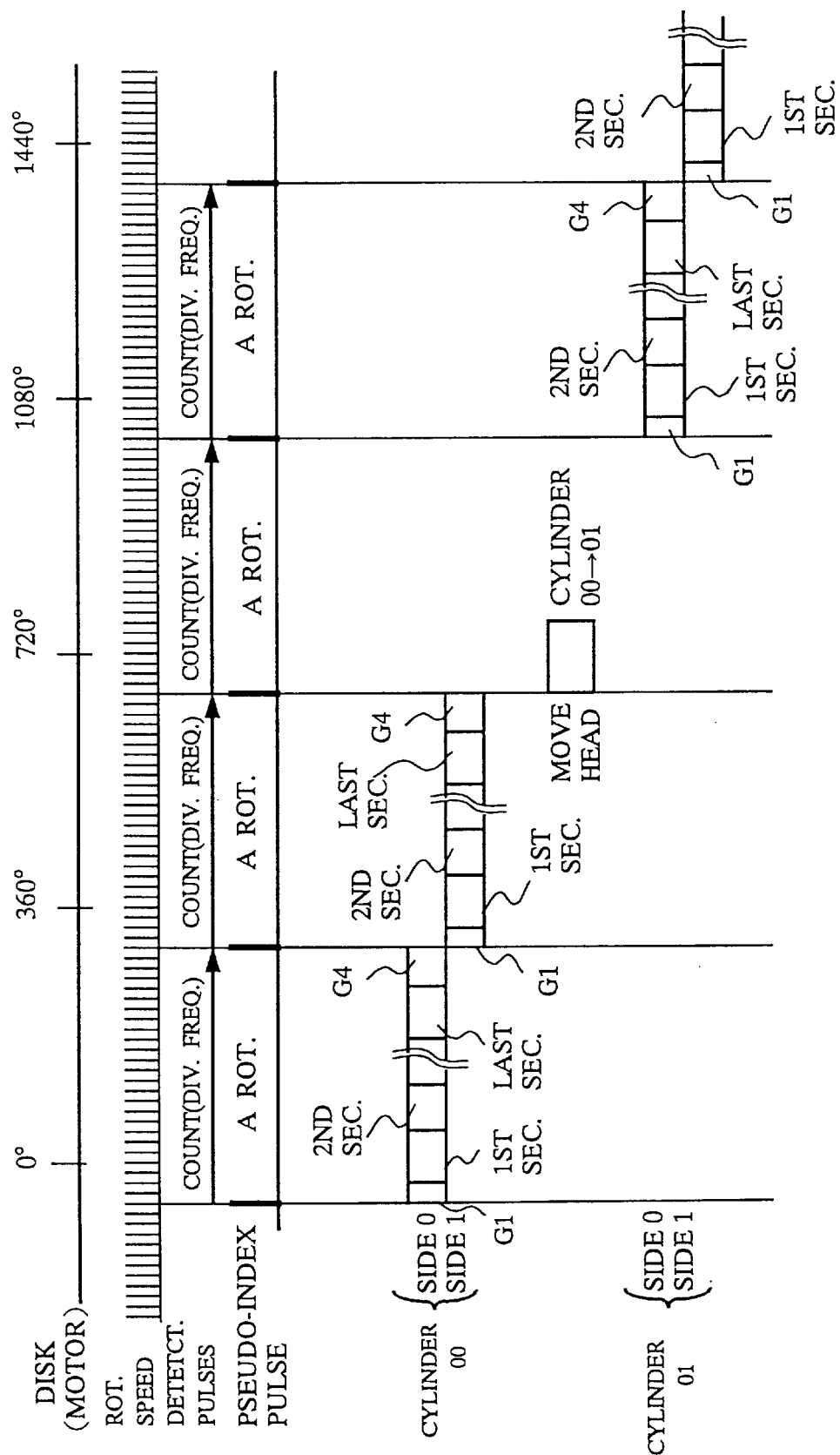
FIG. 23 shows an explanatory chart of a timing for using the pseudo-index pulse according to this invention.

When a disk is re-inserted or power of the apparatus is turned on again, a position for generating the index pulse changes, i.e., a position to start formatting of each track on a disk changes. However, formatting can be started at a same angle position in all neighboring tracks which are formatted continuously as in the related art. As shown in FIG. 23, when after a track is formatted, a head is moved to a next cylinder in a next disk rotation, formatting of a next track can be performed in a next disk rotation. In the case of FIG. 23, the head positioning detecting unit 11 and the format starting unit 45 are unnecessary.

Figure 24:
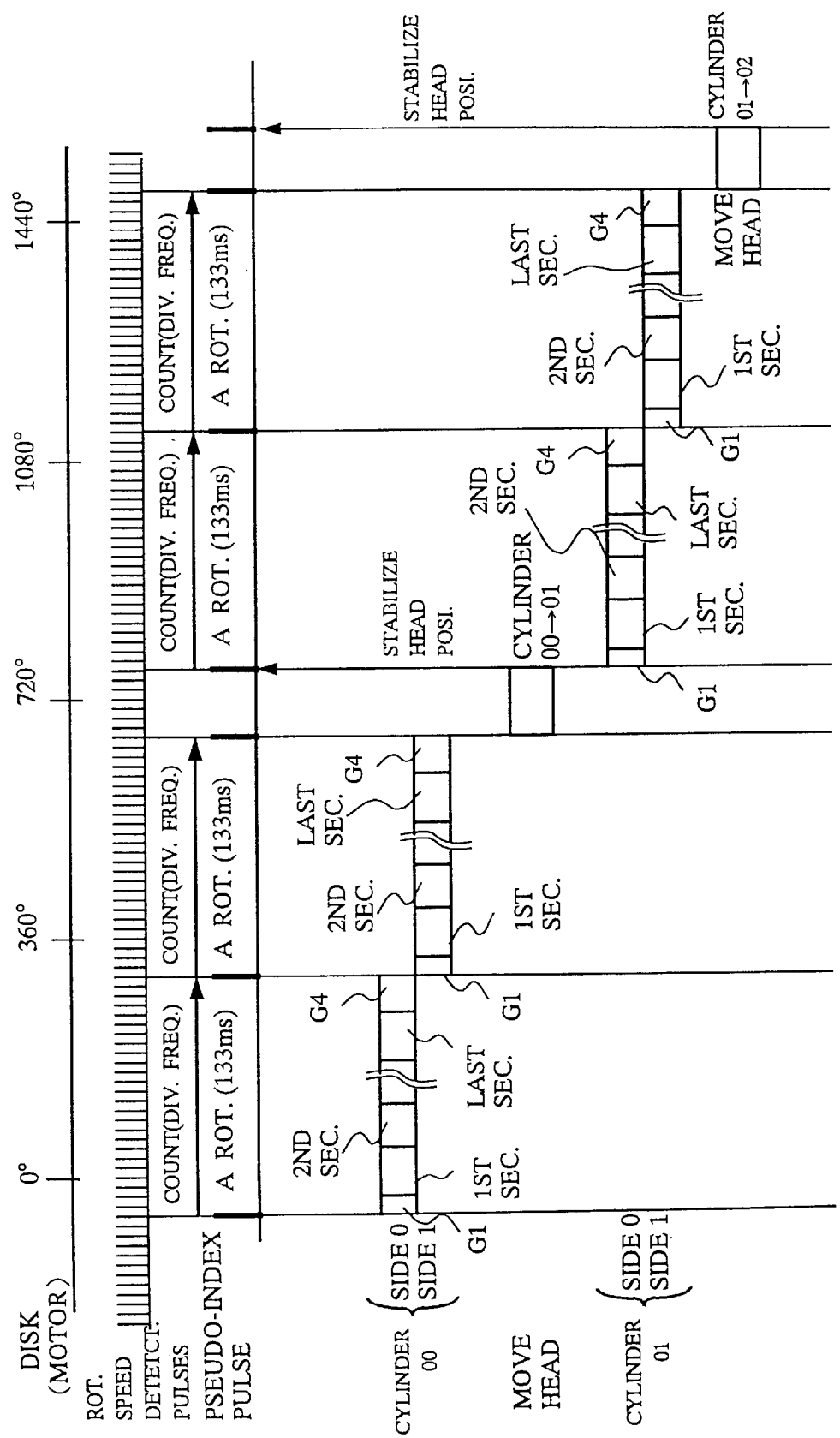
FIG. 24 shows an explanatory chart of a timing for using the pseudo-index pulse according to this invention.

When disk rotation speed is normal between 300–600 RPM, the head is moved to a next cylinder in approximately 18 ms. However, one rotation cycle time is 100 ms–200 ms. The head positioning detecting unit 11 detects a time to complete head movement. Then, the format starting unit 45 resets the pulse counter (or a pulse frequency dividing circuit, not illustrated) which counts the number of the pulses corresponding to the motor rotation angle position and the pseudo-index pulse generating unit 42. As shown in FIG. 24, the pseudo-index pulse generating unit 42 generates a pseudo-index pulse just when head movement is completed and the format starting unit starts formatting a next track immediately. Accordingly, formatting efficiency can be improved as in embodiment 1. The pseudo-index pulse is not generated by a hardware sensor, but the pseudo-index pulse is generated utilizing a plurality of rotation speed detecting pulses which are generated in one disk rotation. Therefore, the pseudo-index pulse is not generated at a fixed motor rotation angle position. Instead, just when head movement is completed, the pseudo-index pulse generating unit is reset and a pseudo-index pulse is generated. Then, after one rotation time has passed, a next pseudo-index pulse is generated.

Figure 25:
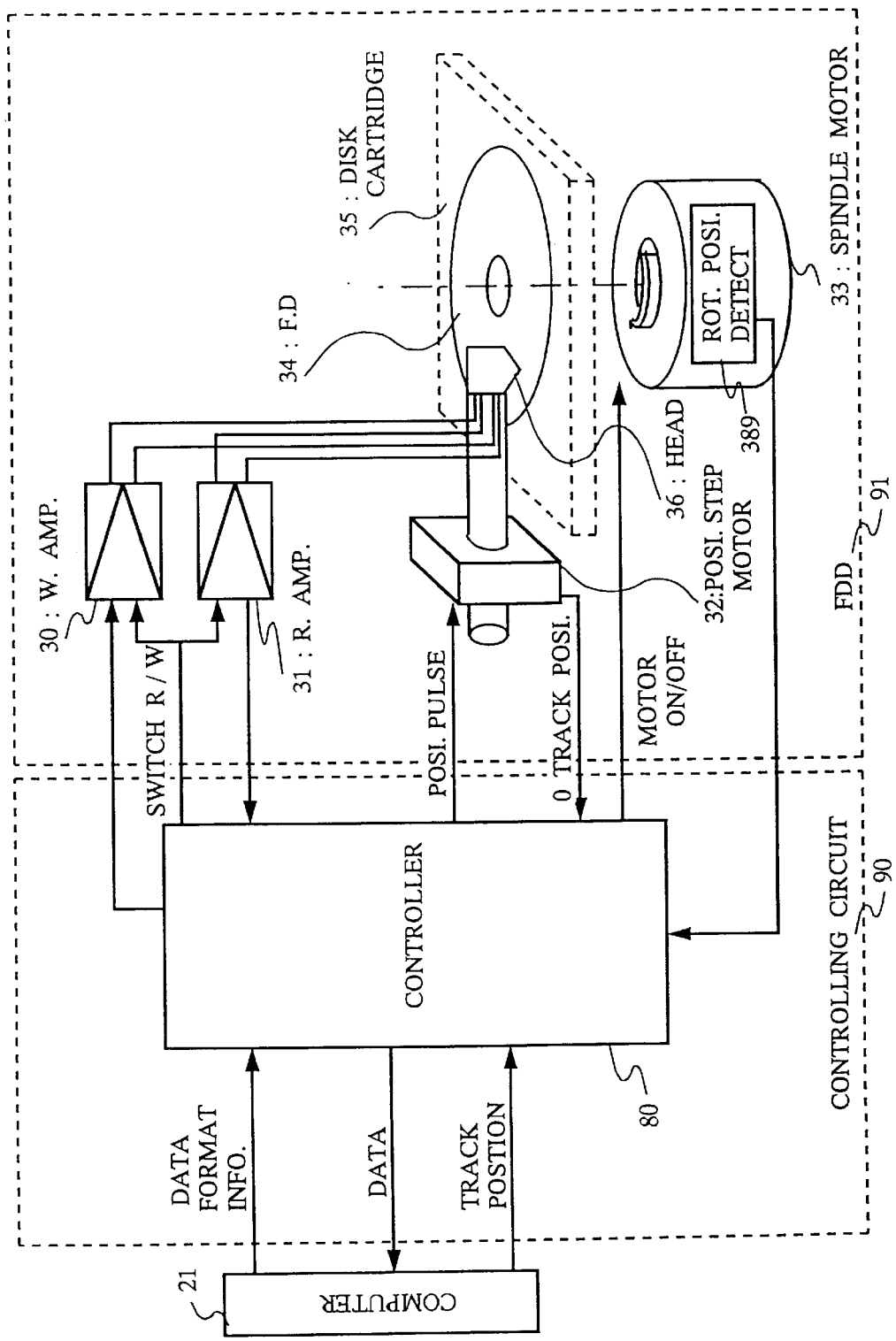
FIG. 25 illustrates the FDD and the controlling circuit in which the pseudo-index pulse is used according to this invention.
Figure 26:
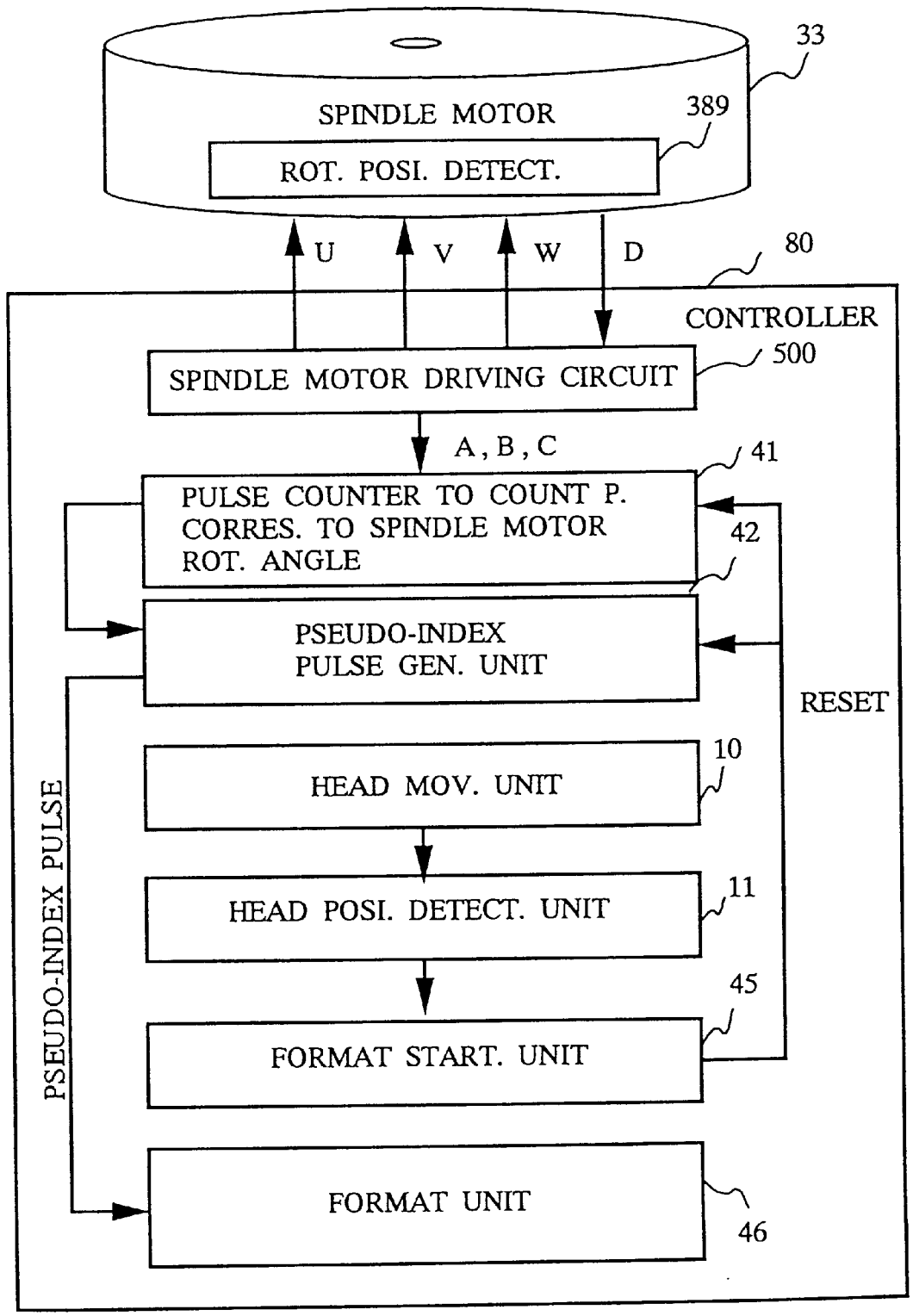
FIG. 26 shows an internal block chart of the controller in which the pseudo-index pulse is used according to this invention.

A configuration of a formatting apparatus for embodiment 2 is illustrated in FIG. 25. An internal block chart of the controller 80 in embodiment 2 is shown in FIG. 26. An internal block chart of a spindle motor driving circuit 500 in the controller 80 is shown in FIG. 27.

Figure 27:
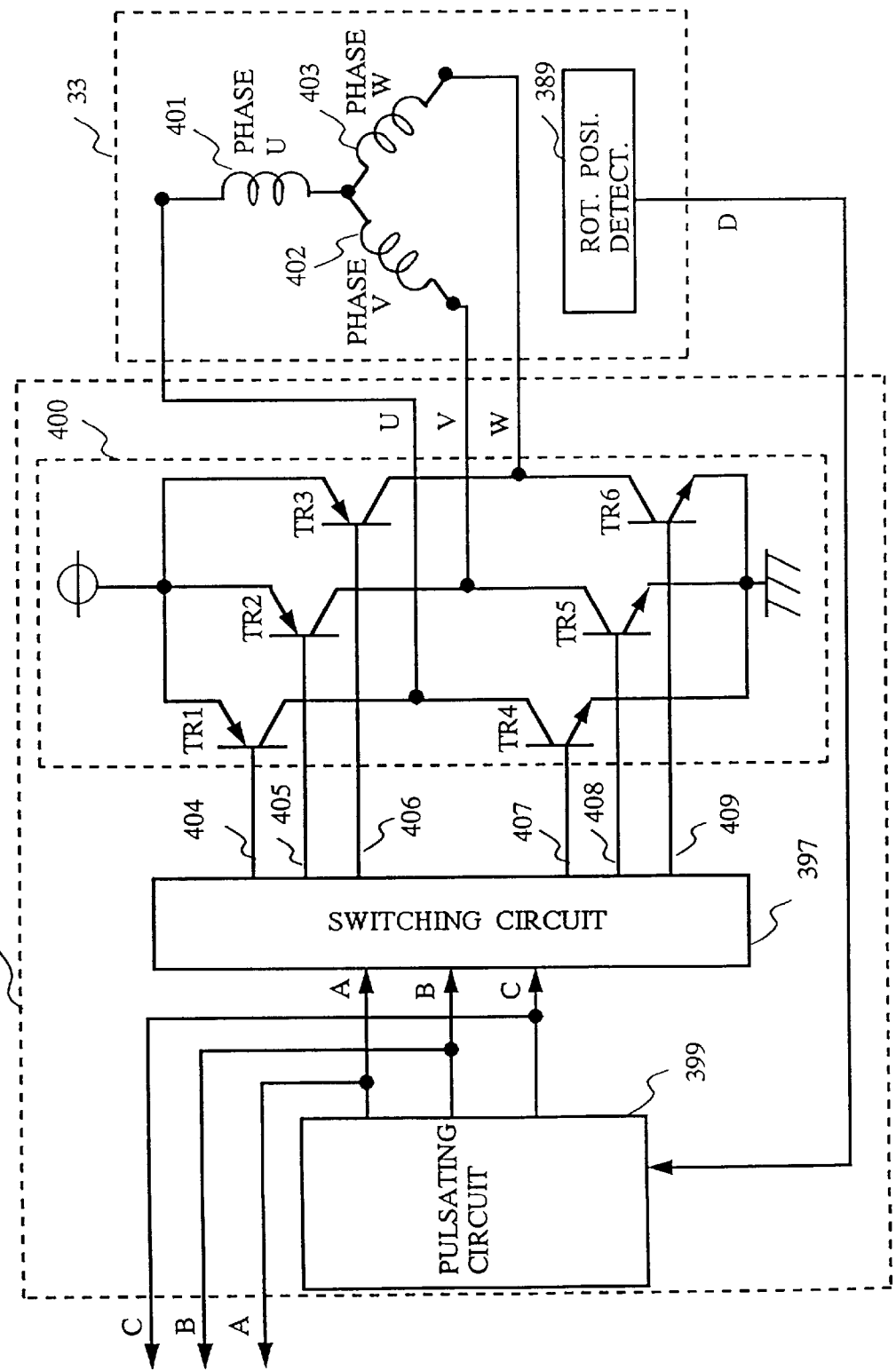
FIG. 27 shows an internal configuration of a spindle motor driving circuit and phase connections in the spindle motor according to this invention.

In the configuration as shown in FIGS. 25, 26, and 27, a rotation position detector 389 is provided in the spindle motor 33. The rotation position detector 389 generates a rotation position detecting signal D and a pulsating circuit 399 in the spindle motor driving circuit 500 of the controller 80 generates a pulse corresponding to a rotation angle position.

In FIGS. 25 and 26, two or three rotation position detectors 389, e.g., magnetic sensors such as a hall device and MR device, or optical sensors are provided instead of the encoder illustrated in FIG. 21 to control spindle motor rotations. The rotation position detectors 389 are provided in each of phases U, V, and W or two of the three phases.

An internal configuration of the spindle motor driving circuit 500 and phase connecting lines in the spindle motor 33 are shown in FIG. 27.

In FIG. 27, three phase brushless motor coils 401, 402, and 403 are in a three-phase star connection at a neutral non-grounding point. A bridge circuit 400 controls driving transistors TR1–TR6 and supplies a determined driving current to the motor coils 401, 402, and 403. Conventionally, the motor coils are called as phase U, phase V, and phase W. The pulsating circuit 399 pulsates the rotation position detection signal D outputted from each rotation position detector 389 by a comparator and generates rotation position signals A, B, and C. A switching circuit 397 outputs driving signals 404–409 according to the rotation position signals A, B, and C, and controls driving transistor switching.

The rotation position signals A, B, and C are counted by the pulse counter 41. The pulse counter 41 generates a pulse P corresponding to a spindle motor rotation angle based on the rotation position signals A, B, and C.

FIGS. 28A, 28B, 28C, and 28D show relationships between the rotation position signals A, B, and C inputted to the switching circuit 397 and the pulse P corresponding to a spindle motor rotation angle position.

Figure 28A:
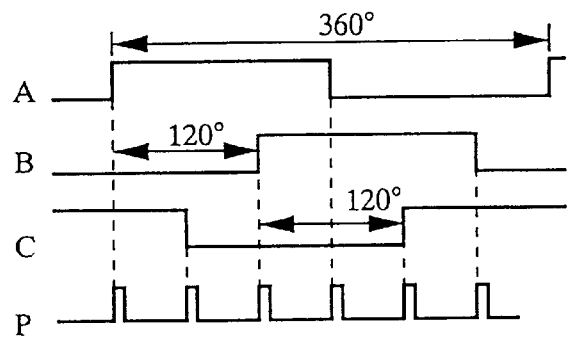
FIGS. 28A–28D show mechanisms in which a pulse corresponding to a rotation angle position of the spindle motor is generated based on a rotation position signal according to this invention.

In FIG. 28A, the rotation position signals A, B, and C are generated every 120 degrees. A leading edge and a trailing edge of each of the rotation position signals A, B, and C are detected and a pulse is generated. Accordingly, the pulse is used as a pulse corresponding to a spindle motor rotation angle position. For example, when 72 pulses are generated, it is detected that the disk has rotated once.

Figure 28B:
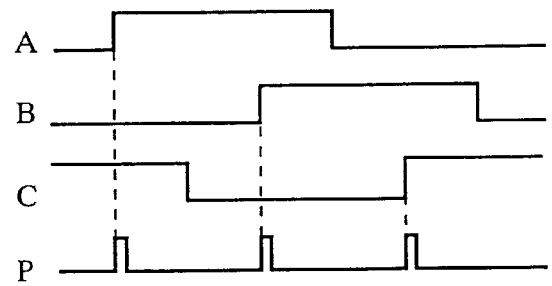

In FIG. 28B, only a leading edge of each of the rotation position signals A, B, and C is detected and a pulse is generated. In this case, when 36 pulses are generated, it is detected that the disk has rotated once.

Figure 28C:
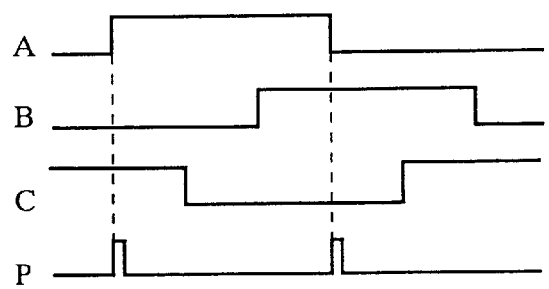

In FIG. 28C, a pulse is generated at a leading edge and a trailing edge of the rotation position signal A. A pulse is not generated at a leading edge and a trailing edge of each of the rotation position signals B and C. In this case, when 24 pulses are generated, it is detected that the disk has rotated once.

Figure 28D:
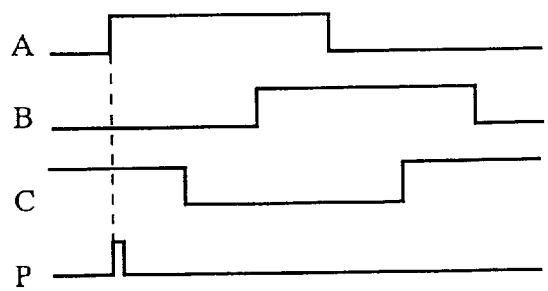

In FIG. 28D, a pulse is generated at a leading edge of the rotation position signal A. A pulse is not generated at a leading edge of each of the rotation position signals B and C. In this case, when 12 pulses are generated, it is detected that the disk has rotated once.

The detected pulse corresponding to the spindle motor angle position is counted by the pulse counter 41 in the controller 80.

Figure 29:
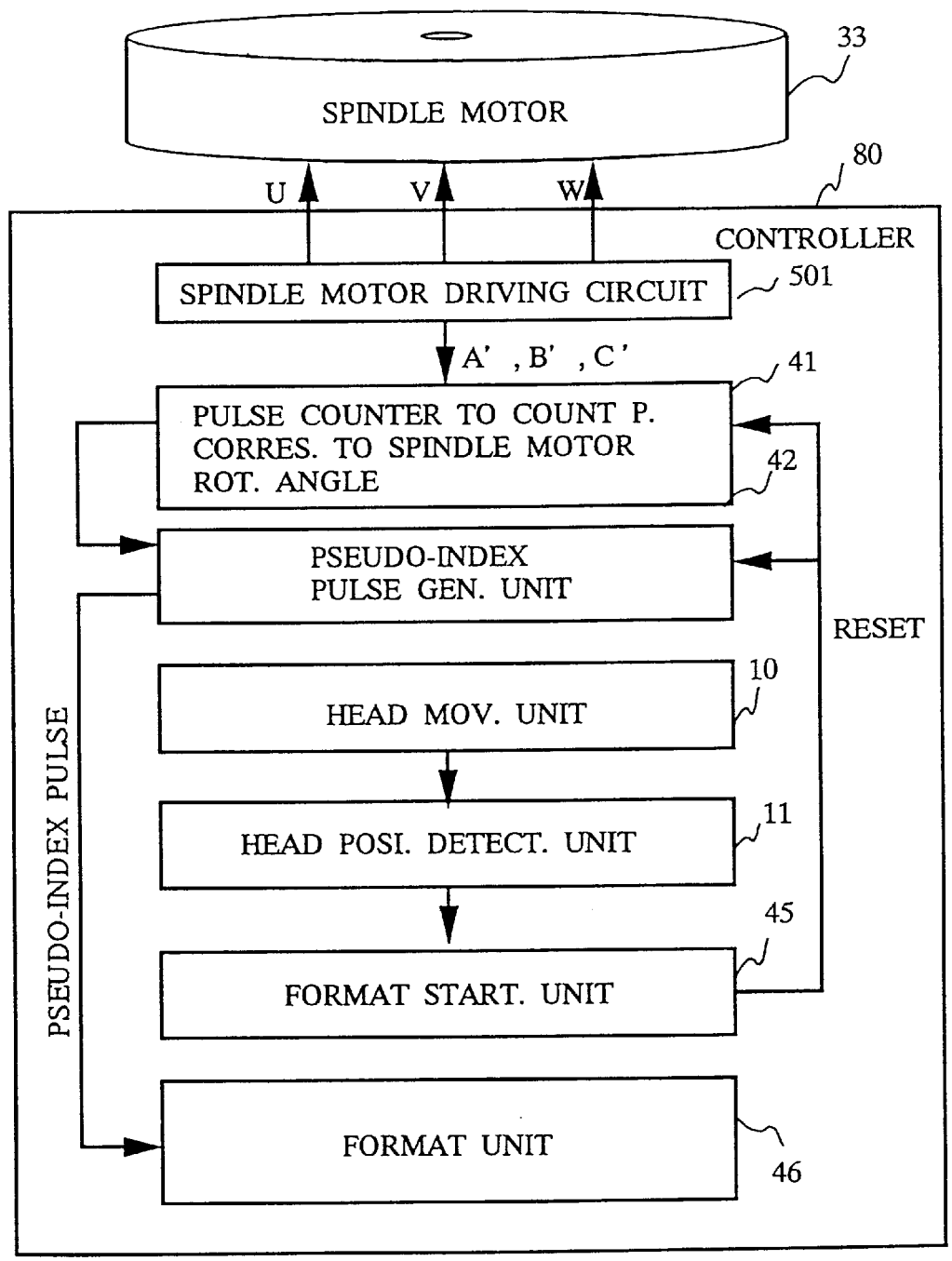
FIG. 29 shows an internal block chart of the controller in which the pseudo-index pulse is used according to this invention.

In FIG. 29, a terminal voltage of each of phases U, V, and W are compared and a rotation position signal is generated. A pulse corresponding to a spindle motor rotation angle position is generated based on the rotation position signal.

Figure 30:
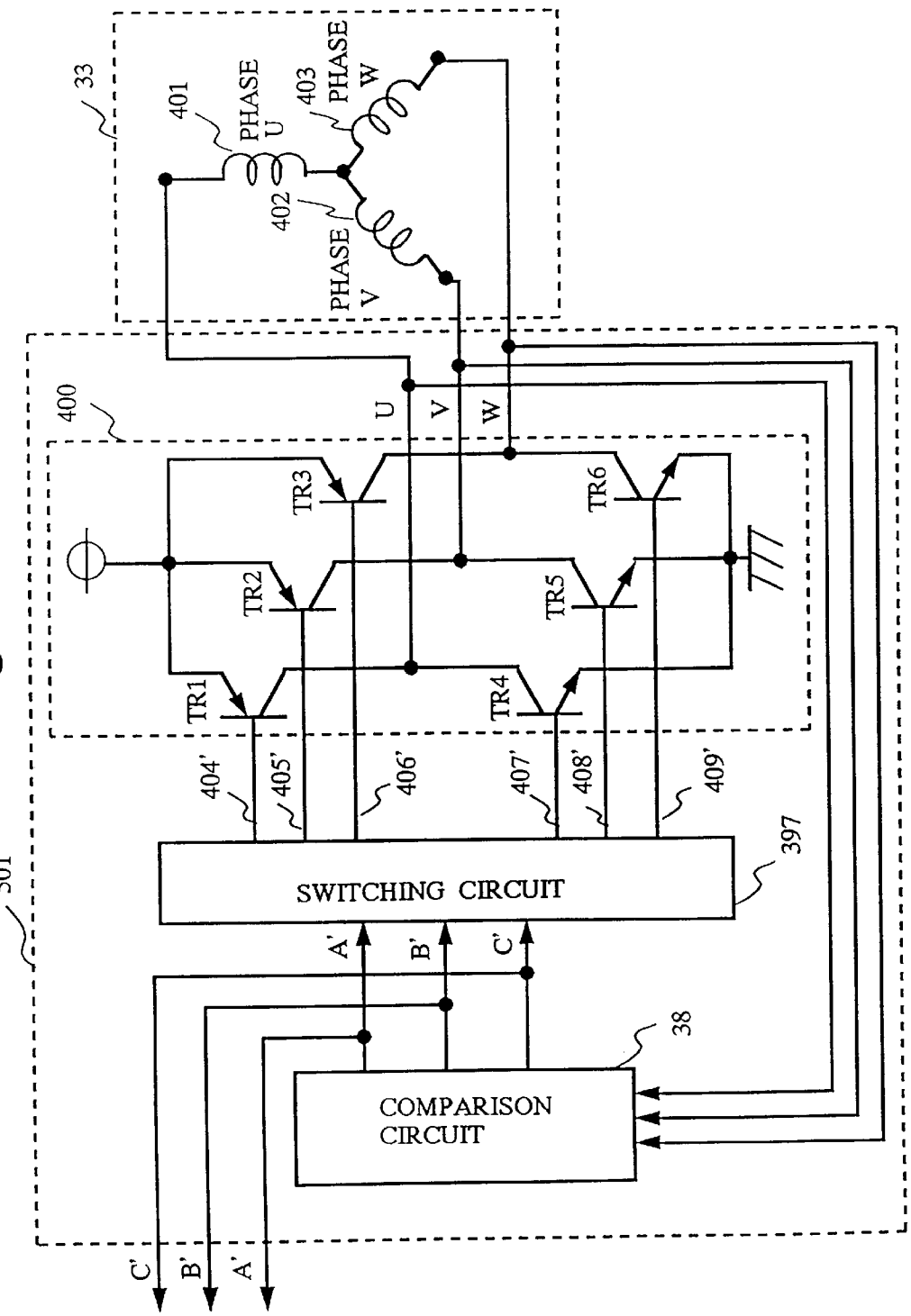
FIG. 30 shows an internal configuration of the spindle motor driving circuit and phase connections in the spindle motor according to this invention.

In FIG. 30, an internal configuration of a spindle motor driving circuit 501 and phase connecting lines are shown. In FIG. 30, the rotation position detector 389 is not provided. A terminal voltage of each of the phases U, V, and W is inputted to a comparison circuit 38. The comparison circuit 38 compares terminal voltages for providing current to spindle motor coils, i.e., phases U, V, and W and generate rotation position signals A', B', and C'.

Figure 31:
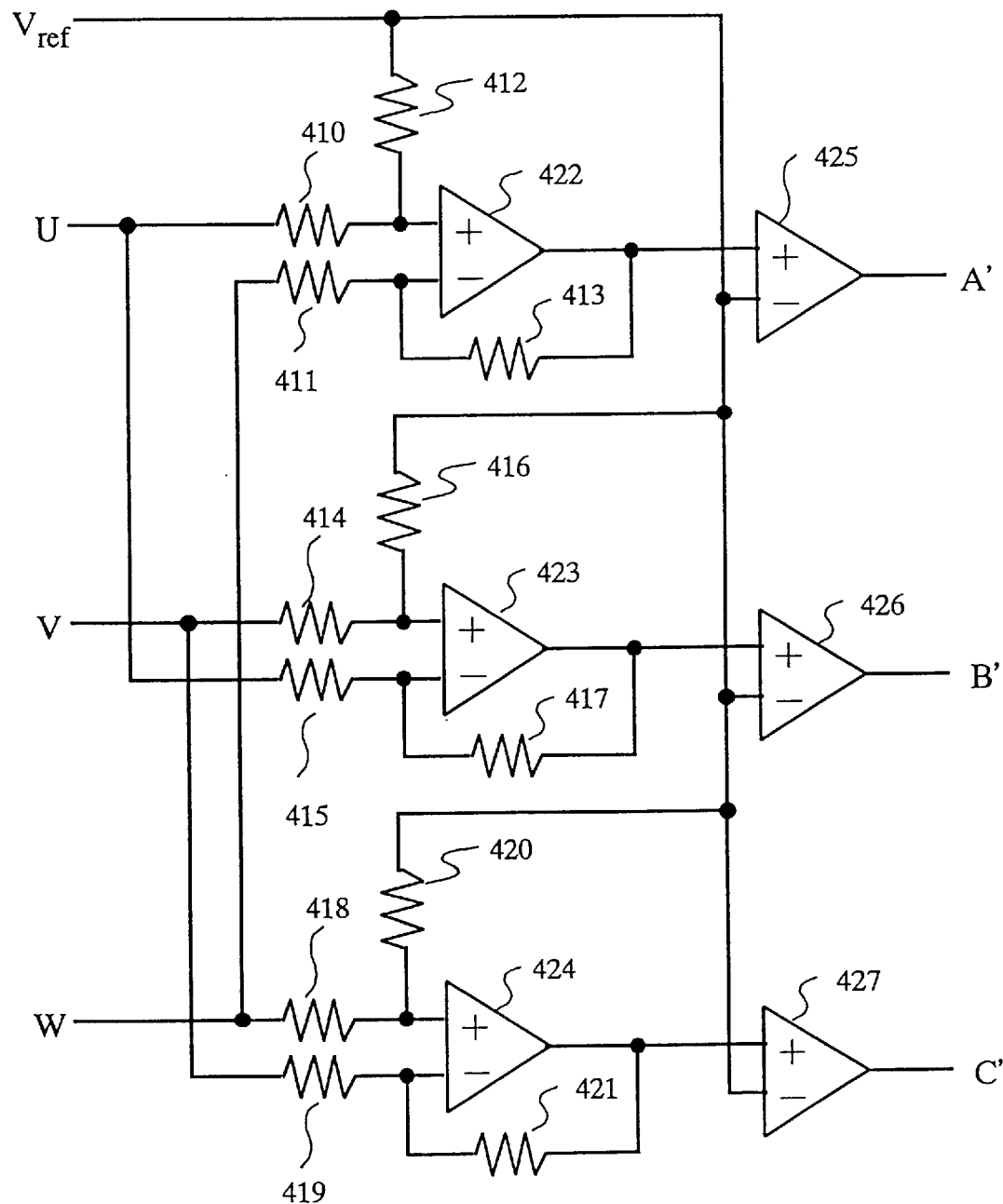
FIG. 31 shows an actual circuit configuration chart of a comparison circuit according to this invention.

A circuit configuration of the comparison circuit is illustrated in FIG. 31.

In FIG. 31, resistances 410–412, differential amplifying circuits 422–424, and comparator circuits 425–427 are illustrated. A terminal voltage of the phase U is inputted to a non-reverse input terminal of the differential amplifying circuit 422 via the resistance 410. A terminal voltage of the phase U is inputted to a reverse input terminal of the differential amplifying circuit 423 via the resistance 415. A terminal voltage of the phase V is inputted to a non-reverse input terminal of the differential amplifying circuit 423 via the resistance 414. A terminal voltage of the phase V is inputted to a reverse input terminal of the differential amplifying circuit 424 via the resistance 419. A terminal voltage of the phase W is inputted to a non-reverse input terminal of the differential amplifying circuit 424 via the resistance 418. A terminal voltage of the phase W is inputted to a reverse input terminal of the differential amplifying circuit 422 via the resistance 411. The reverse input terminals of the differential amplifying circuits 422, 423, and 424 are connected output terminals of the differential amplifying circuits via the resistances 413, 417, and 421. Each of the output terminals is connected to each of non-reverse input terminals of the comparator circuits 425, 426, and 427. Further, a standard voltage Vref of the controller is inputted to the non-reverse input terminals of the differential amplifying circuits 422, 423, and 424 and the reverse input terminals of the comparator circuits 425, 426, and 427. The differential amplifying circuit 422 outputs a differentially amplified terminal voltage of the phase U with a standard voltage Vref and a differentially amplified terminal voltage of the phase V with a standard voltage Vref. The comparator circuit 425 compares a signal of the differentially amplified terminal voltages and the standard voltage Vref and obtains the rotation position signal A'. The rotation position signals B' and C' are similarly obtained. The switching circuit 397 outputs driving signals 404'–409' based on the rotation position signals A', B' and C' and controls driving transistor switching.

Figure 32:
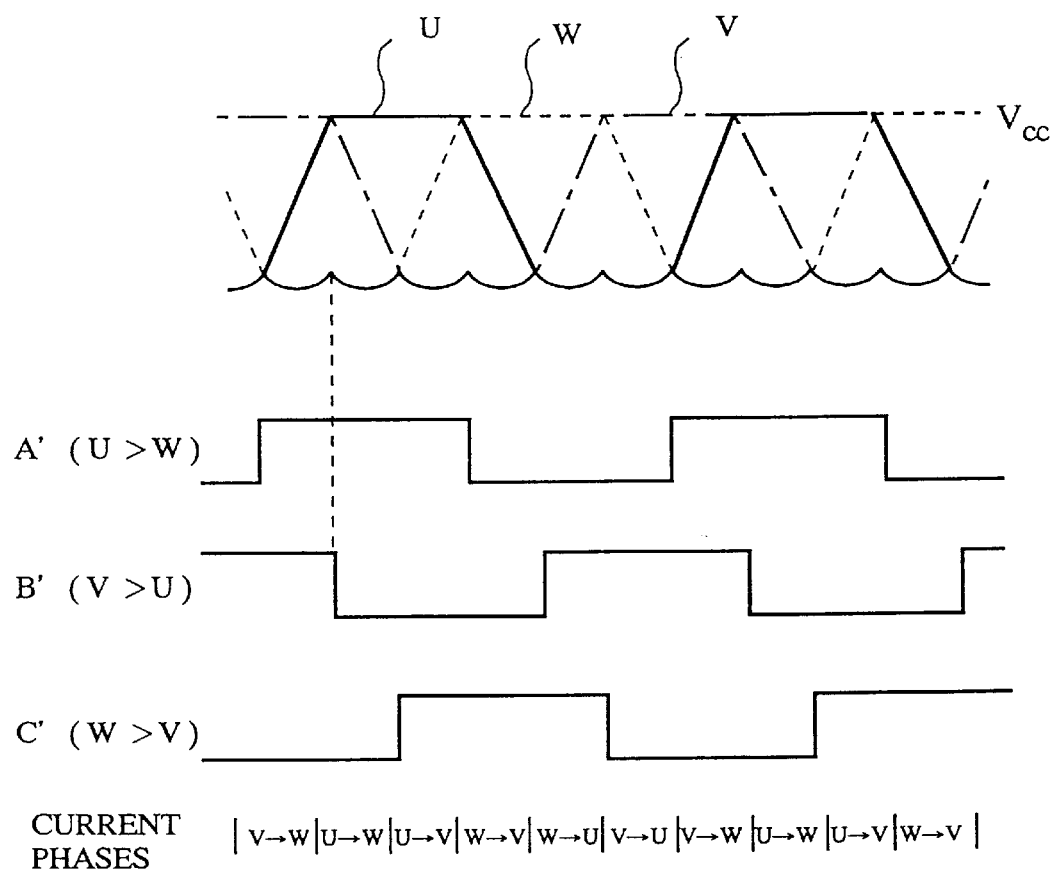
FIG. 32 shows relationships among a waveform of a terminal voltage at each of phases U, V, and W, rotation signals A', B', and C' which are outputted from the comparison circuit and current phases according to this invention.
Figure 33:
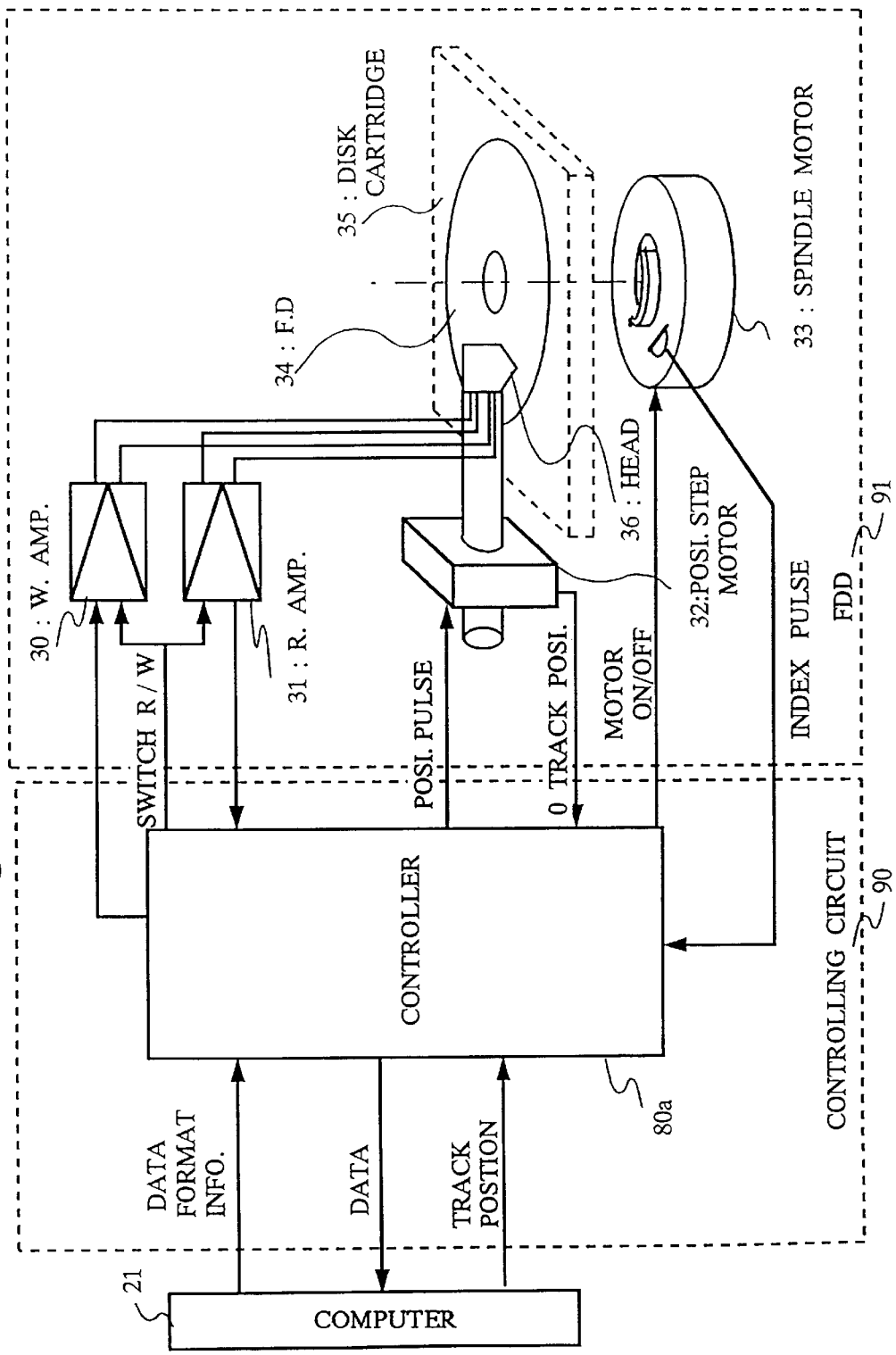
FIG. 33 illustrates a FDD and a controlling circuit according to the related art in which formatting of each track is started or ended based on an index pulse which is outputted from a disk or a spindle motor.
Figure 34:
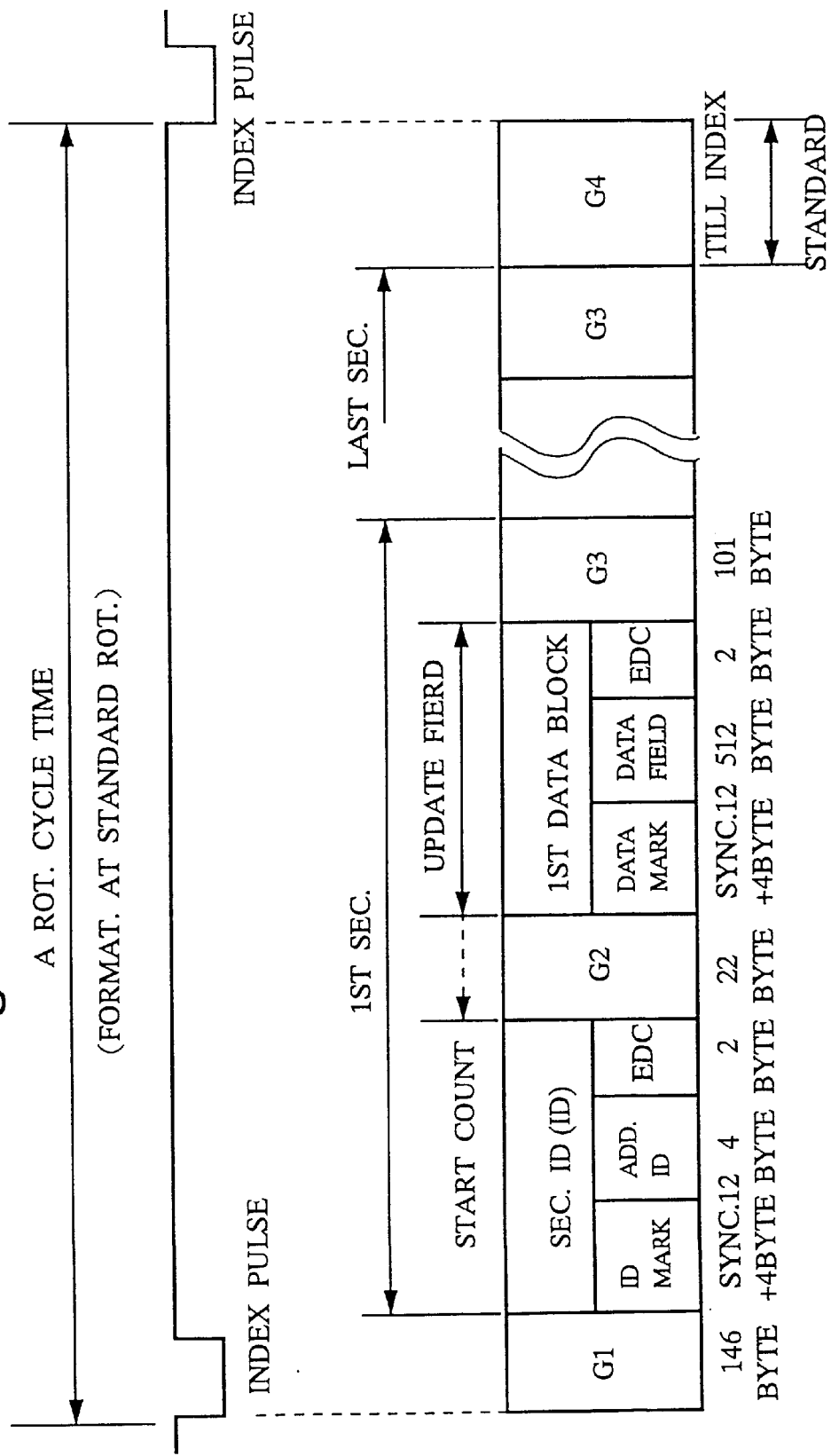
FIG. 34 shows a sample configuration of bytes in a FDC formatting according to the related art.
Figure 35:
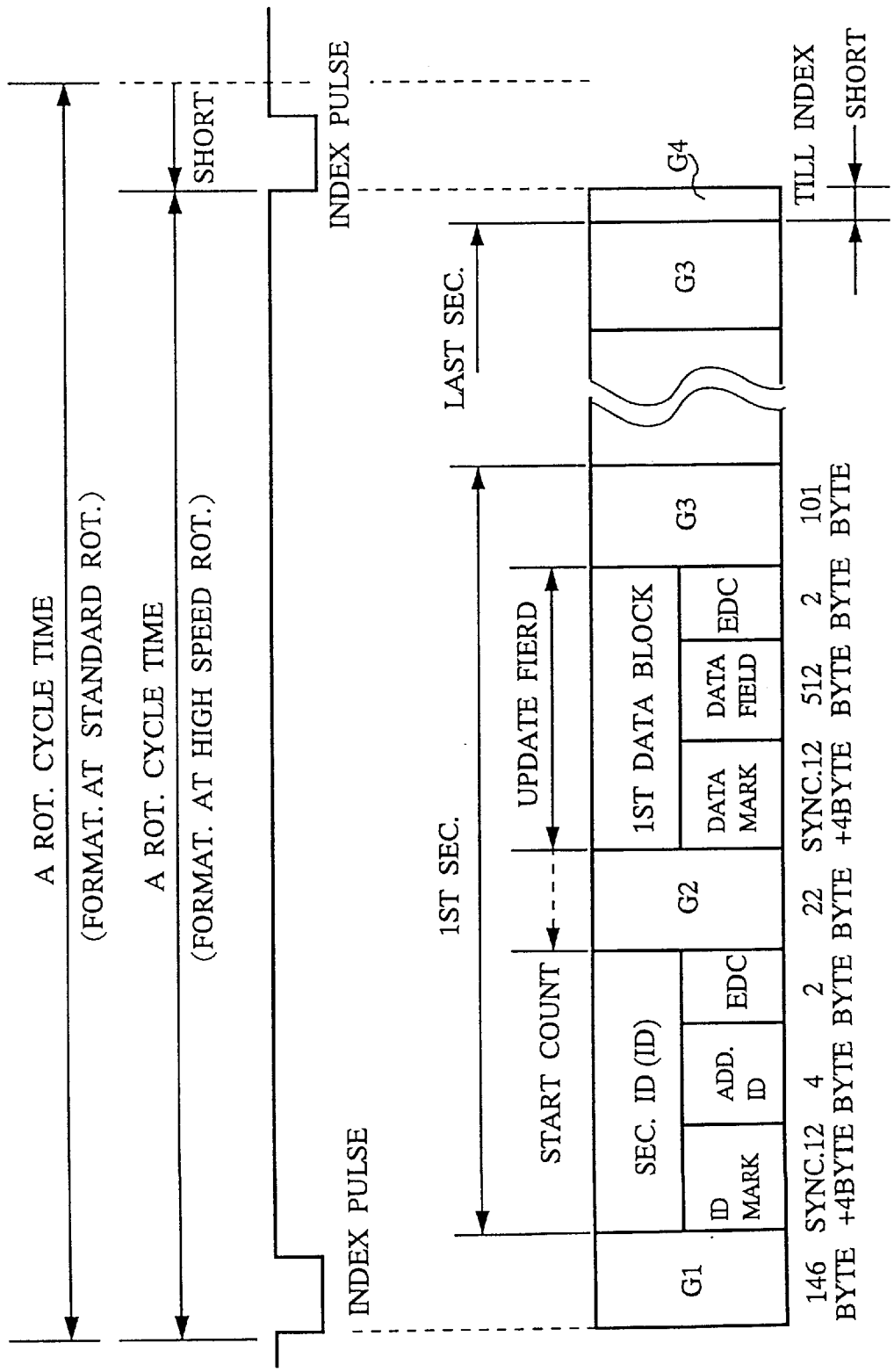
FIG. 35 shows a sample configuration of bytes in a FDC formatting according to the related art.
Figure 36:
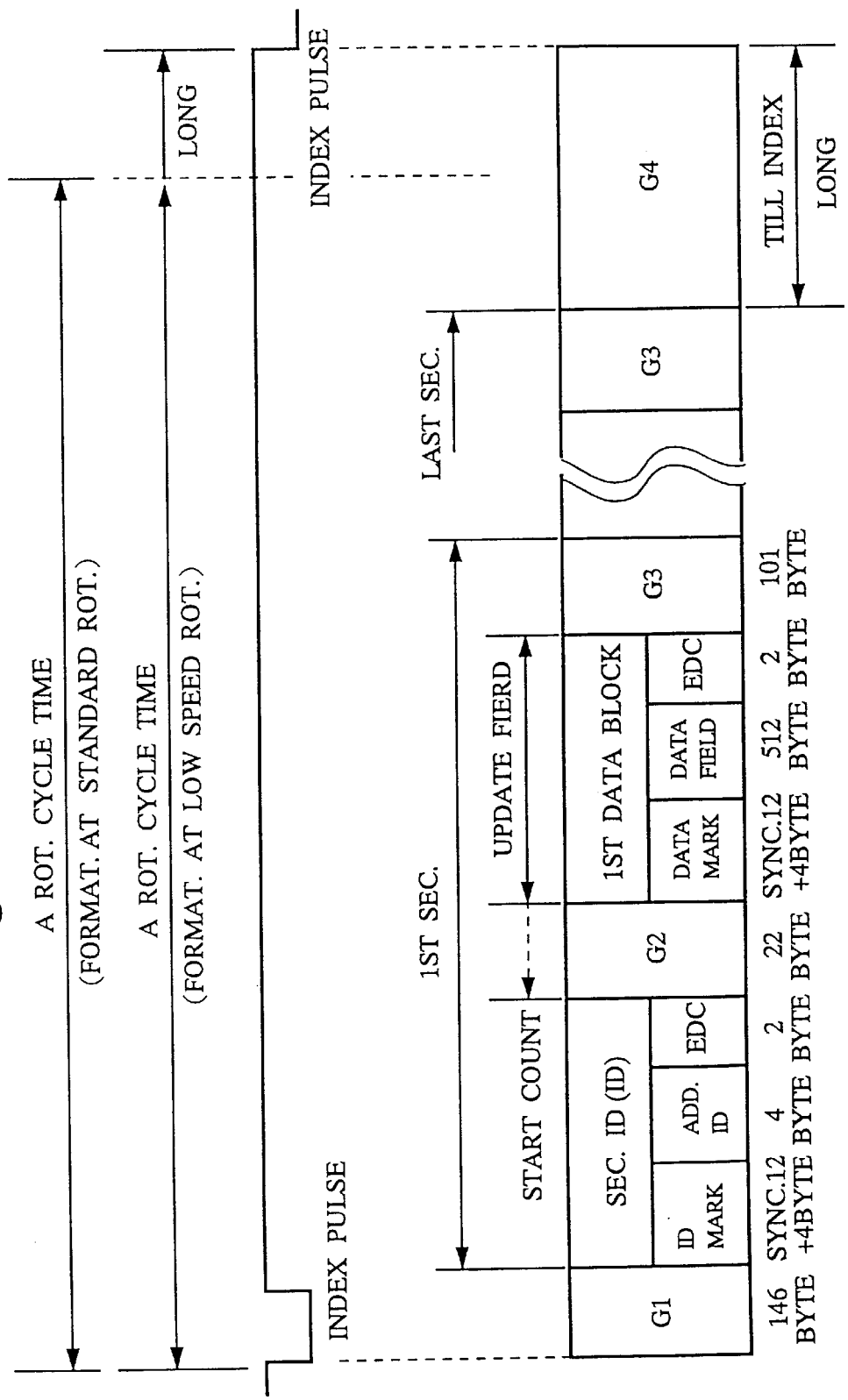
FIG. 36 shows a sample configuration of bytes in a FDC formatting according to the related art.
Figure 37:
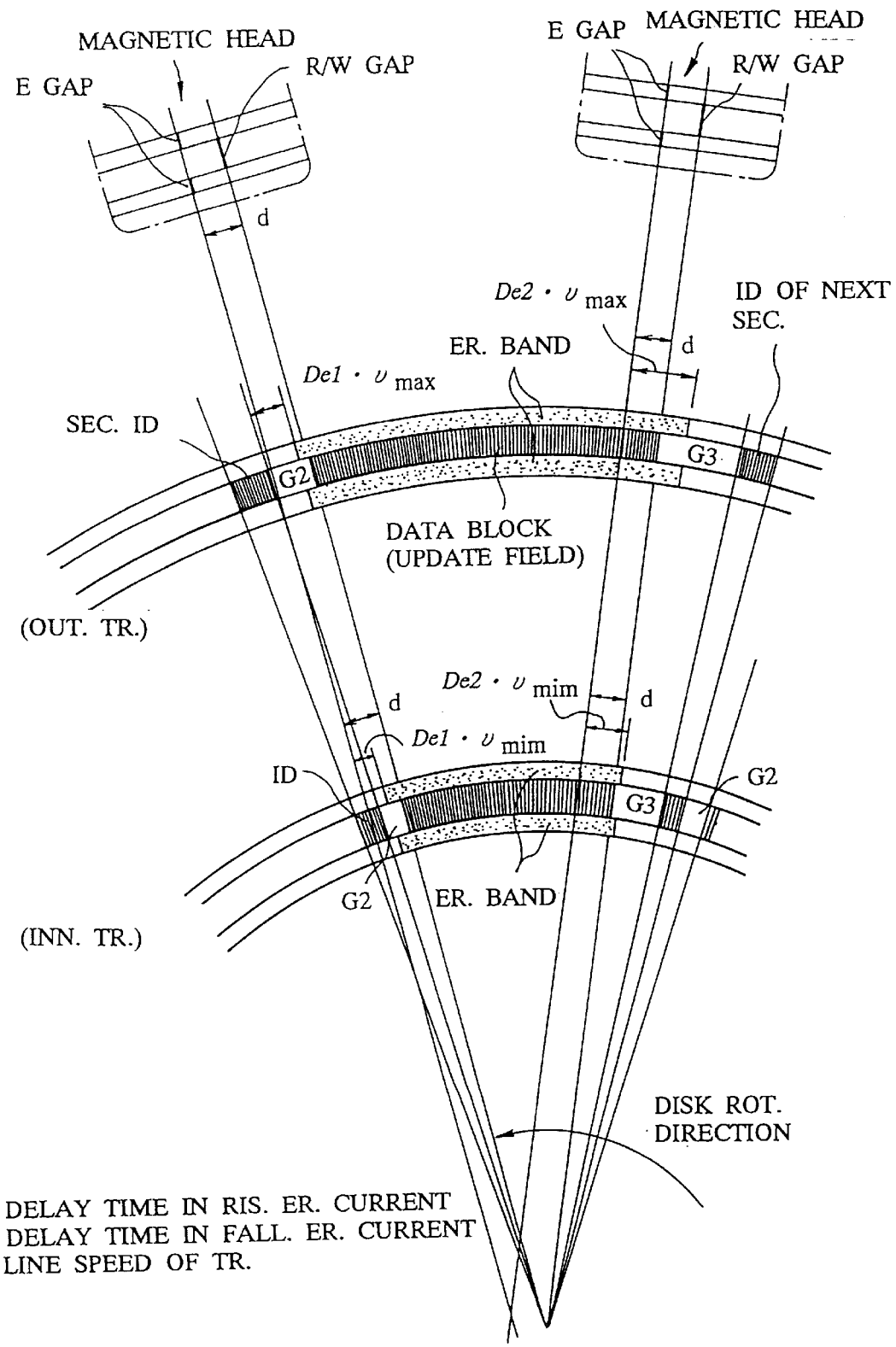
FIG. 37 shows data block updating according to a tunnel erasing method.
Figure 38:
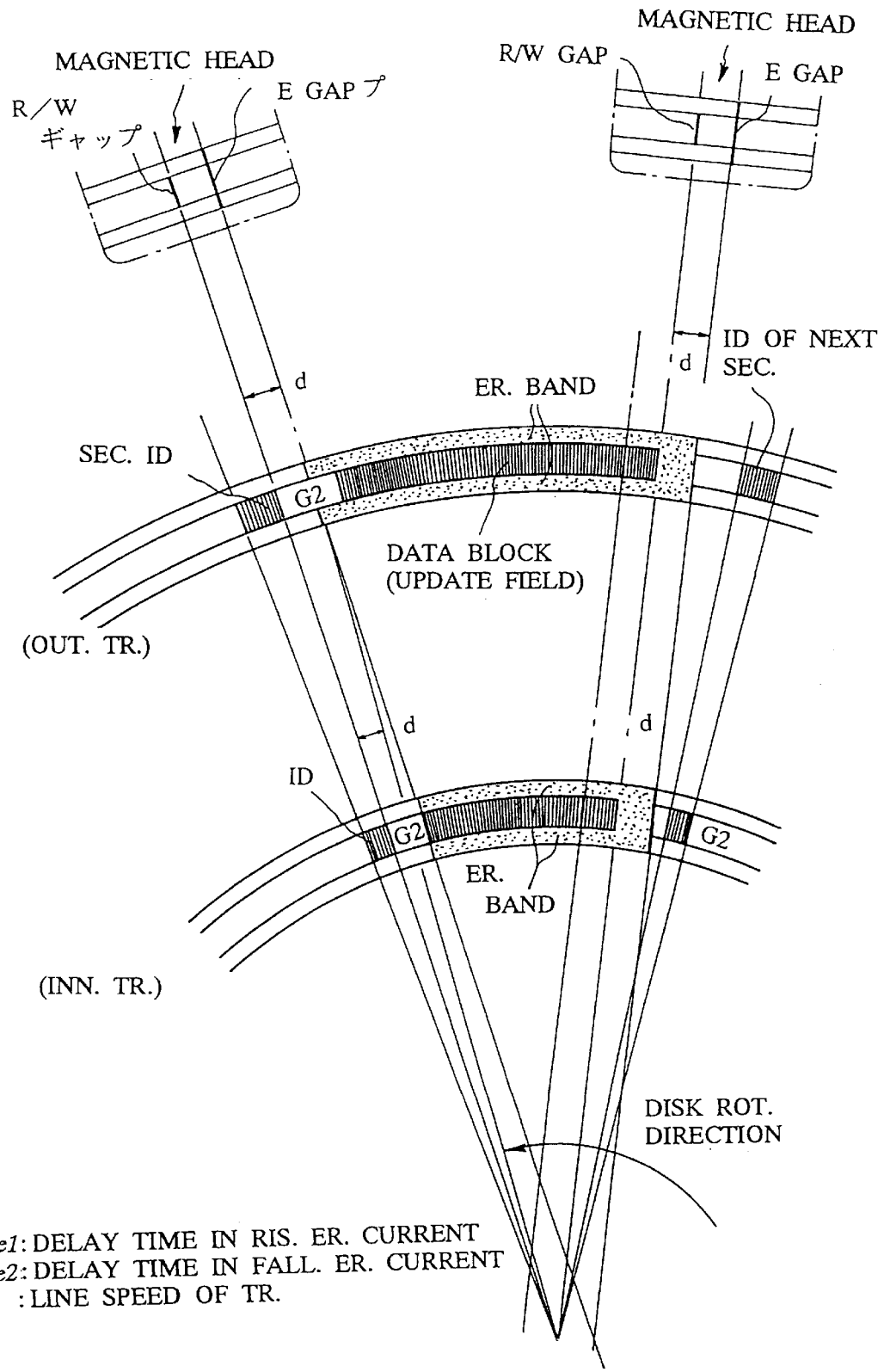
FIG. 38 shows updating of a data block according to a leading erasing method.

FIG. 32 shows waveforms of terminal voltages of phases U, V, and W and relationships between the rotation position signals A', B', and C' which are outputted from the comparison circuit 38 and current phases. As stated with reference to the rotation position signals, a pulse corresponding to the spindle motor rotation angle position is generated. Operations after the pulse corresponding to the spindle motor rotation angle position is counted by the pulse counter 41 in the controller 80 are same as operations which are stated earlier.

Even if the rotation position detector for controlling rotation is not provided, the rotation position signals A', B', and C' can be generated.

The encoder 39 or rotation position detector 389 in the spindle motor 33, switching circuit 397, bridge circuit 400, pulsating circuit 399 or comparison circuit 38, and rotation position signals A, B, and C or A', B', and C' are not additionally provided for embodiment 2. They are already parts, circuits, or signals provided in the spindle motor or the spindle motor driving circuit to control rotation speed or spindle motor rotation. In embodiment 2, a pulse corresponding to a spindle motor rotation angle position which is extracted from the encoder 39 or rotation position detector 389 in the spindle motor, switching circuit 397, bridge circuit 400, pulsating circuit 399 or comparison circuit 38, and rotation position signals A, B, and C or A', B', and C' is used to generate the pseudo-index pulse. As stated above, additional hardware is not necessary to realize embodiment 2.

As stated above, according to the formatting method in embodiment 2, the rotation speed detecting pulse or the rotation position signal for feed back control of a spindle motor rotation speed for rotating a disk is counted or a pulse frequency or signal frequency is divided. Then, a pulse is generated in every disk rotation. The pulse is used as a pseudo-index pulse and formatting of each track is started. When a next pseudo-index pulse is generated, formatting of the track is completed.

During formatting, immediately after the head is moved to a next cylinder by a head positioning signal, a pulse is generated after it is detected that the head is stably positioned. Alternatively, a pulse is generated after a constant time has passed and it is ensured that the head is stably positioned. Then, the pulse counter or the pulse frequency dividing circuit is reset and formatting is started based on the pulse. Then, the rotation speed detecting pulse or the rotation position signal for feedback control of spindle motor rotation speed for rotating a disk is counted or a pulse frequency is divided. Then, a pulse is generated in every disk rotation. Formatting of a track is completed when the pulse is detected.

The formatting method which is discussed in embodiment 2 has the following effects:

(1) When it is impossible to install a sensor for detecting an index pulse in a micro FDD/FDC, a pseudo-index pulse can be generated and formatting can be performed.

(2) If an index pulse counter (or a pulse frequency dividing circuit) is reset after the head is moved, a waiting time for generating an index pulse is unnecessary.

(3) If ID gap G2 length and data block gap G3 length are almost the same in a disk formatted with a method of embodiment 1 and a disk formatted with a method of embodiment 2, read/write/update of a data can be performed.

In both embodiments, formatting is performed by a flexible disk apparatus. However, the apparatus and method discussed in the above embodiments are also used when a different type of disk is formatted by an apparatus other than the flexible disk apparatus. The apparatus and method of this invention are also used to format a track in a closed loop on a magnetic drum, magnetic card, etc. The apparatus and method of this invention are also used for formatting of an optical recording medium, e.g., CD-ROM (Compact Disk-Read Only Memory) or optical disk.

As stated above, this invention provides a formatting apparatus which does not use an index pulse. Since it is unnecessary to provide an index sensor, the size of the formatting apparatus can be reduced.

According to this invention, a longer track gap is written. Therefore, a data recording section is always written over part of the track gap.

According to this invention, a last data block gap is written first. Therefore, a rotation speed fluctuation of a disk and a write speed fluctuation can be absorbed.

According to this invention, a read error at a boundary of the data recording section and a gap is prevented.

According to this invention, since an index gap is unnecessary, a number of bytes for the index gap is used for other gaps. Therefore, an appropriate length is provided for each gap to absorb a rotation fluctuation which is increased by a smaller spindle motor. Accordingly, the increased rotation fluctuation does not cause a problem.

According to this invention, formatting of a neighboring next track can be started immediately.

According to this invention, steady positioning of a head can be confirmed.

According to this invention, steady positioning of the head can be assumed without additional hardware.

According to this invention, formatting of a next track can be started after a constant time has passed.

According to this invention, since a track format is written in every constant angle rotated from another track format, a formatting speed and a data accessing speed can be increased.

According to this invention, since a pseudo-index pulse is generated, a formatting apparatus which does not need an index pulse is realized.

According to this invention, the pseudo-index pulse can be generated utilizing a rotation speed detecting pulse which is outputted by an encoder.

According to this invention, the pseudo-index pulse can be generated utilizing a rotation position signal which is outputted by a rotation position detector.

According to this invention, the pseudo-index pulse can be generated utilizing a terminal voltage at each spindle motor coil.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. An apparatus for writing a track format on a recording medium, the track format having a data recording section made up of a plurality of sectors, each having a sector data block gap at the end thereof, the track format further having a track gap between a last sector and a first sector of the data recording section, the formatting apparatus comprising:

a gap write unit for writing a sector data block gap in the last sector of the data recording section, and for writing the track gap next to the previously written sector data block gap of the last sector, the sector data block gap in the last sector and the track gap together forming a pre-writing gap; and a data writing unit for writing the data recording section starting at the end of the pre-writing gap after said gap write unit writes the pre-writing gap, said data writing unit writing a sector data block gap at the end of each sector of the data recording section except the last sector, the data block gap for the last sector having previously been written by said gap write unit.

2. The formatting apparatus of claim 1, wherein said gap write unit includes a track gap write unit for writing a track gap which is longer than a track gap which should exist between the beginning and the end of the data recording section after formatting is complete, and said data writing unit writes a last part of the data recording section over part of the pre-writing gap written by said gap write unit.

3. The formatting apparatus of claim 1, wherein said data writing unit writes a part of the sector data block gap in the last sector as dummy data after writing the data recording section.

4. The formatting apparatus of claim 1, further comprising:

a head for writing a track format on a recording medium;

a head moving unit for moving said head;

a head positioning detecting unit for detecting a completion of movement of said head by said head moving unit to the track to be formatted; and a format starting unit for activating said gap write unit when said head positioning detecting unit detects that movement of said head is complete.

5. A formatting apparatus of claim 4, wherein the track format is written starting at a point located at any of a number of recording medium rotation angles, and among all the tracks on the recording medium, a connection position indicating where a track format is completed exists at almost every recording medium rotation angle.

6. An apparatus for formatting a flexible disk with a diameter of 48 mm or less, wherein said apparatus writes a track gap for absorbing disk rotation speed fluctuation first as a pre-written gap, and when the disk rotates at a nominal rotation speed, approximately 60% or more of the pre-written gap is written over after formatting of the disk, approximately 40% or less of the pre-written gap remains, and a number of remaining bytes of the pre-written gap is 2% or less of a nominal unformatted byte number in a track.

7. The formatting apparatus of claim 6, wherein the flexible disk has a plurality of sectors in a track, each having a sector identifier, a sector identifier gap, a data block, and a data block gap, the length of data recorded in the data block is 512 bytes, the length of the sector identifier gap is in a range of 33 bytes to 46 bytes, and the length of the data block gap is in a range of 88 bytes to 102 bytes.

8. An apparatus for formatting a flexible disk with a diameter of 48 mm or less, wherein said apparatus initially writes a track gap for absorbing disk rotation speed fluctuation and a data block gap in a last sector as pre-written gaps, and when the disk rotates at a nominal rotation speed, approximately 60% or more of the pre-written gap is written over after formatting of the disk, approximately 40% or less of the pre-written gap remains, and a number of remaining bytes of the pre-written gap is 2.5% or less of a nominal unformatted byte number in a track.

9. A flexible disk with a diameter of 48 mm or less comprising: a plurality of sectors which each has a data length of 512 bytes, wherein a length of a sector identifier gap is in a range of 33 bytes to 46 bytes, a length of a data block gap is in a range of 88 bytes of 102 bytes, and a connection position of recording signals where formatting is complete exists just after a data block gap in a last sector.

10. A flexible disk with a diameter of 48 mm or less comprising: a plurality of sectors which each has a data length of 512 bytes, wherein a length of a sector identifier gap is in a range of 33 bytes to 46 bytes, a length of a data block gap is in a range of 88 bytes of 102 bytes, and a connection position of recording signals where formatting is complete exists within some bytes after a data block gap in a last sector.

11. A method for writing a track format on a recording medium, the written track format having a data recording section made up of a plurality of sectors, each having a sector data block gap at the end thereof, the written track format further having a track gap between a last and a first sector of the data recording section, the method comprising the steps of:

writing a sector data block gap for the last sector of the data recording section;

writing the track gap adjacent to the previously written sector data block gap of the last sector, the sector data block gap for the last sector and the track gap together forming a pre-writing gap; and writing the data recording section following the pre-writing gap, including a data block gap at the end of each sector except the last sector of the data recording region, the data block gap for the last sector having been previously written to form the pre-writing gap.

12. An apparatus for writing a track format on a recording medium, the track format having a data recording section made up of a plurality of sectors, each having a sector data block gap at the end thereof, the track format further having a track gap between a last sector and a first sector of the data recording section, the formatting apparatus comprising:

a gap write unit for writing a sector data block gap in the last sector of the data recording section, and for writing the track gap next to the previously written sector data block gap of the last sector, the sector data block gap in the last sector and the track gap together forming a pre-writing gap; and a data writing unit for writing the data recording section starting at the end of the pre-writing gap after said gap write unit writes the pre-writing gap, wherein the recording medium is a flexible disk having a diameter of 48 mm or less, the disk being rotated during formatting, the pre-writing gap absorbs fluctuations in disk rotation speed, and when the disk rotates at a standard speed, approximately 60% or more of the pre-writing gap is written over by the data writing unit.

13. The formatting apparatus according to claim 12, wherein the number of bytes remaining in the pre-writing gap after writing by the data writing unit is complete is less than 2% of a nominal unformatted track byte length.

14. The formatting apparatus according to claim 12, wherein the number of bytes remaining in the pre-writing gap after writing by said data writing unit is complete is less than 2.5% of a nominal unformatted track byte length.

15. A method for writing a track format on a recording medium, the written track format having a data recording section made up of a plurality of sectors, each having a sector data block gap at the end thereof, the written track format further having a track gap between a last and a first sector of the data recording section, the method comprising the steps of:

writing a sector data block gap for the last sector of the data recording section;

writing the track gap adjacent to the previously written sector data block gap of the last sector, the sector data block gap for the last sector and the track gap together forming a pre-writing gap; and writing the data recording section following the pre-writing gap, wherein the recording medium is a flexible disk having a diameter of 48 mm or less, the disk being rotated during formatting, the pre-writing gap absorbs fluctuations in disk rotation speed, and when the disk rotates at a standard speed, approximately 60% or more of the pre-writing gap is written over by the data writing unit.

* * * * *